United States Patent [19]

Wolfe

[11] Patent Number: 4,500,687

[45] Date of Patent: Feb. 19, 1985

[54] ELASTOMERIC POLYETHER-CONTAINING IMPACT POLYMER PRODUCTS

[75] Inventor: David L. Wolfe, Midland, Mich.

[73] Assignee: The Dow Chemical Company, Midland, Mich.

[21] Appl. No.: 275,071

[22] Filed: Jun. 18, 1981

[51] Int. Cl.³ .......................................... C08F 283/06
[52] U.S. Cl. ................................... 525/412; 525/134; 525/249; 525/257; 525/259; 525/411; 525/414; 526/189; 526/268; 526/273; 528/92; 528/361; 528/366; 528/393; 528/416
[58] Field of Search ................... 526/189, 273, 268; 525/257, 259, 411, 412, 414, 134, 249; 528/92, 361, 366, 393, 416

[56] References Cited

U.S. PATENT DOCUMENTS 3,925,317 12/1975 Hsieh .................................. 526/273

Primary Examiner—Jacob Ziegler
Attorney, Agent, or Firm—R. B. Ingraham

[57] ABSTRACT

Excellent and very high quality impact-resistant polymer products products are comprised of particular polyether elastomer constituents which modify and attribute many desirable properties and characteristics to the interpolymerized end product; impact styrene polymers being especially advantageous varieties thereof. In-situ polymerization, with specific coordination catalyst systems, is followed to form polyether polymers of epoxidized monomer constituents provided directly dissolved (or dispersed) in the major addition-polymerizable monomer utilized. The rubbery polyether elastomer so made is then interpolymerized with the major monomer to provide the advantageous high impact end product.

54 Claims, 32 Drawing Figures

HIPS MODIFIED WITH POLYBUTADIENE

HIPS MODIFIED WITH 7% 85% PROPYLENE OXIDE/15% ALLYL GLYCIDYL ETHER RUBBER

Effect of AGE Concentration in Copolymerizates With PO on Impact at Both 10% and 20% PE-Elastomer Normalized Impact vs. Percent Rubber $$\text{Normalized Impact} = \frac{\text{Impact (in-lbs/in notch)}}{\% \text{ Rubber}}$$

Note: "Solprene 411" is a ps/PBu Rubber Blend
"Styron 420" is a PBu Rubber-Containing Impact ps Particle Size vs. Shearing Time for HIPS Resin Containing ~7% 85% PO/15% AGE Fig. 20 Particle Size Distribution for HIPPO Containing 7.8% of 85% PO/15% AGE PE-Elastomer Polymerization Rate Constants, k, for PO/AGE vs. 1/T Final Intrinsic Viscosity vs. H₂O Conc. in Catalyst for Polymer of 95/5 PO/AGE in EtBZ, 50°C.

ELASTOMERIC POLYETHER-CONTAINING IMPACT POLYMER PRODUCTS

ABBREVIATIONS EMPLOYED

| ABBREVIATIONS EMPLOYED | |
|---|---|
| ABS | Acrylonitrile/Butadiene/Styrene |
| AGE | Allyl Glycidyl Ether |
| Al | Aluminum |
| avg. | average |
| BrSts | Bromostyrenes |
| BuGlE | Butyl Glycidyl Ether |
| BuO | Butylene Oxide |
| C | Centigrade |
| ClBz | Chlorobenzene |
| ClSts | Chlorostyrenes |
| D-ClBz | di-chlorobenzene |
| diMeSts | dimethyl styrenes |
| Elong. | elongation |
| EO | Ethylene oxide |
| EPI | Epichlorohydrin |
| EpBut | Epoxybutane |
| EthHexClE | Ethylhexyl Glycidyl Ether |
| ESCR | environmental stress crack resistance |
| Eth | ethylene |
| EtBz | Ethyl benzene |
| EthAc | Ethyl acetate |
| Ft-lbs/in | Foot pounds per inch |
| GlAcr | Glycidyl acrylate |
| GlCn | Glycidyl cinnamate |
| GlMeAcr | Glycidyl methacrylate |
| GlS | Glycidyl sorbate |
| HAc | Glacial acetic acid |
| HAcr | Acrylic acid |
| HIPPO | PE-reinforced impact styrene polymer |
| HIPS | High impact polystyrene |
| HMeAcr | Methacrylic acid |
| IsoBuO | Isobutylene oxide |
| MA | Maleic anhydride |
| MeGlE | Methallyl Glycidyl Ether |
| min | minutes |
| NGlE | Norbornenylmethyl Glycidyl Ether |
| OctGlE | Octyl Glycidyl Ether |
| PBu | Polybutadiene |
| PE | Polyether |
| PhTh | Phenothiazine |
| PO | Propylene Oxide |
| Pro | Propylene |
| ppm | parts per million |
| PS | Polystyrene |
| psi | pounds per square inch |
| RT | room temperature |
| S | Sulfur |
| St | Styrene |
| StO | Styrene oxide |
| TBC | t-butylcatechol |
| tbuSt | t-butyl styrene |
| TEA | tri-ethylaluminum |
| Tg | glass transition temperature |
| THF | tetrahydrofuran |
| TO | Toluene |
| $T_R$ | Tensile Rupture |
| $T_Y$ | Tensile Yield |
| VAC | vinyl acetate |
| VCl | vinyl chloride |
| VCN | acrylonitrile |
| VeCl | Vinylidene chloride |
| VGlE | Vinyl phenyl Glycidyl Ether |
| Vicat HD | Vicat Heat Distortion |
| VProp | Vinyl Propionate |

The use of various reinforcing rubbers to prepare high-impact types of plastics products is well known in the art. Classically amongst such materials is polystyrene (i.e. "PS") reinforced with rubber. These rubbers include the natural and many synthetic varieties, particularly polybutadiene(s). They are herein referred to as "HIPS". The subject varieties of plastics have great commercial importance.

The influence of various governmental regulations now plays a part in prudent usage of many plastics products. The already-enacted "Toxic Substances Act" on behalf of the U.S. Government's Environmental Protection Agencies, as well as recent findings concerning the carcinogenic nature of acrylonitrile (coupled with environmentalists' objections to its use) may tend to hinder widespread applicability of the well-known acrylonitrile/butadiene/styrene (i.e., "ABS") resins.

For most practical purposes, rubber (particularly polybutadiene (i.e., "PBu") can be incorporated in styrene (i.e., St") polymers in one of three ways. These include: (i) liquid formulation of rubber latex with a polystyrene (i.e. "PS") latex followed by coagulation and drying; (ii) mechanical blending of the dry rubber (such as PBu or PBu/PS block interpolymers) with dry PS; and (iii) copolymerizing preformed rubber or elastomer with St using mass, solution or suspension polymerizations for the desired result.

Most commercial HIPS is made by the third-identified method. Such products generally have higher impact strengths with less rubber than those made by the other two methods. Better reinforcement is believed to be achieved due to "grafting" of St onto the rubber, chemical cross-linking of the rubber, and occlusion of PS inside the rubber particles, all of which increases the effective volume (phase volume) of the rubber phase. See, in substantiation of this, *Encyclopedia of Polymer Science and Technology*, Vol. 13, p. 133, 1970 (by R. F. Boyer et al.).

FIG. 1 of the accompanying Drawing (the several views and representations of which are more specifically characterized in the following "ILLUSTRATED ILLUSTRATION OF THE INVENTION" Section of this Specification) depicts the average values of temperature and agitation speed as conversion increases in a more or less conventional and often-encountered style of three-stage reactor installation for the manufacture of "HIPPO". This illustration is more extensively discussed in the following Section of the Specification entitled "DETAILED COMPARISON OF INVENTION TO PRIOR ART".

Some serious drawbacks are often associated with use of PBu and like rubbers in making HIPS.

It is known that improved impact styrene polymers and the like are possible to prepare using polyether elastomers (i.e., "PE") in place of conventional rubber(s) for the elastomeric backbone(s) of the composition. Such rubbery PE's are exemplified by terpolymers of propylene oxide (i.e., "PO"), epichlorohydrin (i.e., "EPI") and allyl glycidyl ether (i.e., "AGE"). The heretofore known high impact St polymers using such PE elastomer backbone substituents have generally been prepared by dissolving the PE in St monomer, after which thermal polymerization is conducted. The physical properties of so-obtained products are attractive. They usually exhibit: fairly high impact strengths; good tensile strengths; and adequate tensile module.

However extreme difficulty is usually encountered in the manufacture of such products. There is great troublesomeness in dissolving the PE's in St or other monomers because of their very high molecular weight. The slow solubilizability of pre-polymerized PE's is a complicating and difficult factor attendant their use as plastics intermediates.

There is considerable prior art in the immediate area of interest. Typical references of particular interest include U.S. Pat. Nos.: 3,094,514; 3,113,115; 3,135,725; 3,178,402; 3,499,949; 3,351,517; 3,475,519; 3,627,839; 3,637,554; 3,639,507; 3,954,915; 3,959,225; 4,029,720; 4,057,598; and 4,079,176.

Needless to point out, the basic principles and limitations associated with ordinary and generally practiced manufacture of the so-called impact St polymers and like and equivalent plastics preparations are so widely known to and comprehended by those skilled in the art that fully detailed elaboration thereon is neither made nor attempted herein; the same being unnecessary for thorough understanding and recognition of the advance contributed and possibilitated by and with the instant development.

FIELD AND PURVIEW OF THE INVENTION

The present invention pertains to vastly improved PE-rubber-modified high impact St polymer (and the like) compositions and the manufacture thereof. These, basically, are obtained by: first dissolving, as precursor(s) for the ultimately desired PE rubber ingredient, the appropriate polymerizable alkylene oxide monomer constituent(s) in a St or like or equivalent major monomer solvent; then, and under the influence of particular coordination catalyst systems (and with relatively low and gentle physical shearing or mixing), subjecting the dissolved appropriate alkylene oxide monomer constituent(s) to in-situ polymerization conditions therefor which are not optimum for nor conducive to the polymerization of the St or equivalent addition polymerizable major monomer(s) present. The desired and remaining dissolved PE rubber ingredient is thus advantageously formed directly in solution. Following this, usually at an elevated temperature, the St or other major monomer present is polymerized with some relatively forceful and vigorous shearing agitation associated therewith. This converts at least a substantial portion of the St (or like) monomer to an improved PE-rubber-modified high impact St polymer (or like or analogous polymer) product. The achievement of the indicated practice and provision of all of same is amongst the principle aims and objectives of the invention. Even more and yet distinctive benefits and advantages available in and from practice of the present invention appear and become more evident in the ensuing description and Specification.

SUMMARY OF THE INVENTION

The present invention, and the discovery on which it is based, relates to much improved, PE-rubber-modified high impact St (and/or the like) polymer compositions and products of great utility and extensive applicability and the manufacture thereof, all as is set forth and delineated in the hereto-appended claims 1, 53, 55 and 72 (here referred to and incorporated by reference) and as is further defined and more fully specified in the ensuing Specification and description.

Suitable materials and catalysts for utilization; as well as working proportional details, preparation conditions and parameters and other significant specifics of the invention are also set forth in the following.

SALIENT BENEFITS AND ADVANTAGES OF THE INVENTION

The present invention makes possible and provides:

(1) The ability to polymerize alkene oxides to elastomeric and rubbery polymer form in St and the like or equivalent monomeric solvent using particular coordination catalyst systems for the purpose giving basis for a process and product using PE-rubber-reinforcement of PS and the like to make high impact polystyrene (i.e., "HIPS") and like and/or analogous impact polymer products.

(2) A process much simpler than that ordinarily used to make PBu—(and other rubber)—reinforced HIPS in that the PE rubbers are prepared in major monomer solvent followed by polymerization of the dissolved rubber-containing St (or like or equivalent monomer).

(3) A very unique combination of high impact strength, high tensile strength, and high tensile modulus giving PE-reinforced impact St polymer product(s), hereinafter referred to as "HIPPO", superior to conventional varieties reinforced with PBu and other rubbers.

(4) A HIPPO product having involved particles which are generally larger and contain less occluded PS (or other addition polymer included in composition) and are more irregular in shape than, for illustrative contrast, the PBu particles in conventional HIPS.

(5) Realization, if wanted, of small particle size and excellent properties when low shear is used during the alkene oxide polymerization followed by higher shear during the St (or like monomer) polymerization.

(6) Ability to readily manipulate and vary combinations in and of impact strength/tensile strength/tensile modulus in the present HIPPO products.

(7) Excellent and significant processability (during molding, extrusion, etc.) and environmental stress crack resistance (i.e., "ESCR") in the obtained HIPPO products.

(8) Much improved combined elastomer efficiency at remarkably higher loadings in the HIPPO products as compared with conventional HIPS materials; thus providing larger increase(s) in impact strength values at higher elastomer loading levels, especially those that are upwards of 7 weight percent.

ILLUSTRATED EXEMPLIFICATION OF THE INVENTION

The invention is pictorially demonstrated in and by the thirty-two (32) views of the accompanying Drawing to be taken (save for the previous brief allusion to FIG. 1) in conjunction with the Specification that follows with all of same, as appears in the associated explanation for each of the several involved Figures, being in the nature of either: (i) schematically-presented flow sheet-type diagrams; (ii) graphically-portrayed plots and curves for data representation; and/or (iii) microphotographical duplications and depictions wherein (and not necessarily in the precise order of their hereinafter discussed appearances):

Figure 4:
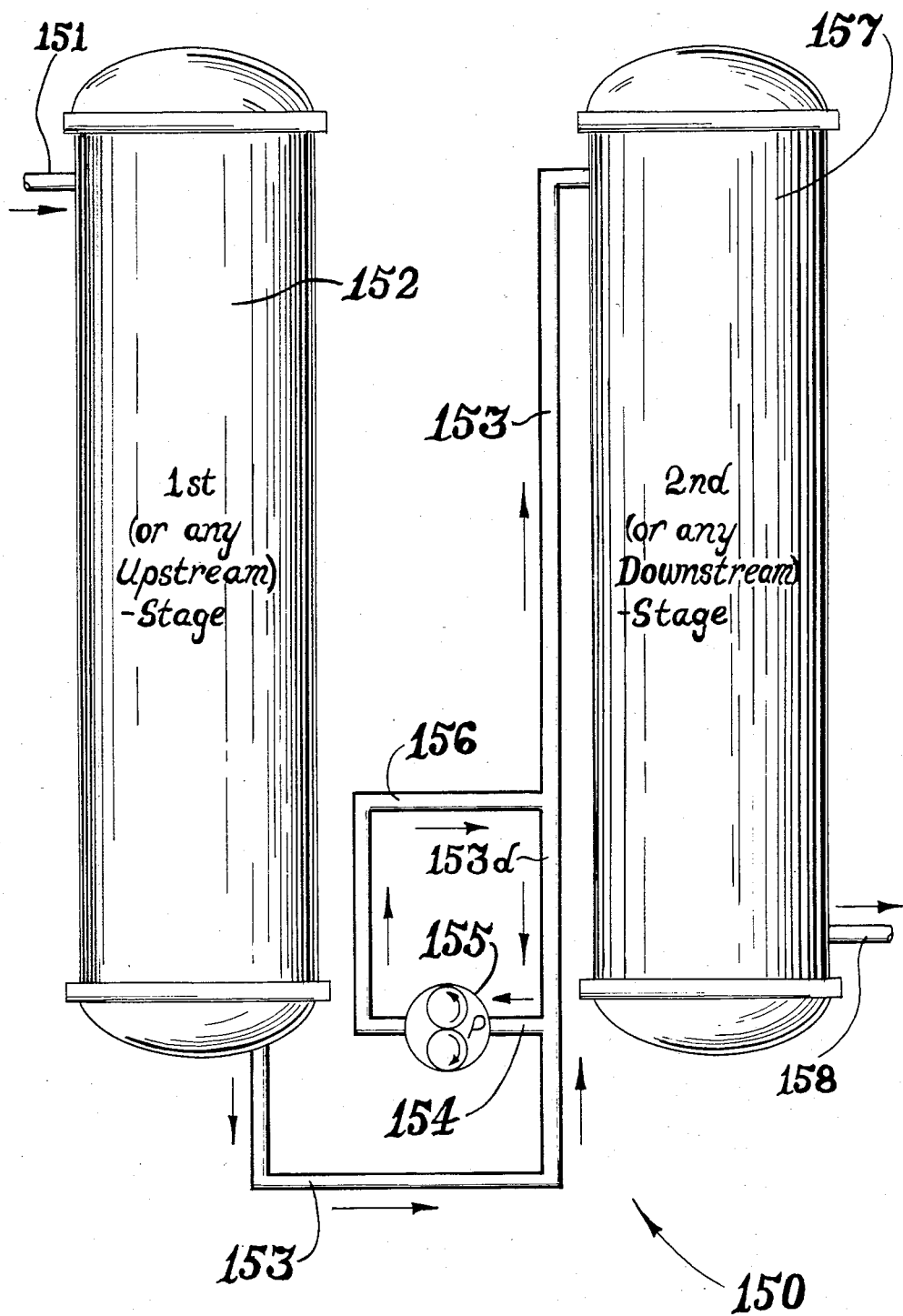
Figure 5:
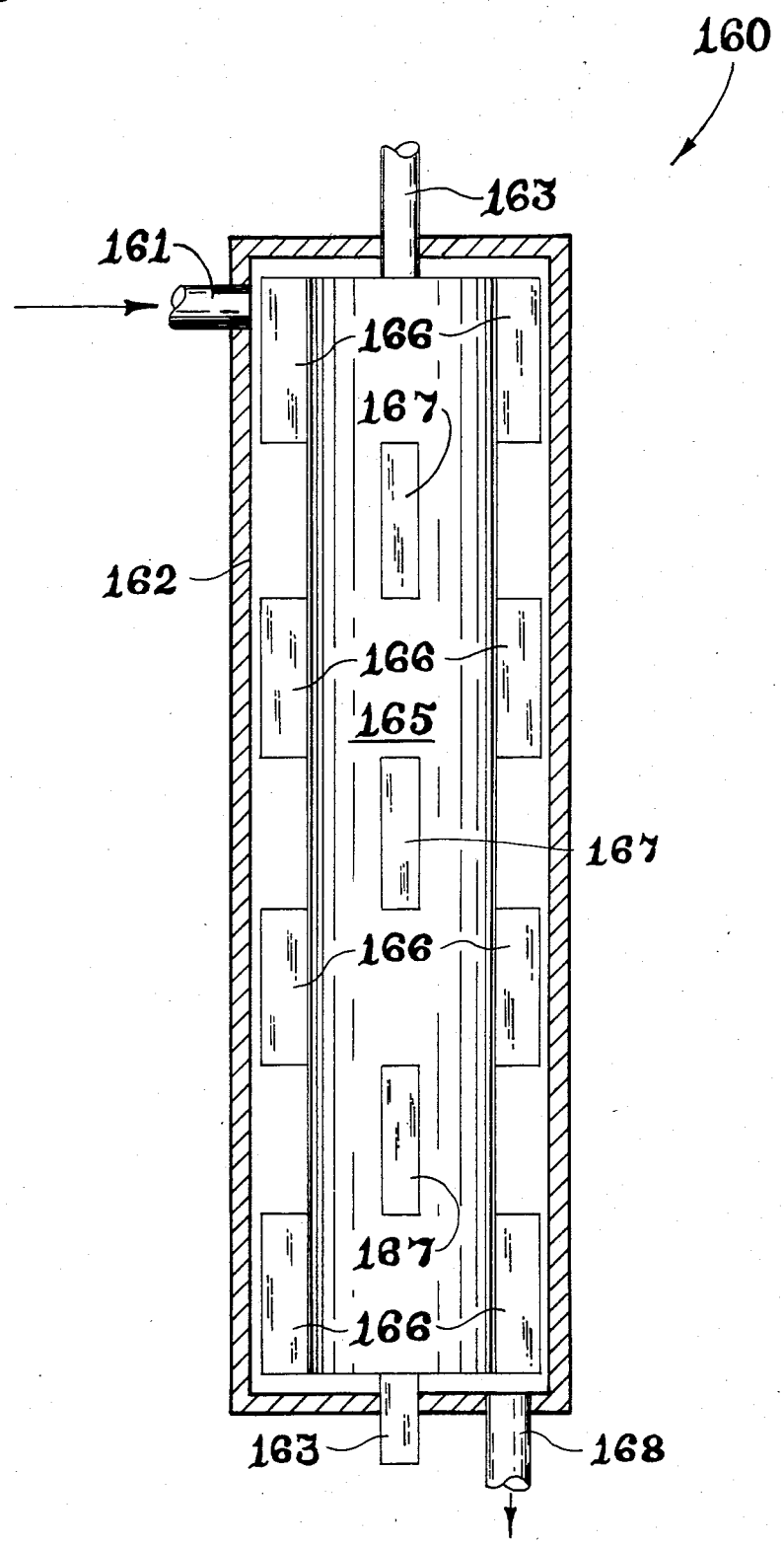
Figure 6:
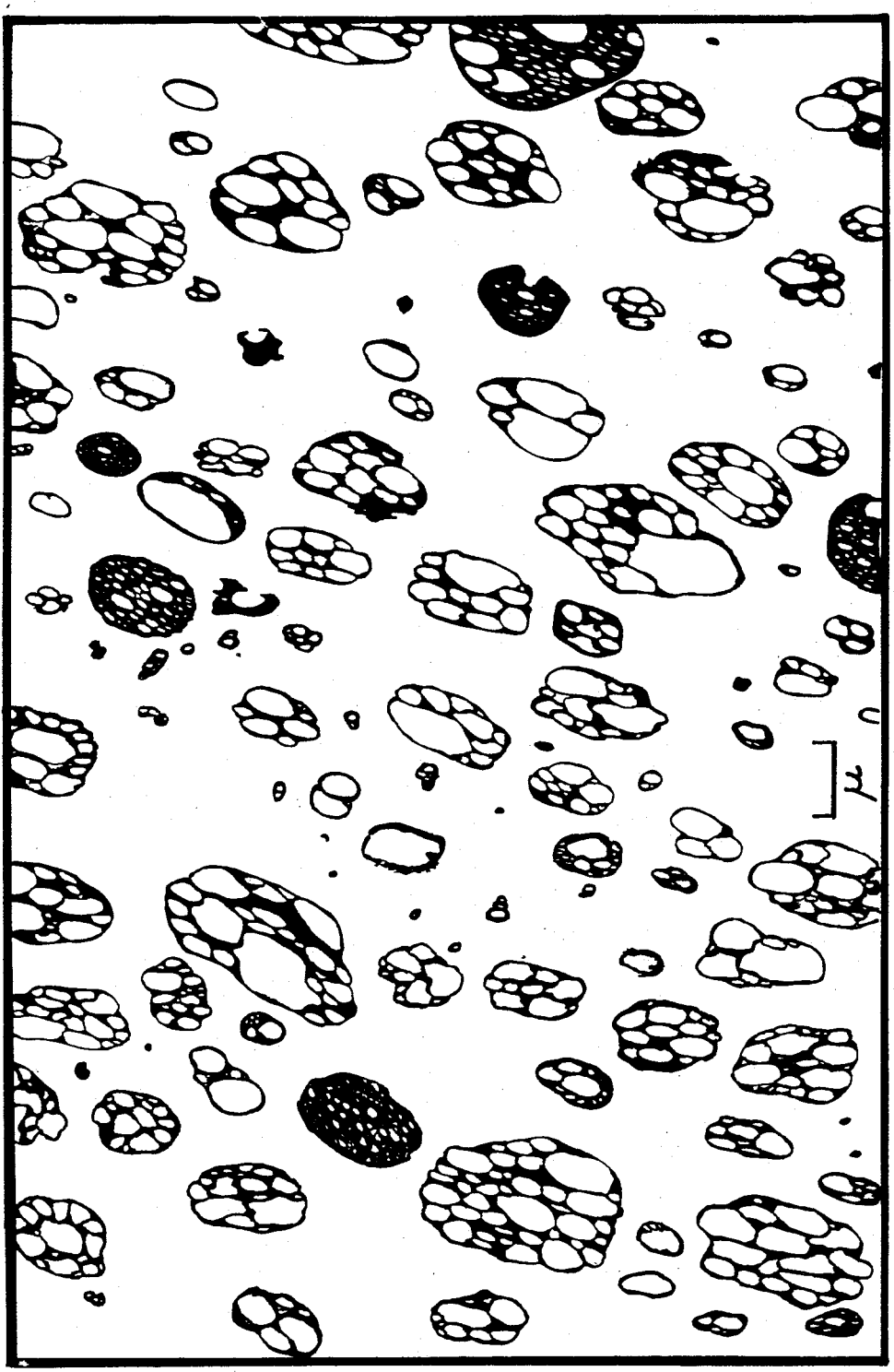

FIG. 4, in schematic portrayal, is a view showing one effective way for imposing shearing agitation in a reaction mass being processed;

FIG. 5, is a fanciful schematically depicted view basically illustrating a suitable sort of unit for preliminary PE-elastomer formation;

FIGS. 6–11, inclusive, are reproductions simulating and illustrating microphotographic impressions of various impact polymer products within and without the scope of the invention; and FIGS. 12–32, inclusive, are graphical presentations of various data and results relevant to comprehension and practice of the present invention.

MATERIALS AND COMPONENTS

(A) THE MAJOR MONOMERS

Styrene, as indicated, is very advantageous and desirable to utilize for provision of the major proportion, or matrix material, of the interpolymerized constituents of the products obtained. Of course, St is comparatively inexpensive and generally readily available. Further, it is easily convertible into very useful, good quality polymerizates.

Other alkenyl aromatic monomers in addition to St (or mixtures thereof or of such others with St) can also be beneficially employed. These include those of the Formula:

$$CH_2=CGAr, \qquad (I)$$

wherein G is selected from the Group consisting of hydrogen and methyl and Ar is an aromatic radical, including various alkyl and halo-ring-substituted aromatics of from 6 to about 10 carbon atoms. Besides St, species illustrations of the indicated alkenyl aromatic monomers are α-methyl styrene (i.e., "MeSt"), vinyl toluene (i.e., "VT"), the several chlorostyrenes (such as the mon- and dichlorovarients; i.e., the "ClSt's"), the dimethyl styrenes (i.e., "diMeSt's"), t-butyl styrene (i.e., "tbuSt"), the bromostyrenes (i.e., "BrSt's"), vinyl naphthalene and so forth.

There are many other ethylenically (oftentimes monoethylenically) unsaturated monomers suitable for use as major monomer(s) in practice of the present invention. These, in general, are capable of undergoing addition polymerization and are either copolymerizable with styrene and/or graftable with and on such "epoxy" materials (and interpolymerized products thereof) as AGE and other allylic (or vinyl) glycides, or both.

Many of these may be solely employed in the absence of St, per se, or even other alkenyl aromatic monomers as the matrix-forming monomer constituent. Or, they may be used in mixtures with other suitable monomers that may or may not contain St. In most instances, especially for particularized and/or specialty applications, such other monomers are adapted to produce very good quality impact-grade plastics products.

Nonetheless, many of such other useful monomers that are copolymerizable with St are advantageously employed in admixture therewith to provide a linear, addition-type copolymeric matrix material for and in the finally-obtained interpolymerized, PE-modified product.

Very good for such utilization is acrylonitrile (i.e., "VCN"). This monomer, when combined in apt proportions with St for use as the major monomer mass, yields quite advantageous ABS-type end products. However, as hereinafter indicated, care must be taken to avoid using VCN until after in situ polymerization of the polyether being made due to its tendency to interfere with the presently contemplated catalyst systems.

Besides VCN, other monomers beneficial to utilize include: (i) vinyl halides, particularly vinyl chloride (i.e., "VCl"); (ii) various vinyl organic acid esters such as vinyl acetate (i.e., "VAC"), vinyl propionate (i.e., "VProp"), etc.; (iii) vinylidene chloride (i.e., "VeCl"), (iv) acrylic acid (i.e., "HAcr") and its addition polymerizable esters; (v) methacrylic acid (i.e., "HMeAcr") and its addition polymerizable esters; (vi) maleic anhydride ("MA"), (vii) such fundamental olefins as ethylene (i.e., "Eth") and propylene (i.e., "Pro"); mixtures thereof; and so forth including mixtures with St and/or other alkenyl aromatic monomers.

The major monomer mass must accommodate the in situ polymerization of the PE-elastomer copolymer so that the reaction is conducted in a liquid fluid medium (with or without the presence of additional inert solvents, as hereinafter more fully particularized). This is so regardless of whether the preferred bulk (i.e., mass) or solution polymerization is followed. In this connection, pressurized polymerizations may be done. Sometimes this is advantageous (or even necessary) when volatility of the involved monomer is such as to either recommend or dictate same. Thus, inclusions of Eth and/or Pro are generally better under pressure to ensure effective use thereof in the reaction mass for both its PE-elastomer and subsequent addition monomer interpolymerization stages.

It is, moreover, a decided advantage for the addition-polymerizable monomer(s) employed to be used in very pure condition either as obtained or refined. Essential, if not complete, chemical purity is worthwhile.

The major monomer employed may be provided in an initial charge containing all of same to be utilized. Or, especially in multiple-stage operations, the initial charge can be less than the total to be used with the balance added at subsequent intervals of the polymerization. Such technique is often well applicable to continuous processing arrangements.

When the major monomer is comprised of St alone or any mixture, including St, of other alkenyl aromatic monomers, it is advantageous for enough of the Formula (I) monomer to be utilized in and for the overall reaction mass that the final interpolymerized product contains at least about half up to about 99 wt. %, based on final product weight, of therein polymerized Formula (I) monomer. This, often advantageously, is between about 70 and about 95 wt. %; it frequently being even more advantageously for it to be from about 80 to about 93 wt. %.

The balance of the final composition contains the interpolymerized PE-elastomer product. Of course, there is frequently incorporated therein such things as: fillers; pigments; dyestuffs; stabilizers; plasticizers and lubricants; other interblended additives and material additaments; and so forth.

The same or closely analogous proportions are usually appropriate for general compositional range limits when addition major monomer systems exclusive of Formula (I) monomers are utilized.

When the major monomer is a St/VCN mixture, it is usually desirable for the St to comprise at least about half of the total wt. % thereof. In any instance and as noted, when VCN is utilized, it cannot be introduced to the reaction mass until after completion of the PE polymerization because of its bad influence on the catalyst.

For incremental feeding of monomer admixtures, it is not necessary for supplemental charges to be in aliquot measures of the original mixed charge. Thus, subsequent given monomer interjections into following stages may be, relative to overall desired admixture recipe, St-rich (or -absent) and/or VCN-rich (or -absent); with the same applicable when other than VCN-containing major monomer mixtures are utilized. In fact, especially relevant to VCN inclusions which must be done after PE completion, it is often advantageous for a significant proportion (say, as much as 5 wt. % or even more of the total monomer admixture) of the entire quantity of the VCN to be used to be charged for terminal interpolymerization in the reaction mass preparative of final product. This can be either; (i) in the final operating stage of multi-stage operations; or (ii), especially in batch-processing, near the end of the interpolymerization procedure.

More often, a good St-VCN wt. % ratio range for advantageous utilization in such admixtures is within an approximate 50–95:50–5 respective proportional limit. Admixtures containing between about 20 and about 30 wt. % of the VCN are frequently found to be exceptionally desirable.

Admixtures of other combined major monomer systems, particularly when Formula (I) monomers are involved, are most often constituted and used in a way much like that explained for St/VCN mixtures.

It is also possible to employ major monomer admixtures containing three (and even more) individual monomer constituents. This can often be of added benefit for various specialty applications and objectives and/or for particular physical property effects in the interpolymerized polymer product. For example, impartation of inherent fire-retardancy, internal lubrication capability, and so forth may thus be done.

(B) MONOMERS FOR THE PE-ELASTOMER

Numerous and varied monomeric compounds of the epoxy family characterized in having a vicinal alkylene (or alkene) oxide structure can be satisfactorily utilized as precursors for the PE-elastomers formed in situ in the major monomer mass during the initial stage of the present process. These are generally of the Formula:

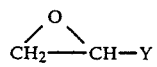

(II)

wherein Y represents $R_1$ or $CH_2OR_2$; $R_1$ represents H (or a "proton"), an aliphatic hydrocarbyl group of 1 to about 20 carbon atoms, a chloromethyl or a bromomethyl group; $R_2$ represents the acyl residue of a carboxylic or fatty acid of from 1 to about 30 carbon atoms or a hydrocarbyl group of from 1 to about 20 carbon atoms or inert substituents and, additionally, can be a phosphorous and/or fluorine-containing substance.

While not necessarily limited thereto, it is advantageous to get usually superior products when a minor proportion of the epoxy monomer precursor is an unsaturated form of one or more of the species of the Formula (II). Inclusion of unsaturated epoxy structures facilitates and tends to ensure effective graftability and attachment of the interpolymerized major monomer in the finally-obtained PE-elastomer-modified product. Otherwise, poorly grafted interpolymerizates may be obtained. These, while not entirely dissatisfactory or useless, tend to frequently have less desirable impact characteristics and properties, especially as regards maximized impact strengths. In this, they behave more like impact materials which are mere mechanical rubber/polymer blends or mixtures. In these, rather large proportions of rubber must frequently be employed for noticeable impact strength effects, with this, to an extent, militating against suitable retention of other properties desired to have in the impact product.

Usually, not more than about 30 mole % of an unsaturated Formula II monomer should be employed with a saturated variety of same for preparation of the PE-elastomer. Too much of the unsaturated constituent causes excessive gel formation resulting from excessive grafting and crosslinking in the final interpolymerized product. Such overly grafted material often diminishes desirable properties wanted for the HIPPO (or the like or analogous) material. It may even cause difficulty in manufacture. More advantageously, between about 3 and about 20 mole % of the Formula (II) monomer is utilized. Most satisfactory results are oftentimes had when the mole % range thereof is from about 5 to about 12. A Formula (II) monomer content in the neighborhood of about 10 mole % is frequently optimum.

In this connection, PO is most advantageously a usually good saturated monomer for PE-elastomer preparation.

Allyl Glycidyl Ether AGE (especially in combination with major proportions of "PO") is especially suitable for PE-elastomer-making. Yet, other varieties of unsaturated Formula (II) monomers included in the following tabulation are also suitably applicable:

TABLE I

SELECT UNSATURATED "GRAFTING MONOMER" STRUCTURES OF FORMULA (II)

| Monomer | Structure |
|---|---|
| Allyl Glycidyl Ether ("AGE") | $H_2C=CH-CH_2-O-CH_2-\overset{O}{\overset{/\diagdown}{CH-CH_2}}$ |
| Glycidyl Acrylate ("GlAcr") | $H_2C=CH-\overset{O}{\overset{\parallel}{C}}-O-CH_2-\overset{O}{\overset{/\diagdown}{CH-CH_2}}$ |
| Glycidyl Methacrylate ("GlMeAcr") | $H_2C=\underset{\underset{CH_3}{\mid}}{C}-\overset{O}{\overset{\parallel}{C}}-O-CH_2-\overset{O}{\overset{/\diagdown}{CH-CH_2}}$ |

TABLE I-continued
SELECT UNSATURATED "GRAFTING MONOMER" STRUCTURES OF FORMULA (II)

| Monomer | Structure |
|---|---|
| Glycidyl Sorbate ("GlS") | $H_2C=CH-CH=CH-CH-\overset{O}{\overset{\|}{C}}-O-CH_2-CH\overset{O}{\diagdown}CH_2$ |
| p-Vinylphenyl Glycidyl Ether ("VGlE") | $H_2C=CH-\text{(phenyl)}-O-CH_2-CH\overset{O}{\diagdown}CH_2$ |
| Norbornenylmethyl Glycidyl Ether ("NGlE") | (norbornenyl)$-CH_2-O-CH_2-CH\overset{O}{\diagdown}CH_2$ |
| Butadiene Monoxide ("BuO") | $H_2C=CH-CH\overset{O}{\diagdown}CH_2$ |
| Methallyl Glycidyl Ether ("MeGlE") | $C=C-C-O-C-C\overset{O}{\diagdown}C$ with $C$ branch |
| Glycidyl Cinnamate ("GlCn") | $H_2C=CH-\overset{O}{\overset{\|}{C}}-O-CH_2-CH\overset{O}{\diagdown}CH_2$ with $\phi$ branch |

Generally, the monomers of the Formula (II) satisfactory for present purposes should have a glass transition temperature (Tg) that is below about −60° C. and not be crystalline in nature. This allows preparation of low-Tg PE-elastomers which seem to give best results in practice of the invention.

Obtaining desired results depends importantly on use of appropriate coordination catalyst materials, as hereinafter disclosed and delineated.

In any event, the ability of the monomers of Formula (II) to be polymerized by the contemplated coordination catalyst systems hereinafter described depends on several factors. The detrimental effects of active H-containing impurities on catalyst activity will be subsequently brought forth. There is also a frequent requirement of special preparatory techniques for polymerization of certain carbonyl-containing epoxides, also latter described. However, a most important variable tending to limit the ability of monomers to polymerize is the steric factor. The monomers listed in following Table II can be solution polymerized using 2.26 mole % phenothiazine-containing catalyst at temperatures ranging from 90°–110° C. Table II also includes indication of use of toluene (TO) or St as solvents for the polymerization. The ability to polymerize in St is important for much HIPPO manufacture. All the Table II monomers are α-β-epoxides. Table II does not re-include any of the grafting monomers shown in Table I (all of which previously-identified species, by the way, are polymerizable in St).

TABLE II
MONOMERS OF FORMULA (II) THAT POLYMERIZE AND/OR COPOLYMERIZE

| Structure | Compound | Solvent |
|---|---|---|
| $CH_2\overset{O}{\diagdown}CH_2$ | Ethylene Ixide ("EO") | TO |
| $CH_2\overset{O}{\diagdown}CH-CH_3$ | Propylene Ixide ("PO") | TO/ST |
| $CH_2\overset{O}{\diagdown}CH-CH_2-CH_3$ | Butylene Oxide ("BuO") | TO |

TABLE II-continued
MONOMERS OF FORMULA (II) THAT POLYMERIZE AND/OR COPOLYMERIZE

| Structure | Compound | Solvent |
|---|---|---|
| $\underset{CH_2Cl}{\overset{O}{CH_2-CH}}$ | Epichlorohydrin ("EPI") | TO/St |
| $CH_2\overset{O}{-}CH-CH_2O-CH_2CH_2CH_2CH_3$ | n-Butyl Glycidyl Ether ("n-BuGlE") | TO/St |
| $CH_2\overset{O}{-}CH-CH_2O-C(CH_3)_3$ | t-Butyl Glycidyl Ether ("t-BuGlE") | TO |
| $CH_2\overset{O}{-}CH-CH_2O\text{+}CH_2\text{)}_7CH_3$ | n-Octyl Glycyl Ether ("n-OctGlE") | TO |
| 2-ethylhexyl structure | 2-Ethylhexyl Glycidyl Ether ("EthHexGlE") | TO |
| $CH_2\overset{O}{-}CHCH_2O-\text{Ph}$ | Phenyl Glycidyl Ether | St |
| $CH_2\overset{O}{-}CH-CH_2OCH_2-\text{Ph}-CH=CH_2$ | p-Vinylbenzyl Glycidyl Ether ("VGlE") | St |
| DER 332 bisphenol A diglycidyl ether structure | "DER 332" (from The Dow Chemical Company) | TO/St |

It is noteworthy when "R" is a single methyl group as in PO, or an ethyl group (as in butylene oxide—i.e., "BuO"), polymerization goes to very high yields. However, if "R" is two methyl groups (as in isobutylene oxide—i.e., "IsoBuO") or a phenyl ring (styrene oxide—"StO"), little or no polymerization seems to occur at temperatures as high as 150° C.

Monomers containing α-β-epoxy groups of the type

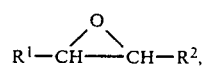

$$R^1-CH\overset{O}{-}CH-R^2,$$

also do not tend to undergo polymerization. 2,3-Epoxybutane ("EpBut") as well as cyclohexene oxide do not polymerize under the prescribed conditions for and with the useful coordination catalysts. Table III lists several monomers that do not appear to polymerize under influence of the presently-contemplated catalyst systems.

TABLE III
EPOXIDIZED MONOMERS THAT DO NOT POLYMERIZE

| Structure | Compound | Solvent |
|---|---|---|
| $CH_2\overset{O}{-}C(CH_3)_2$ | Isobutylene oxide | TO |
| $CH_2\overset{O}{-}CH\text{-Ph}$ | Styrene Oxide | TO |
| $CH_3-CH\overset{O}{-}CH-CH_3$ | 2,3-Epoxybutane | TO |
| $ClCH_2-CH\overset{O}{-}CH-CH_2Cl$ | 1,4-Dichloro-2,3-epoxybutane | TO |

TABLE III-continued

| | EPOXIDIZED MONOMERS THAT DO NOT POLYMERIZE | |
|---|---|---|
| Structure | Compound | Solvent |
| 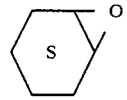 | Cyclohexene oxide | TO |
| 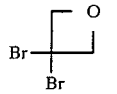 | 3,3-Bis-bromo-methyl oxetane | TO |

Additionally, an oxetane (namely, 3,3-bis-bromoethyl oxetane) also, upon testing, did not polymerize.

From Table III is observed the sensitivity of the catalyst towards steric inhibition. The presence of a gem-dimethyl group, when part of the epoxide ring, appears sufficient to completely retard polymerization. The same phenomenon occurs by using β-γ-epoxides. All of this is probably due to some phenomenon associated with the involved polymerization mechanism.

Significantly, interpolymerized products having innate or "built-in" reduced ignition tendencies can be had by utilizing for their preparation suitable proportions of halogenated and/or phosphorous-containing monomer precursors for the PE-elastomer. These, for example, include such monomers of the Formula (II) as EPI and/or certain perfluorinated PE-forming monomers and/or certain phosphorous-containing PE-forming monomers.

When (as is somewhat common) the PE-elastomer is made of Formula II monomer mixtures that are actually combinations of "grafting monomers" of the ethylenically-unsaturated sort revealed in Table I and non-ethylenically-unsaturated versions as illustrated in Table II, it is desirable for the grafting monomer to be in relatively minor proportion therein. Otherwise, excessive (and even intolerable) cross-linking and gel formation may be caused in the finally-obtained interpolymerized product. Usually, not more than about 25 mole % of grafting monomer should be employed in any such mixture. More often, this minor proportion is on a scale of from about 0.05 to about 15 mole %. More advantageously, it is between about 0.1 and about 10 mole %. Increasing the proportion of the grafting monomer in a Formula (II) monomer mixture much above about the 5 mole % level often gives only marginal, if any, real improvement in end product properties. The level depends considerably upon the chemical composition of the grafting monomer.

It is of obvious economic advantage to use only a really effective quantity of the relatively expensive grafting monomers, such as AGE, for PE-elastomer preparation.

For determination of optimum levels of grafting monomer to employ, concentrations effect investigations can be undertaken. Consideration therefrom of general physical properties, especially impact strength, imparted to the interpolymerized end product with varying proportions of the grafting monomer present in the PE-elastomer to be made reveals involved efficacy. AGE/PO mixtures are well suited for such testing with St as the major monomer employed.

For such investigations, two rubber levels in final product may be used. For example, respective loadings (based on wt. % in final product) of 10% and 20% rubber can be tested. This helps ensure that an observed effect of AGE on properties at a certain rubber level should hold at other rubber levels. Table IV and V show effects of changing AGE concentration on properties of the HIPPO resins at the respective 10% and 20% loadings.

The tabulated data indicates that the effective gel phase increases as percent AGE increases. This is probably due to enhanced grafting (since more grafting sites are made available at higher concentrations of AGE). The same likely accounts for enhanced cross-linking as AGE concentration increases (as can be noted from decreasing percent swell values). At 10% rubber loading, the overall increase in $T_R$ is usually much greater than that in $T_Y$ with increasing AGE. However, at 20% rubber loading, the opposite effect is usually noted. The overall increase in $T_Y$ is much greater than that in $T_R$.

Figure 12:
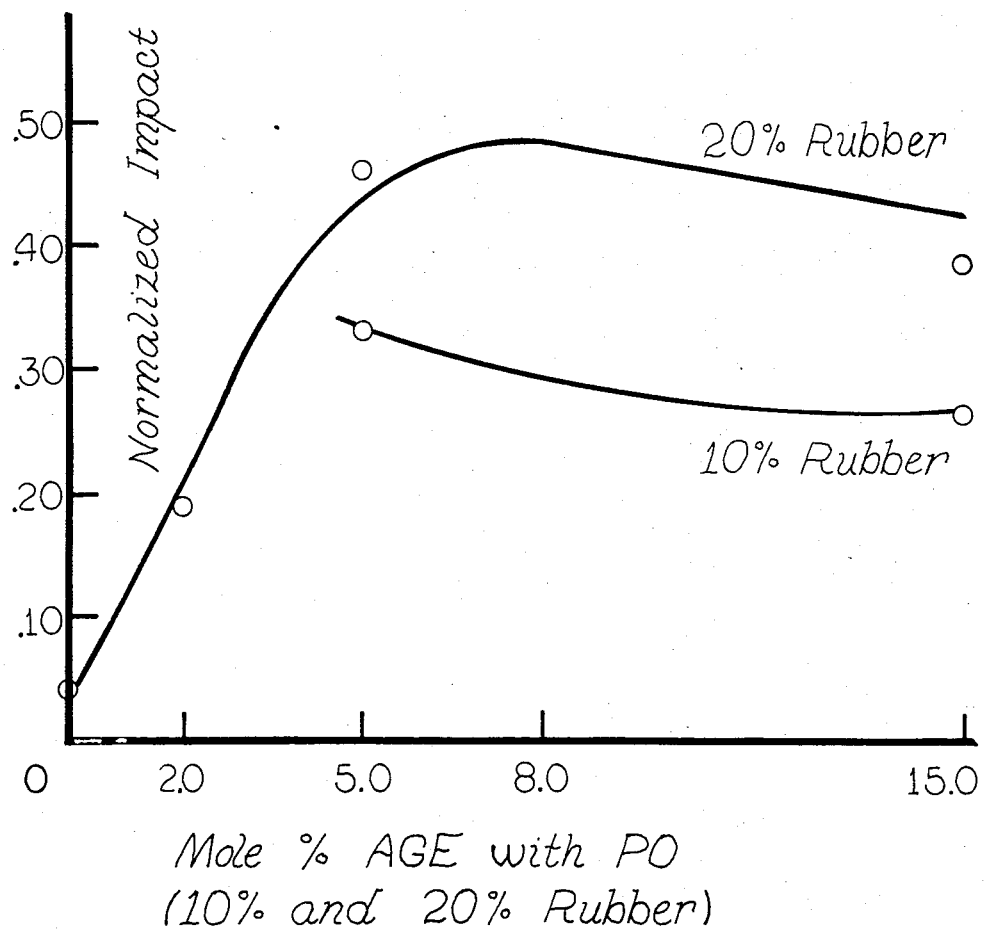

As for impact strengths, those in products derived from PE-elastomers using about 5 mole % AGE seem to be better than at other concentrations. This is despite the attainment of higher effective gel phase volumes at higher AGE concentrations. FIG. 12 of the annexed Drawing shows a plot of normalized impact values vs. AGE concentration for both 10% and 20% rubber loadings. It usually appears in such testing that 5 mole % AGE provides a sufficient number of grafting sites and/or cross-linkable sites to obtain optimal impact strength. At levels higher than this and as indicated, impact strength values tend to stabilize or even decrease slightly.

TABLE IV

EFFECT OF AGE CONCENTRATION ON PHYSICAL PROPERTIES OF HIPPO AT 10% RUBBER LOADING

| Mole % AGE* | % Rubber | % Gel | Swelling Index | Notched Izod Impact (Ft-lbs/in) | Normalized Impact | $T_Y$ (psi) | $T_R$ (psi) | % Elong. | Tensile Modulus (psi × 10⁵) | Vicat HD (°C.) | Melt Flow (Schedule G) (g/10 min) |
|---|---|---|---|---|---|---|---|---|---|---|---|
| 5.0 | 10.4 | 12.3 | 31.0 | 3.54 | 0.337 | 3139 | 1994 | 29.3 | 3.28 | 91 | 0.398 |
| 8.0 | 8.7 | 14.9 | 24.6 | 2.59 | 0.298 | 2972 | 2218 | 32.6 | 3.41 | 95 | 0.480 |
| 15.0 | 10.4 | 20.2 | 23.5 | 2.82 | 0.271 | 3609 | 3026 | 25.9 | 3.37 | 99 | 0.390 |

*AGE Used With PO as Comonomer In All Cases For TABLES IV and V Compositions.

TABLE V

EFFECT OF AGE CONCENTRATION ON PHYSICAL PROPERTIES OF HIPPO AT 20% RUBBER LOADING

| Mole % AGE* | % Gel | Swelling Index | Notched Izod Impact (Ft-lbs/in) | Normalized Impact | $T_Y$ (psi) | $T_R$ (psi) | % Elong. | Tensile Modulus (psi × 10⁵) | Vicat HD (°C.) | Melt Flow (Schedule G) (g/10 min) |
|---|---|---|---|---|---|---|---|---|---|---|
| 0 | 0 | 0 | 0.90 | 0.046 | 915 | 1491 | 1.4 | 2.92 | 90 | 3.37 |

TABLE V-continued
EFFECT OF AGE CONCENTRATION ON PHYSICAL PROPERTIES OF HIPPO AT 20% RUBBER LOADING

| Mole % AGE* | % Gel | Swelling Index | Notched Izod Impact (Ft-lbs/in) | Normalized Impact | $T_Y$ (psi) | $T_R$ (psi) | % Elong. | Tensile Modulus (psi × $10^5$) | Vicat HD (°C.) | Melt Flow (Schedule G) (g/10 min) |
|---|---|---|---|---|---|---|---|---|---|---|
| 2.0 | 11.2 | 41.9 | 4.03 | 0.195 | 425 | 1150 | 2.0 | 2.23 | 93 | 0.419 |
| 5.0 | 21.2 | 28.0 | 7.82 | 0.474 | 2188 | 1366 | 14.4 | 2.19 | 95 | 0.336 |
| 8.0 | 22.8 | 28.0 | 6.47 | 0.335 | 2120 | 1291 | 24.6 | 2.33 | 98 | 0.264 |
| 15.0 | 26.9 | 21.8 | 6.65 | 0.391 | 2421 | 1953 | 31.9 | 3.18 | 94 | 0.722 |

*AGE Used With PO As Comonomer In All Cases, For TABLES IV and V Compositions.

Table VI lists various grafting monomers and physical properties of HIPPO products derived from PE-elastomers using them. AGE was included as a reference point for the other monomers. The effectiveness of the others was thus comparable on their ability to enhance the physical properties of the resulting HIPPO as to those obtained using AGE. Note that the three monomers following AGE are highly reactive at the olefinic portion of the monomers. And, at the employed concentrations, they result in unmanageable cross-linked rubber networks. The last four monomers listed in Table VI are, for general purposes, reasonable substitutes for AGE. Good impact strengths are obtainable with low rubber phase volumes (percent gel) using BuO and MeGlE.

As is also brought forth in Table VI, both NGIE and GlCn are excellent substitutes for and equivalents of AGE; the latter being sometimes selected in such substitution for reasons of its performance as an impact strength improver.

The necessary coordination catalyst for preliminary in situ PE-elastomer formation is one in accordance with that disclosed in the copending (and commonly assigned) Application of David L. Wolfe and Fred P. Corson, having Ser. No. 274,135, concurrently filed June 16, 1981, now U.S. Pat. No. 4,376,723 the same and its full disclosure being herein incorporated by reference. Such catalyst system(s) are especially good for polymerization of the Formula (II) monomers into suitably high molecular weight polyethers.

Accordingly, the advantageous catalyst systems are comprised of a resultant componented composition that has been prepared by ingrediental contacting of:

(a) Component A, which is a compound symbolized by the Formula:

$$RR'AlX \qquad (III)$$

wherein R and R' each independently represent an alkyl group of 1 to about 4 carbon atoms and X

TABLE VI
EFFECT OF GRAFTING MONOMER ON PROPERTIES OF HIPPO

| Monomer | Mole % With PO | Wt. % Rubber | % Gel | Swelling Index | Notched Impact (Ft-lbs/in) | Normalized Impact | $T_Y$ (psi) | $T_R$ (psi) | % Elong. | Tensile Modulus (psi × $10^5$) | Vicat HD (°C.) | Melt Flow (Schedule G) (g/10 min) |
|---|---|---|---|---|---|---|---|---|---|---|---|---|
| AGE | 5.0 | 10.4 | 12.3 | 31.0 | 3.54 | 0.340 | 3139 | 1994 | 29.3 | 3.25 | 91 | 0.398 |
| ClAcr | 0.1 | — | Crosslinked | | — | — | — | — | — | — | — | — |
| GlMeAcr | 0.1 | — | Crosslinked | | — | — | — | — | — | — | — | — |
| GlS | 0.1 | — | Crosslinked | | — | — | — | — | — | — | — | — |
| ("VPhGlE")* | 1.0 | 7.2 | 44.6 | 23.0 | 0.38 | 0.053 | 4424 | 2788 | 12.6 | 3.71 | 93 | 0.092 |
| NGIE | 15.0 | 6.1 | 13.2 | 24.1 | 1.01 | 0.166 | 3753 | 2856 | 9.9 | 3.83 | 99 | 2.208 |
| BuO | 5.0 | 10.9 | 4.2 | 41.7 | 1.29 | 0.118 | 2193 | 1245 | 3.8 | 3.39 | 78 | 3.040 |
| MeGlE | 5.0 | 10.4 | 4.3 | 39.1 | 1.92 | 0.185 | 2707 | 2267 | 28.8 | 3.20 | 96 | 0.49 |
| GlCn | 2.0 | 10.3 | 21.2 | 28.7 | 2.61 | 0.253 | 2669 | 1911 | 18.0 | 2.86 | 95 | 0.47 |

*p-Vinylphenyl Glycidyl Ether

The cross-linking propensity of the particular grafting monomer(s) utilized also plays an important part in determination of the quantity of any given species thereof to be utilized in a PE-elastomer to be made. In this, the effectiveness and suitability of any given grafting monomer should be judged on ability thereof to achieve most desired properties and property-balances in the HIPPO (and like or analogous) products obtained. Thus, highly reactive monomers tending to cause excessive cross-linking in the product should be employed with great caution. When utilized, they should be sparingly employed. In such instances, notwithstanding the guide-line proportions, contents set forth above for them, grafting monomers of pronounced cross-link-inducing character should be used in amounts much lower than the given lowest limit; these going down in a vanishing point direction to minimum of as little as 0.01 or even 0.001 mole % of total Formula II monomer involved.

(C) CATALYST SYSTEM(S)

represents hydrogen or an alkyl or alkoxy group of 1 to about 4 carbon atoms (b) Component B, an organic nitrogen-based compound selected from secondary nitrogen-containing compounds that have a basicity which is about equal to or less than the basicity of dimethylamine and no active hydrogen atoms therein (other than those of the secondary nitrogen);

(c) Component C, a β-diketone; and (d) Water as Component D, with the contacting being done in the molar ratios of:

B:A—about 0.01–2.5:1 (optimum 0.05–0.7, best 0.25:1);

C:A—about 0.01–1.5:1 (optimum 0.2–0.8, best 0.5:1); and

D:A—about 0.1–1.5:1 (optimum 0.2–0.9, best 0.5–0.8:1);

all provided that when the molar ratio sum of (C+2D):A is greater than about 3:1, then the B:A molar ratio must at least be about 1:1.

By varying the secondary amine content from about 0.5 up to about 2.5 moles per mole of aluminum present in the catalyst system(s), a wide variety of PE-elastomer products may be polymerized from the precursor monomers (and their mixtures) of the Formula (II). These products, quite advantageously for present purposes, are of very high molecular weight. They generally have intrinsic viscosities significantly greater than previously attainable by other known means. This is particularly evident using catalyst derived from the preferred secondary amines in a B:A molar ratio of about 0.1 to about 0.5:1. High molecular weight PE's of satisfactory character for present purposes (and having intrinsic viscosities similar to those attainable with recognized catalysts) are also obtained when the employed catalyst comes from a more basic secondary amine.

The very high molecular weight PE-elastomers obtained with the subject catalyst system(s) exhibit non-Newtonian flow properties. Thus, solutions of such PE's thicken under shearing forces applied thereto.

In preferred modes, Component A is a compound in which X in the Formula III represents an alkyl group. In yet more preferred modes, the R, R' and X constituents of the Formula (III) all represent the same alkyl group. Most preferably, the Component A is triethylaluminum (i.e., "TEA"). Examples of other suitable compounds to employ as Component A are trimethylaluminum, triisobutylaluminum, tri-n-propylaluminum, tri-n-butylaluminum, diethylaluminum hydride, dipropylaluminum hydride, diisobutyl aluminum hydride, diethyl ethoxy aluminum, diisobutyl ethoxy aluminum and mixtures thereof.

The "active hydrogen atoms" alluded to in connection with Component B of the catalyst system(s) are those which are commonly identified as Zerewitoff hydrogen atoms. The determination of these can be made by the method set forth in *Journal of the American Chemical Society*, 49:3181 (1928). Such sorts of hydrogen atoms effectively initiate alkylene oxide polymerizations. They are generally found on hydroxyl-, thio-, primary- and secondary-amines. Secondary amines of the indicated sort are commonly those bearing electron-withdrawing groups in close proximity to the nitrogen atom. The same are typified by: carbonyl groups; phenyl rings; cyano groups; halo groups; carboxylic acid or ester groups; and other such groups that have strong electron-withdrawing effects on the secondary amine. These sorts of groups are present in such compounds as N-alkyl- or aryl-amides, arylalkylamines, diarylamines and other weak bases. While secondary amines having a $pK_b$ of greater than about 4 are suitable, those having $pK_b$ of greater than about 6 are preferred.

Examples of satisfactory secondary amines for Component B usage are: dimethylamine; diethylamine; N-methylaniline; N-methyl-p-nitroaniline; N-alkylacetamide; N-arylacetamide; succinimide; diphenylamine; phenothiazines; phenoxazines; and their mixtures. Especially advantageous for such usage are phenothiazine (i.e., "PhTh") and N-acetamide. Other bases meeting the criteria set forth above may be employed, provided they are imbued with appropriate relative basicity against the standard dimethylamine as may be determined by test according to known standard procedures.

Component C is either a β-diketone or a tautomeric enol form thereof. Suitable, for example, are: 2,4-pentanedione; 2,4-hexanedione; 3,6-heptanedione; 1-phenyl-1,3-butanedione; ethylacetylacetate; similar materials; and mixtures thereof. Examples of numerous suitable β-diketones for use as Component C ingredients are described in U.S. Pat. No. 2,866,761. Preferred for use as Component C is 2,4-pentanedione (much of this preference being due to its ready availability).

Advantageously, the defined Components are employed so as to be combined in a ratio wherein (B+C+2D):A is less than or equal to about 3:1. Preferably, this ratio is less than about 2:1.

For purposes of particularized demonstration, excellent high intrinsic viscosity PE-elastomers are prepared from monomers of the Formula (II) when the componential molar ratios of ingredients in the catalyst system are so proportioned that B:A is about 0.25:1; C:A is about 0.5:1; and D:A is about 0.625:1. Highly efficacious embodiments of the catalyst simultaneously employ PhTh or N-methylacetamide as Component B and 2,4-pentanedione (i.e., "2,4-P") as Component C.

For present purposes, a catalyst system (prior to addition to the reaction mass in which the solute monomer(s) of Formula (II) are dispersed in the major Formula (I) or equivalent monomer(s) solvent) may be preliminary prepared by contacting, in desired ratios, the four Components in any of the common hydrocarbon or chlorinated hydrocarbon diluents employed for organic reactions; this being the case so long as the solvents do not bear Zerewitoff hydrogen atoms. Suitable diluents for such pre-composed catalyst systems include, for example, hexane, toluene (TO), benzene, decane, chlorobenzene, trichloroethane, perchloroethane and the like and their mixtures. Nonetheless, care should be taken for the indicated reason of possible catalyst activity interference to avoid use of such other common solvents as certain ethers (like dioxane), tetrahydrofuran ("THF"), glycol diethers and the like, which often contain active hydrogen impurities.

The Components A, B, C and D can be combined in any desired order. It is, however, often preferable to combine Components B, C and D by first mixing them well together and, thereafter, adding Component A to the three-component mixture. In this way, the formed catalyst system is well adapted to provide quality rubbery PE-elastomer products of the highest intrinsic viscosity. Initial combinations of Components A, B and C with finishing addition of Component D provides a catalyst system capable of producing PE-elastomers of usually satisfactory, although somewhat diminished, intrinsic viscosity.

It is generally best to directly prepare the catalyst in situ in the major monomer of Formula (I) or equivalents thereof in the reaction mass. Again, this is preferably done by combining Components B, C and D in the desired quantity of monomer, with which it is usually beneficial to include additional solvent; then and thereafter adding Component A to the mixture. The preliminary in situ PE-elastomer polymerization is then commenced and/or allowed to proceed. The Formula (II) monomers thereby also act as co-solvents for the catalyst prior to initiation of the polymerization.

Several quite relevant factors apply to most satisfactory usage of the catalyst system(s). These are conspicuous to get best polymerization rates for in situ provision of the PE-elastomers and/or relatively high molecular weights thereof. One of these, as above noted, is the absence of active hydrogen or carbonyl compounds in the functioning system. Others of importance include: basicity of the amine used in a given catalyst system; polarity of involved solvent or solvent media; effective temperature of polymerization; and (also noted in the foregoing) addition order of components in any given catalyst system make-up.

It is worthwhile to utilize the best means for measuring molecular weight of the prepared PE-elastomers. This helps to better perceive the workability (and limitations thereon) of the involved catalysts.

Conventional approaches to molecular weight measure of the PE-elastomers are often not appropriate. This is usually due to plugging effects because of the propensity of PE polymers to "thicken with shear". It is especially troublesome with such techniques as gel permeation chromatography for molecular weight estimation. Nonetheless, dissolved concentrations of less than about 0.06 wt. % of the PE-elastomer generally do not undergo the shear thickening phenomenon. Giving proper regard to this, intrinsic viscosity (i.e., $[\eta]$ is a good way for characterization and comparison of the relative molecular weights in the involved PE-elastomers.

Accordingly (and since), per the given Equation, intrinsic viscosity is related to molecular weight:

$$[\eta] = MK^\alpha \tag{1}$$

wherein K is a constant, M is molecular weight and $\alpha$ is another constant (correlated to the degree of configurational coiling in the architecture of an involved polymer).

The value of $[\eta]$ is most frequently determined by plotting measured specific viscosity/concentration of polymer in solution ($\eta_{sp}$) vs. conc. and extrapolating to zero concentration (i.e., "conc."), it being dependent upon the solvent and temperature used during measurements. Toluene (TO) is a good solvent for the purpose. And, 100° F. (38° C.) is an apt temperature at which to measure $\eta_{sp}$, per the Equation:

$$\eta_{sp} = \frac{t - t_o}{t_o}, \tag{2}$$

wherein t is the efflux time of solution and $t_o$ is the efflux time of solvent.

Efflux times are readily measurable in an Ostwald viscometer taking values of solutions at several different concentrations. Usually 1–2 g of the polymer solution ($\simeq$30% solids) is dissolved in TO overnight with stirring. It is then volumetrically diluted to $\simeq$100 ml. Aliquots of 2 ml, 5 ml, and 15 ml from this stock solution are then further diluted to: 10 ml; 10 ml; and 25 ml, respectively, with more TO. Efflux times are then measured on the stock solution, each of the three solutions and on TO. With the viscometer employed, TO had a $t_o$ of 30.6 sec.; while t for the most concentrated solution being tested is best kept below 200 sec. by adjusting concentration.

Concentration for each diluted solution is simply calculable from the concentration of the stock solution. Three samples of this stock solution are then ordinarily weighed into aluminum dishes from which they are devolatilized in a vacuum oven at 100° C. overnight (under a normal line vacuum). The aluminum dishes are then reweighed to determine the weight of pure polymer remaining. Concentration is then calculated as wt. %. This method of determining concentration is quite convenient since concentration normally associated with measuring $[\eta]$ is reported in the literature as "grams/deciliter". Therefore, values for concentration so determined are higher by a factor corresponding to the density of TO (0.8502 g/cc at 38° C.). Values for $\eta_{sp}$/conc. and $[\eta]$ are correspondingly, therefore, lower by this factor also. Consistent with this, the herein given $[\eta]$ values are corrected for the density factor, with $[\eta]$ being herein reported in units of dl/g.

Since there was normally some polystyrene present in the polyether during the specific viscosity determination the measured $[\eta]$ was corrected by using the following relation:

$$[\eta]_{mixt} = [\eta]_{PS} W_{PS} + [\eta]_{PE} W_{PE}$$

where
$[\eta]_{mixt}$ = intrinsic viscosity of the mixture in dl/g;
$[\eta]_{PS}$ = intrinsic viscosity of the polystyrene (usually 0.77 dl/g)
$[\eta]_{PE}$ = intrinsic viscosity of the polyether, dl/g;
$W_{PS}$, $W_{PE}$ = weight factors of polystyrene and polyether.

This relation was verified experimentally with mixtures of pure polystyrene and pure polyether.

The catalyst system(s) are typically prepared, by adding TEA to a solution containing acetylacetone, water, amine, epoxides, and solvent (particularly major monomer solvent). This order of addition is instrumental in obtaining good catalyst activity.

As stressed, catalyst activity is very dependent upon the level of "impurities" present during the addition of TEA or the like. Excess active-hydrogen containing impurity will tend to destroy the catalyst, thereupon liberating either ethane or ethylene and resulting in the formation of the corresponding aluminum salt. Examples of such impurities include water, alcohols, phenols, thiols, amines, imines, amides, and carboxylic acids.

The detrimental effects of the active-hydrogen containing impurities may be overcome by either increasing catalyst concentration or by removing the impurities. Usually something in the neighborhood (and without associated limitation) of 2.26 mole % catalyst (based on moles epoxide charged) may be used for polymerization of the epoxides.

Low catalyst levels are usually sufficient, since the purity of the involved monomers of Formula (II) is generally quite high. Levels of alcoholic impurities in glycidyl ethers, which are prepared via the alcohol/chlorohydrin route, are observable using the infrared spectroscopy to locate the —O—H stretch located at $\simeq$3510 cm$^{-1}$. The effect of alcoholic impurity concentration on $[\eta]$ indicate that alcoholic impurities should be kept below $\simeq$0.037 moles alcohol/liter epoxide to achieve optimum molecular weights at a 2.26 mole % catalyst charge level. At impurity levels appreciably above this, catalyst loadings up to 5 mole % are appreciable. This limit is obviously susceptible of some variation (although it does precisely apply to BuGlE) since given epoxides have diverse molecular weights, densities, etc. In most cases, however, epoxides containing impurities that have $A°_{3500\,cm-1} \simeq 0.03$ are consistently polymerizable to very high molecular weight polymer products.

One good way to maintain catalyst efficiency in catalyst-charged systems containing high levels of impurities (usually alcohols) is to remove them by a technique wherein the epoxides involved are titrated with n-butyllithium under a dry nitrogen blanket using 9-phenylfluorene indicator until a yellow endpoint is reached. The epoxide is then flash distilled away from the lithium salts under vacuum. This purification technique is generally capable of being carried out at room temperature (except in the case of EO for which the titration should be conducted at ice bath temperatures).

Figure 13:
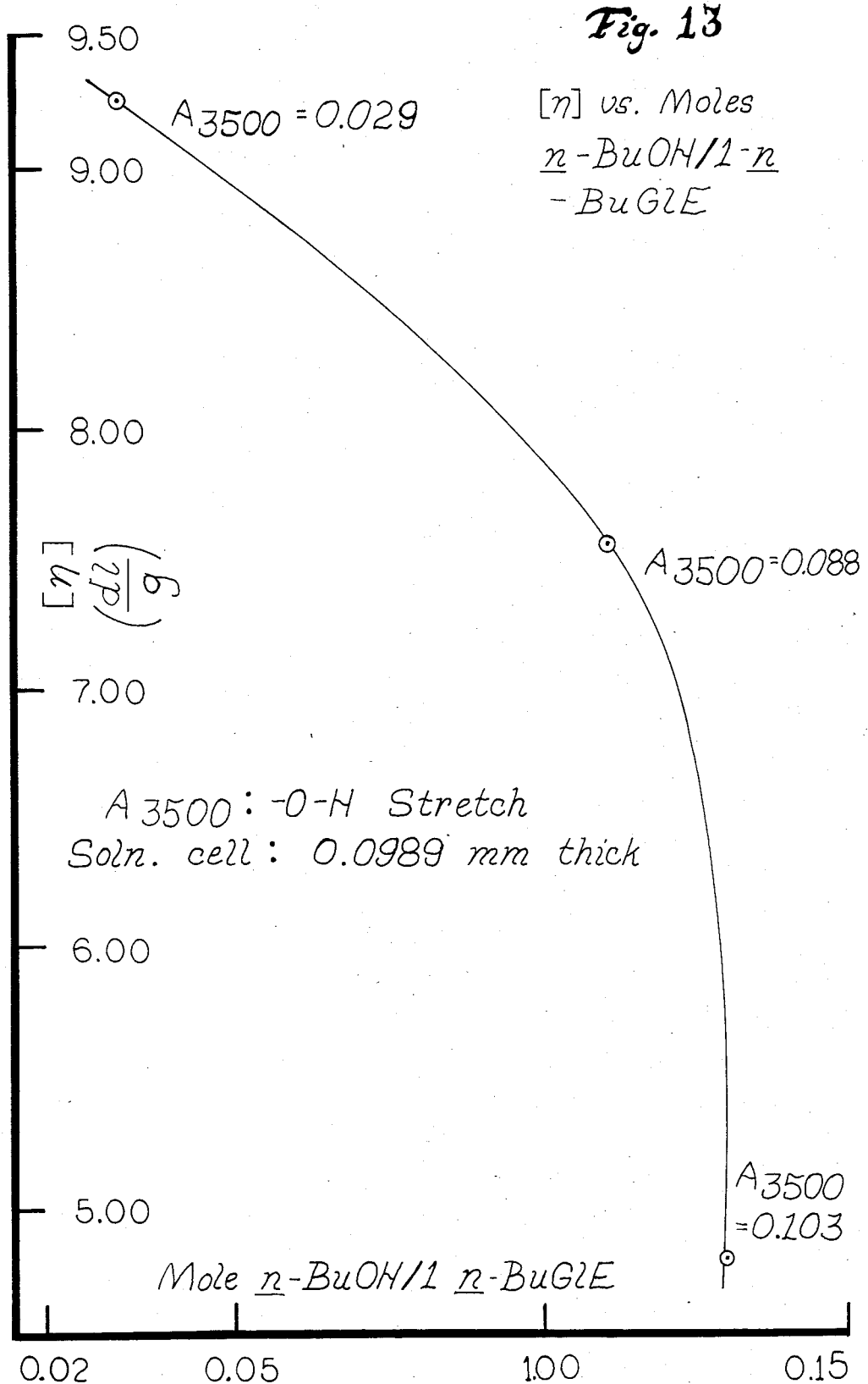

To demonstrate the immediate foregoing, the described purification procedure was used to prepare a sample of pure n-BuGlE to which controlled amounts of n-butyl alcohol were added. Infrared spectra were run on each of the epoxide/alcohol samples prior to polymerization, using 2.26 mole % catalyst. Polymerization was carried out for 44 hours at 86° C. in diethylbenzene (≅35% solids). The intrinsic viscosities were determined and are shown in the graph of FIG. 13. This curve demonstrates the susceptibility of the catalyst performance to alcoholic impurities, (namely, lowering the molecular weight of the polymer produced).

Accurate analysis and control of residual alcohols is, therefore, critical for achieving high molecular weights in PE-elastomers made with the catalysts of reference.

Carbonyl-containing adducts are susceptible to reduction by TEA and the like to the corresponding alcohol prior to the formation of the catalyst. Examples of such compounds include aldehydes, ketones, carboxylic acids, esters, and amides. Thus, when polymerizing an epoxide containing carbonyl functionality (e.g., GlAcr, GlS, etc.), such an epoxide may be introduced *after* the formation of the catalyst, provided the monomer is kept free of water and other active-hydrogen containing impurities. Catalyst formation normally occurs spontaneously at room temperature. Nonetheless, it may be beneficial to insure complete formation by heating to at least 50° C. before adding the functional epoxide.

As to the effect of solvent polarity present during polymerization on molecular weight, the following Table VII shows this. Molecular weight for this showing is again determinable indirectly by measuring $[\eta]$ of solutions at 38° C. (100° F.) in TO. Polymerizations of t-BuGlE in TO for the purpose at hand can be carried out at 86° C. for 44 hours to ≅25% solids using 2.26 mole % catalyst. Table VII indicates that, as the solvent polarity increases, the molecular weight of polyether produced correspondingly increases. Anomalous value obtained using ethyl acetate (i.e. "EthAc") is likely due to the reaction of the carbonyl with the catalyst leading to decreased catalyst activity.

The dioxane and ethyl acetate for use in such studies are beneficially purified to remove residual alcohols by titrating with n-butyllithium followed by flash distillation. Although dioxane appears to be a superior solvent, other solvents (diethylbenzene, TO, etc.) can preferentially be employed to avoid the cumbersome purification step.

TABLE VII
EFFECT OF SOLVENT POLARITY ON MOLECULAR WEIGHT

| | Solvent | $[\eta]$ (dl/g) |
|---|---|---|
| Increasing Polarity | Decane | 2.77 |
| ↓ | Hexane | 2.82 |
| ↓ | Benzene | 3.36 |
| ↓ | Ethyl Acetate | 2.76 |
| ↓ | Dioxane | 4.17 |

The use of oxidation inhibitors (i.e., "antioxidants") to minimize or preclude possible oxidative degradation in the final interpolymerized products is of importance in utilization of the catalyst systems. It is common practice to incorporate antioxidants in polymer goods after their preparation. It is sometimes advantageous and easier to provide them during course of polymer preparation. This often avoids having to mill in such additives in tough and hard to work plastics. Pre-furnishment of antioxidant, however, can only be done when it causes no detrimental influence in polymerization and/or its rate and other important incidents thereof. Since most useful antioxidants contain active hydrogen moieties, care must be taken to so utilize pre-incorporated antioxidants that no bad consequence is had.

Surprisingly, the pre-addition of antioxidants in quantities less than molar as compared to the molar quantity of catalyst system(s) employed is feasible and oftentimes, of unexpected benefit to get PE-elastomer intermediates having significantly increased molecular weight values.

To show this, tests may be run using t-BuGlE in diethylbenze solvent (≅35% solids) at 86° C. for 44 hours; the moles additive/mole TEA in these being maintained at the 0.25 ratio figure. Such ratio is usually optimum for phenothiazine, as above brought forth, under identical reaction conditions.

The results of such investigation are usually very close, if not identical, to those demonstrated in the following Table VIII. In this, as can be seen, the amino derivatives are more effective in producing higher molecular weights than the phenolic adducts. As acidity decreases for the phenols and as basicity decreases for the amines, molecular weight increases. In such determinations as are given in Table VIII, incidentally, it is literally useless to try to measure values for $[\eta]$ of "thick liquids" since values obtained for polymers having this rheology are usually on the order of ≅1 dl/g or less.

TABLE VIII
EFFECT OF "OXIDATION INHIBITORS" ON MOLECULAR WEIGHT OF RESULTING PE-ELASTOMER

| Compound | Structure | $[\eta]$ (dl/g) | |
|---|---|---|---|
| Hydroquinone | 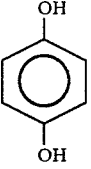 | Thick liquid | Decreasing Acidity |

TABLE VIII-continued
EFFECT OF "OXIDATION INHIBITORS" ON MOLECULAR WEIGHT OF RESULTING PE-ELASTOMER

| Compound | Structure | [η] (dl/g) |
|---|---|---|
| p-t-Butyl Catechol | (structure) | 4.29 |
| "Ionol" (from SHELL CHEMICAL COMPANY) | (structure) | 12.8 |
| Morpholine | (structure) | Thick liquid — Decreasing Basicity |
| Diphenyl Amine | (structure) | 14.6 |
| Phenothiazine | (structure) | 19.3 |
| Phenoxazine | (structure) | 35.1 |
| 3,7-Dinitrophenothiazine | (structure) | Thick liquid (insoluble catalyst) |

Figure 14:
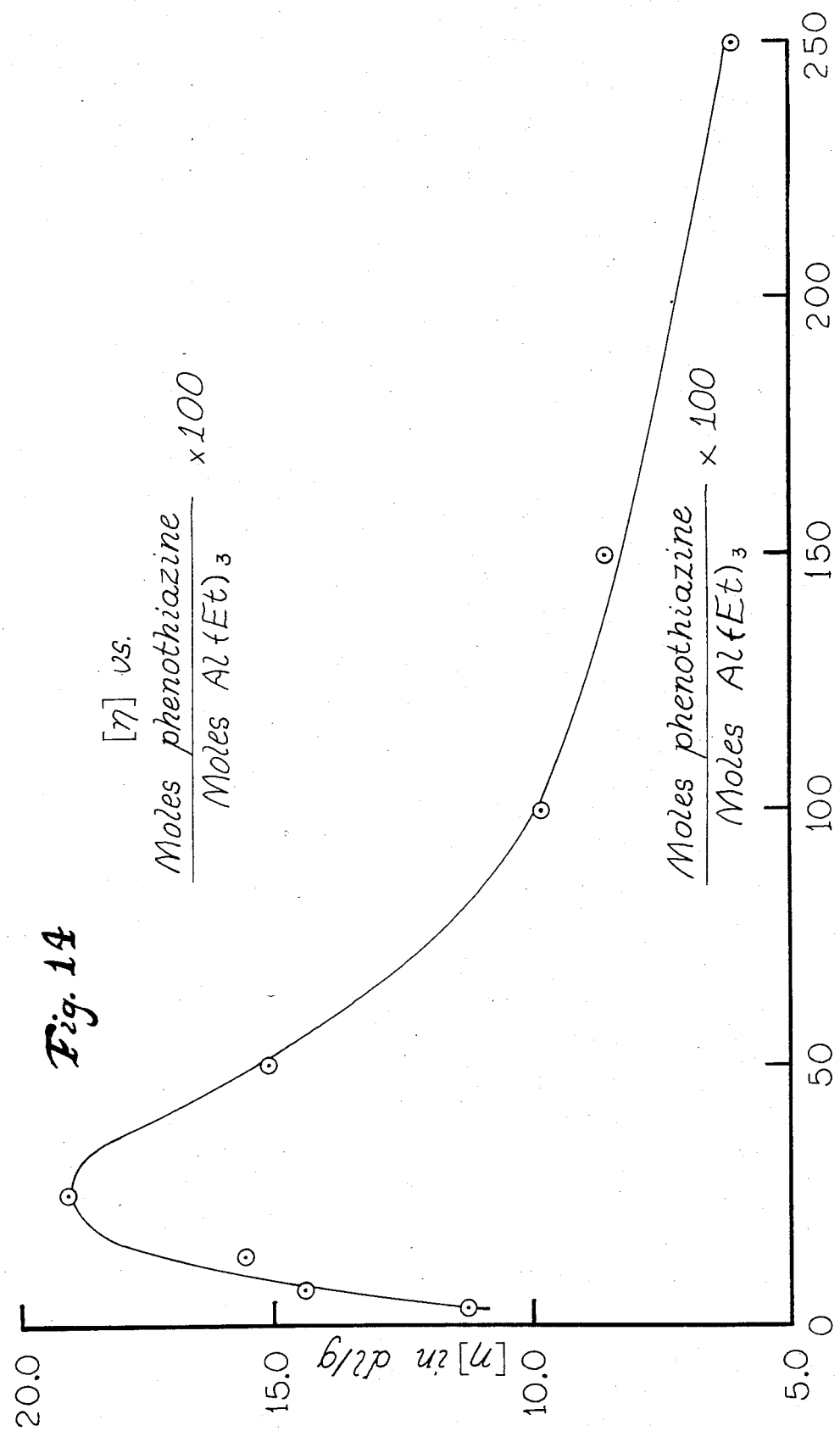

Graphical evidence of the results obtainable in part of the foregoing is also graphically set forth in FIG. 14 of the Drawing.

It is noteworthy that the proton on N-substituted amides is reactive enough to make the same useful as catalyst components. Polymerization of t-BuGlE in TO using N-methylacetamide produces a value of [η] that is usually at least about 40% greater than that produced using phenothiazine under identical conditions. In such cases the amide seems to behave as a Lewis base. It thus appears that if the N-substituent is more electronegative (e.g., as in a phenyl group), basicity will decrease so as to result in a corresponding increase in molecular weight of the produced PE-elastomer. This is inferrable from the happenings with the amine series, as is developed in the above Table VIII.

Control of molecular weight may be achieved by selecting the proper phenol, amine, or amide as an included component for the coordination catalyst system(s). Catalyts containing these adducts are adapted to produce higher molecular weight PE-elastomers than any previously observed.

The real importance of the utilized orders of addition in catalyst system formulation as regards effect on both conversion rate and molecular weight of resulting PE-elastomers is evident in tests undertaken following three separate schemes for same.

Since the use of PhTh as catalyst component is consistent for producing very high molecular weight polyethers, it is an appropriate choice for such demonstration. PO ($\cong$35 wt.%) is polymerized for such testing in TO at 90° C., using 2.26 mole % catalyst. The ratios of TEA:acetylacetone:water:PhTh are appropriately maintained at 2:1:1:0.5, respectively. A depiction of the three orders of addition is in Table IX.

TABLE IX
ORDERS OF ADDITION - CATALYST COMPONENTS

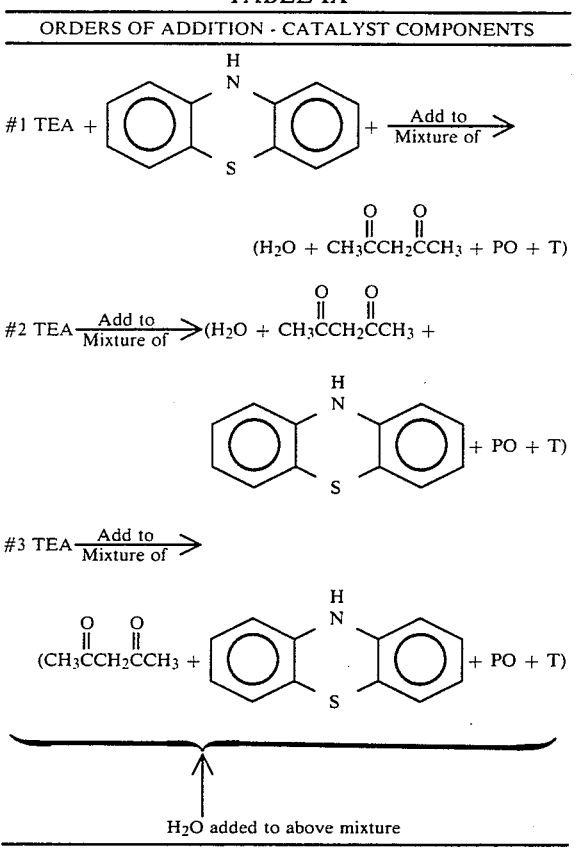

Samples are easily taken during the course of such polymerizations to measure percent solids and $[\eta]$. The reaction order and relative rate constants are then readily calculatable for these data (see Table X).

TABLE X
EFFECT OF ADDITION ORDER IN CATALYST FORMULATION ON CONVERSION

| Order of Addition # | Time (min.) | % Solids | Theoretical % Solids |
|---|---|---|---|
| 1 | 5 | 5.06 | 14.7 |
| 1 | 17 | 6.90 | 20.1 |
| 1 | 30 | 8.62 | 25.1 |
| 1 | 45 | 9.78 | 28.4 |
| 1 | 60 | 10.62 | 30.8 |
| 1 | 75 | 11.81 | 34.3 |
| 1 | 105 | 13.17 | 38.3 |
| 1 | 135 | 14.61 | 42.5 |
| 1 | 165 | 15.86 | 46.2 |
| 2 | 7 | 8.65 | 24.6 |
| 2 | 10 | 9.86 | 28.1 |
| 2 | 15 | 12.6 | 35.9 |
| 2 | 20 | 14.8 | 42.2 |
| 2 | 30 | 17.2 | 49.0 |
| 2 | 40 | 19.7 | 56.1 |
| 2 | 60 | 23.7 | 67.5 |
| 2 | 90 | 27.1 | 77.2 |
| 2 | 120 | 31.0 | 88.3 |
| 3 | 5 | 5.60 | 16.0 |
| 3 | 10 | 8.01 | 22.8 |
| 3 | 15 | 10.1 | 28.8 |
| 3 | 20 | 11.2 | 31.9 |
| 3 | 30 | 13.2 | 37.6 |
| 3 | 40 | 14.9 | 42.5 |
| 3 | 60 | 18.7 | 53.3 |
| 3 | 97 | 22.1 | 63.0 |
| 3 | 120 | 23.9 | 68.1 |

Plotting the log of the remaining PO monomer concentration (Log [PO] vs. time (min.): "Log [PO]" being calculatable as Log (35% solids—% polymer formed) can then be done.

Figure 15:
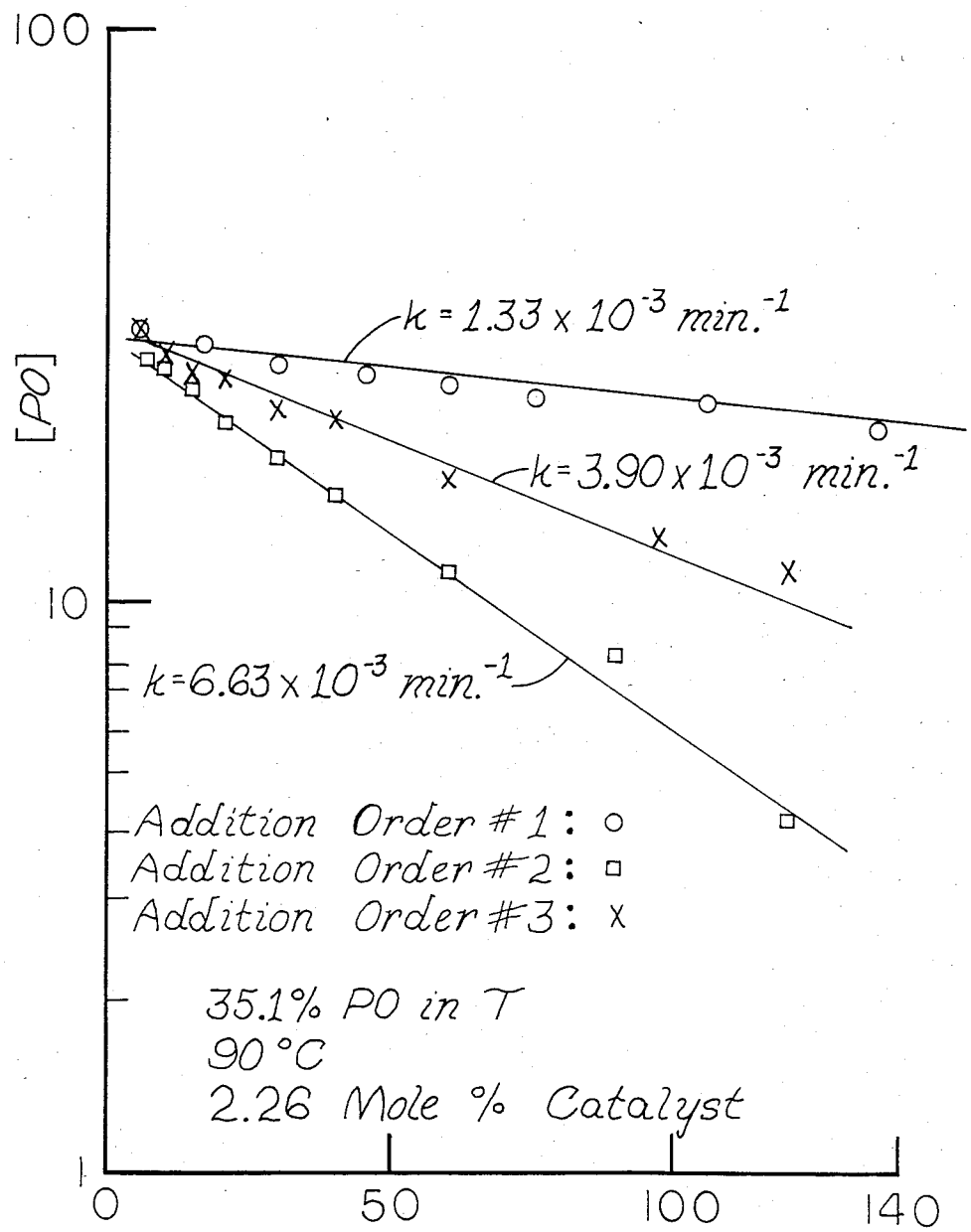

FIG. 15 shows that the polymerization of PO is first order with respect to concentration regardless of order of addition. Rate constants determined from the plots indicate that Addition Order #2 results in the formation of a catalyst that polymerizes PO almost twice as fast as that from Addition Order #3 and five times faster than that from #1. The slow rate encountered in #1 may be partly due to the insolubility of the catalyst derived. The catalysts resulting from the other two Addition Orders are soluble.

Not only is the rate of polymerization affected by the Addition Order of the catalyst components but the molecular weight of the polymers produced is analogously affected. Table XI demonstrates the change in $[\eta9$ as a function of percent polymer solids for each of the three Addition Orders above explained.

TABLE XI
EFFECT OF ADDITION ORDER ON $[\eta]$

| Order of Addition[a] | Time (min.) | $[\eta]^b$ (dl/g) | % Polymer Solids | % Theoretical Solids |
|---|---|---|---|---|
| #1 | 17 | 7.90 | 6.90 | 20.1 |
|  | 60 | 8.86 | 10.6 | 30.8 |
|  | 165 | 7.20 | 15.9 | 46.2 |
| #2 | 7 | 7.30 | 8.65 | 24.6 |
|  | 30 | 7.83 | 17.2 | 49.0 |
|  | 120 | 10.38 | 31.0 | 88.3 |
| #3 | 5 | 8.49 | 5.60 | 16.0 |
|  | 30 | 9.14 | 13.2 | 37.6 |
|  | 120 | 9.06 | 23.9 | 68.1 |

[a]PO polymerized at 90° C. in TO at ~35% theoretical % polymer solids with 2.26 mole % catalyst.
[b]Error in $[\eta]$ = ±5.0%.

The relative conversions of monomer to polymer reflect the relative rate constants above illustrated. At low conversions (<10% solids), there is little or no difference in the molecular weights produced by Addition Orders #1 and #2 and by #1 and #3 (within experimental error). The molecular weight produced by Addition Order #3 is sometimes somewhat higher than that produced by #2.

Between 10-20% solids, molecular weights increase according to the following Addition Orders: #3>#2>#1. At solids somewhere over 20%, the molecular weight produced following Addition Order #2 tends to be greater than that produced by the other two Addition Orders.

During respective polymerizations, the molecular weights tend to have very little change with conversion for Addition Orders #1 and 190 3 (within measuremental errors). In the case of Addition Order #2, however, molecular weight usually increases substantially with conversion. Thus, Addition Order #2 is attractive to at least get rapid conversion to very high molecular weight of the PE-elastomer intermediate being prepared.

The classic "rule of thumb" used for characterizing the effect of temperature on reaction rate has been that for every 10° C. rise in temperature, the rate of reaction at least about doubles. This concept may be tested using the polymerization of PO at 50° C. and 100° C., respectively, as an example. If the original hypothesis is applicable for present purposes, the rate at 100° C. should be about 32-times faster than at 50° C.

Figure 16:
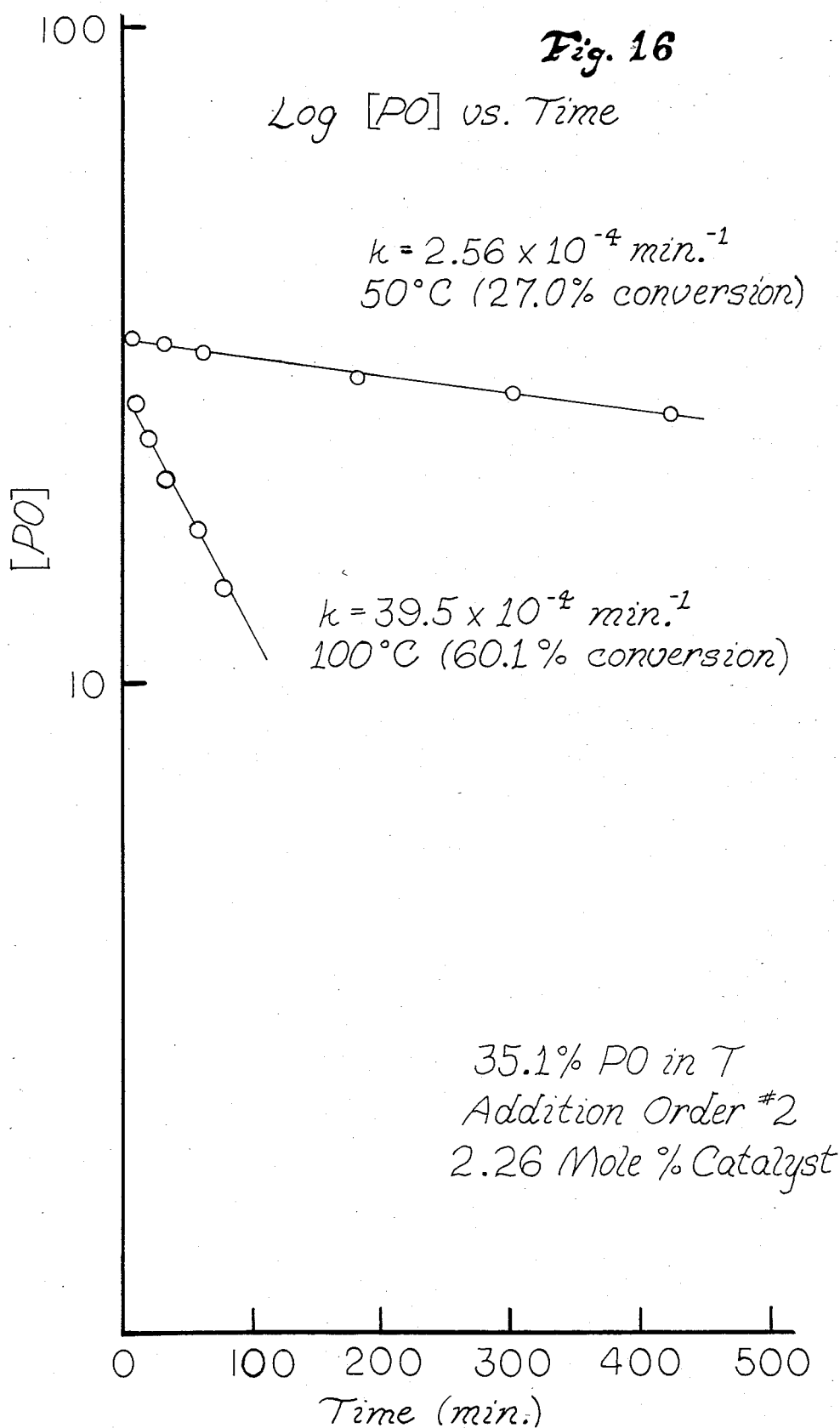

To examine this, a 35.1% solution of PO in TO can be polymerized using 2.26 mole % catalyst, using Addition Order #2 for catalyst preparation. FIG. 16 shows the plot which will develop for the Log [PO] vs. time at each of the two temperatures studied. Rate constants calculated as the slopes of the lines indicate that the rate of polymerization at 100° C. is about 15-times greater than the rate at 50° C. instead of by a supposable 32-times greater factor. This shows that the rate doubles for each 12.5° C. rise in temperature. While this holds for PO, it obviously will vary somewhat for each monomer involved.

As explained, the above has bearing on catalyst utilization and best modes for employment of same in differing given situations. As an overall guide, catalyst concentration in and for about all PE-elastomer polymerizations of interest is suitably in any small, catalytically effective amount up to about 10 mole % of Component A, based on moles present of monomer(s) of Formula (II). Generally, about 0.1 to about 5 mole % is suitalbe with likelihood that catalyst in excess of 5% in mere surplusage which is generally wasted. Preferably about 3 to 5 mole % catalyst is employed.

(D) NON-REACTIVE SOLVENTS

It is often beneficial to put in the reaction mass (generally at the outset but possibly additionally or even entirely at subsequent stages or intervals of continuous-process or batch-wise operations) a suitable, generally inert solvent. This tends to aid processability by avoiding the presence for handling of extremely viscous masses. The added solvent is surplus to that necessarily present from employed catalyst system preparation.

Ethyl benzene (i.e., "∓EtBz") is a very good solvent, especially when the major monomer is comprised of St or other Formula (I) monomer.

Besides prerequisite dissolving power, the solvent employed (if present during the initial in situ PE-elastomer preparation) must not interfere with function of the coordination catalyst. Thus the solvent, as well as major monomer(s) present, should not have interfering components—at least in harmful proportions. Solvents having labile or active-hydrogen characteristics should be avoided. This ordinarily, precludes use of most alcohols, mercaptans and carbonyl-type materials.

However, once the PE-elastomer preparation is done, no such limitation(s) apply to solvent material or other substance wanted to then be added to the reaction mass; provided the same does not adversely affect major monomer interpolymerization. Thus, after making the PE-elastomer and if desired, the reaction mass can be altered with solvents, dispersing fluids or other additives that would be objectionable for the initial phase.

Boiling point is also significant in solvent selection. Fluids too volatile may require expensive and undesirable pressure-handling facilities for the involved process equipment. On the other hand, "high-boilers" cause removal problems in product recovery.

While possible, it is usually needless to employ more than about 30 wt. %, based on total diluted reaction mass weight, of any solvent or other fluid dispersant. Too much solvent or the like may hinder polymerization, complicates product recovery because of excessive requirements for solvent stripping. Especially with EtBZ, solvent concentration of 15-20 Wt. % maximum is advantageous; with a wt. % range of about 3-8, or so, frequently preferred.

There is some unavoidable influence on end product properties when solvents are in the reaction mass. Table XII demonstrates this. The lowest level of 2.1 wt. % of EtBZ utilized in this comparison correlates to the solubility therein of the TEA component in a typical catalyst system.

It is significant to note in Table XII that the effective rubber phase volume, as measured by percent gel, increases with solvent level. The effect on physical properties is somewhat more subtle. Impact strength tends to be better at 4.6% solvent; but the tensile modulus is worse at this concentration. $T_R$ appears to be virtually unaffected by solvent concentration; whereas, $T_Y$ shows a definite decrease with increasing solvent.

As only slight change in physical properties occurs with changing EtBZ concentration, it appears that about a 5-8% solvent level is sufficient for obtaining good physical properties in end product and good processability in production. Sometimes process conditions in larger scale installations may dictate using relatively higher solvent levels to optimize processability.

TABLE XII

EFFECT OF EtBZ CONCENTRATION ON PHYSICAL PROPERTIES OF HIPPO

| % EtBZ | % Gel | Swelling Index | Rubber+ | Notched Impact (Ft-lbs/in) | Normalized Impact | $T_Y$ (psi) | $T_R$ (psi) | % Elong. | Tensile Modulus (psi × $10^5$) | Vicat HD (°C.) | Melt Flow (Schedule G) (g/10 min) |
|---|---|---|---|---|---|---|---|---|---|---|---|
| 2.1* | 13.7 | 22.6 | 10.0 | 1.88 | 0.188 | 2795 | 2122 | 29.4 | 3.76 | 97 | 1.070 |
| 4.6 | 15.4 | 28.6 | 11.4 | 2.76 | 0.242 | 2782 | 2016 | 32.5 | 2.59 | 96 | 0.230 |
| 10.2 | 15.1 | 27.4 | 10.6 | 2.48 | 0.234 | 2760 | 2168 | 30.9 | 3.34 | 97 | 0.736 |
| 16.5 | 16.2 | 27.4 | 10.3 | 1.48 | 0.144 | 2580 | 2192 | 33.1 | 3.69 | 98 | 1.10 |

*Lowest Practical Level to Observe Due to Solvency of EtBZ for Al(Et)₃
+Rubber used: 95% PO/5% AGE.

As to boiling point characteristics and freedom from catalyst interference, mono- and dichlorobenzene solvents (i.e., "ClBZ" and "d-ClBZ") are suitable alternatives to EtBZ.

Figure 17:
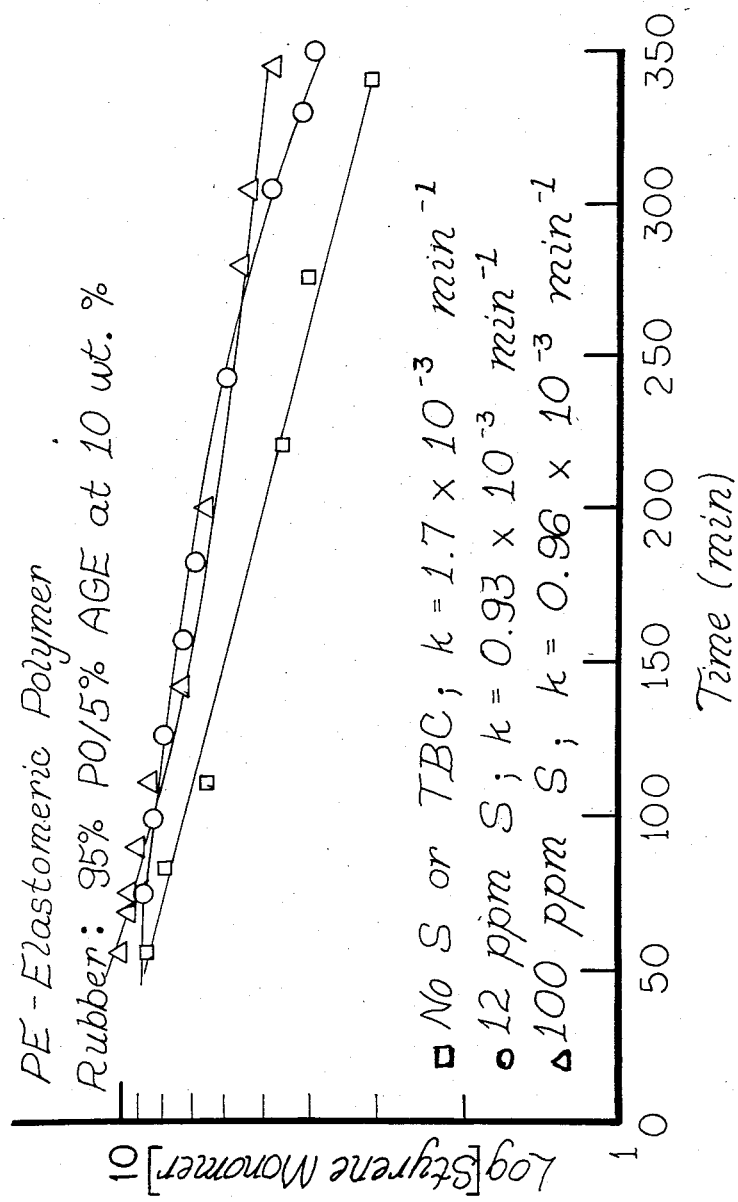

Table XIII compares product properties using EtBZ and the more polar ClBZ and ortho- form d-ClBZ solvents. This shows suitability of all three solvents and their capability of successful use for preparing PE-elastomer-reinforced HIPPO. Devolatilization of d-ClBZ, due to its high boiling point (179° C.) is more difficult. Along this line, residual d-ClBZ may account for the low 87° C. Vicat heat distortion in the product prepared with its use. It can be expected for different optimum solvent levels to be encountered in and for given reaction masses when ClBZ and/or d-ClBZ are employed;

the same being also applicable in cases of still other solvents possible to employ.

remaining points can then be taken at 135° C. FIG. 17 shows a plot of the results.

TABLE XIII

USE OF ClBZ and d-ClBZ AS SOLVENTS IN HIPPO

| Solvent* | % Gel | Swelling Index | % Rubber+ | Notched Impact (Ft-lbs/in) | Normalized Impact | $T_Y$ (psi) | $T_R$ (psi) | % Elong. | Tensile Modulus (psi × $10^5$) | Vicat HD (°C.) | Melt Flow (Schedule G) (g/10 min) |
|---|---|---|---|---|---|---|---|---|---|---|---|
| Ethylbenzene | 15.4 | 28.6 | 11.4 | 2.76 | 0.242 | 2782 | 2016 | 32.5 | 2.59 | 96 | 0.230 |
| Monochlorobenzene | 13.6 | 28.5 | 9.8 | 2.38 | 0.243 | 2944 | 2089 | 27.3 | 3.22 | 99 | 0.38 |
| o-Dichlorobenzene | 15.3 | 28.7 | 11.5 | 2.84 | 0.247 | 2739 | 1573 | 24.5 | 2.76 | 87 | 0.23 |

*4.6% Solvent for all cases
+95% PO/5% AGE PE-Rubber (E) OTHER COMPONENTS

Most addition-polymerizable monomers useful as major monomers in practice of the present invention are made and obtained with polymerization inhibitor incorporated therein. This avoids premature polymerization of raw material stocks in storage, shipment or other handling thereof. Safety provides another important reason for inhibitor usage. A good inhibitor for St is t-butylcatechol (i.e., "TBC"). Its removal for reactive St usage is often done by passage of inhibited-St stock over activated alumina, and so forth.

Inhibitor removal is usually desirable for practice of the present invention. This is because TBC and many other inhibitors contain functional groups that react with TEA and equivalent components in the coordination catalyst systems.

When large-scale manufacturing is involved, it is always prudent and sometimes necessary to have voluminous monomer storage capacity to ensure long-time feed stock availability. Besides possible impairment of monomer stock vitality due to its premature reaction during prolonged storage, serious safety hazards and accident risks arise which make long term uninhibited monomer storage undesirable.

For present purposes, it is advantageous to provide in the major monomer(s) an inhibitor or retarder against polymerization that: (i) needs to removal from the system; and (ii) does not affect the polymerization of the Formula II monomers by interacting with the coordination catalyst. The use of elemental sulfur (S) meets both criteria and is a good alternate for TBC or the like.

To demonstrate this, batches of HIPPO can be made in which the reaction mass (from the outset) contains, for example, either 0 ppm (i.e., parts per million by weight taken on total weight of involved mass) 12 ppm, and 100 ppm of contained S. Polymerization rates of the St are then determined by plotting Log [St monomer] vs. time for the latter two resin products, as well as for the one containing no S inhibitor. Solids percent measurements determine the extent, on a percentage basis, of St polymerization. Data is gathered beginning at 110° C. after a 55 minute period in which the alkene oxides are polymerized and during a 15-20 minute interval required for heating to 135° C. from 110° C. All the From FIG. 17 it is seen that at the involved temperatures, little or no difference in polymerization induction times exists between the three samples. Reaction rates, however, do vary. The rates of polymerization of styrene monomer containing 12 and 100 ppm sulfur are both seen to be about half of that in the run containing no sulfur. From this, it can be inferred that S behaves more as an effective retarder than inhibitor. This is not unexpected, since thermal initiation of S at 135° C. proceeds quite rapidly.

The physical properties of the three respective HIPPO resins involved in the plots depicted in FIG. 17 are shown in Table XIV. Normalized impact strength decreases significantly at the 100 ppm S level, but does so only slightly at the 12 ppm level. All other vital properties remain virtually unaffected by increasing concentration. It is thus apparent that use of about 12 ppm S is an effective way to retard St polymerization, even at 135° C. temperature levels, without significantly lowering important physical properties of the HIPPO resin. Actually, if desired (although generally not so much is necessary, albeit harmless), the quantity of S employed to retard monomer polymerization may be as high as 1,000 ppm or even an amount that is up to the solubility limit(s) of the S in St or other Formula (I) monomer or monomer mixture being treated.

TABLE XIV

EFFECT OF SULFUR LEVEL ON PHYSICAL PROPERTIES

| S Added (ppm) | % Rubber* | Notched Impact (Ft-lbs/in) | Normalized Impact | $T_Y$ (psi) | $T_R$ (psi) | % Elong. | Tensile Modulus (psi × $10^5$) | Vicat HD (°C.) | Melt Flow (Schedule G) (g/10 min) |
|---|---|---|---|---|---|---|---|---|---|
| 0 | 11.4 | 2.76 | 0.242 | 2782 | 2016 | 32.5 | 2.59 | 96 | 0.230 |
| 12 | 10.8 | 2.49 | 0.231 | 2833 | 1945 | 30.0 | 3.35 | 99 | 0.33 |
| 100 | 10.7 | 2.16 | 0.202 | 2757 | 2124 | 31.8 | 3.27 | 100 | 0.604 |

*Rubber Used: 95% PO/5% AGE in all cases.

HIPPO (and like or analogous) products, like many other polymeric goods, are subject to discoloration for many causes, including especially from exposure to heat at elevated temperature (including under "in-process" conditions) and upon aging in air.

Particular sensitivity in this regard is experienced when the reaction mass is being devolatilized during the course of manufacture, especially if there is any atmospheric contact in the procedure. The developed color persists (and usually becomes even more pronounced when the resin is removed from the devolatilization unit). Coloration normally encountered ranges from a light pinkish hue to one of a brownish-orange tone.

Certain antioxidants can be employed to avoid or correct the problem. Much of the problem is actually attributable to the discoloration of phenothiazine (i.e., "PhThZ") in the air, the same being a frequently-employed component of the aluminum coordination catalyst systems utilized. PhThZ tends to assume a rosytype color after standing a short time in EtBZ solvent. This amine may either hydrolyze from the Al catalyst in trace amounts by moisture in the air or, conceivably, is pyrolysed during devolatilization of the resins. Both conditions can lead to color formation and build-up.

For illustration of this, a HIPPO resin can be prepared in which 10.0 g of glacial acetic acid (i.e., "HAc'-'—being ∼3.5 mole equivalents, based on the Al catalyst) is added to the resin at ≅50% solids. The resin is then reacted to 56% solids and transferred to flat open containers, after which it is devolatilized.

Color stabilization is excellent. The resin remains white, even through devolatilization. Physical properties of the resin are essentially unaffected by the addition of HAc. All this is demonstrated in Table XV.

It is speculable that HAc forms a salt with hydrolized PhThZ which may be impervious to oxygen discoloration.

In large scale operations, small amounts of Hac are preferable to avoid acid build-up problems in recycled feed. It may also be more advantageous to add a one-for-one equivalence of a stronger acid, such as phosphoric acid. It is, of course, possible to employ even other acid materials (such as organic equivalents of HAc) for the purpose. The HAc or equivalent acid utilized is usually employed in a quantity that is in excess on a molar basis to the amount of Al in the catalyst present.

The HAc and like or equivalent acid addition is, in any event and in supplement to good color preservation effects, beneficial to help "kill" the coordination catalyst after it has outlived its usefulness in the reaction mass and to impart better aging stability to the end product.

ing. In one important aspect or another, the following provides more detail along these lines.

(F) INTRINSIC VISCOSITY OF PE-ELASTOMER

Generally, the intrinsic viscosity of the PE-elastomer in the HIPPO (or like or analogous) product is in a range wherein the determinable value of $[\eta]$, taken in TO at 38° C. (100° F.), is as low as about 2 and to as high as ≅20. It is often advantageous for the value of $[\eta]$ to be between 3 and about 15. It is sometimes preferable for the PE-elastomer to have an intrinsic viscosity of from about 3 to about 12. Optimum properties in the high-impact HIPPO product are often found when the $[\eta]$ of the PE-elastomer is in the neighborhood of 4–10 (in units of dl/g).

In this connection, it is often preferable for toxicological reasons to measure intrinsic viscosity in TO instead of benzene.

Control of $[\eta]$ value of the PE-elastomer can be either via polymerization temperature (and variation) or by change in the type of amine used in the coordination catalyst. The latter approach is simpler and more expedient, since temperature changing alters polymerization rates of the major monomer (such as St); grafting; PS (or equivalent polymerized major monomer) molecular weight; etc.

To study results of such $[\eta]$ control, one can readily follow the change in physical properties of the polymer(s) under test with changing $[\eta]$ thereof.

Table XVI shows the effect of changing amine on the $[\eta]$ of an 85 mole % PO/15 mole % AGE PE-elastomer and on the physical properties of the product HIPPO resin made using that polyether. Impact values obtained are "normalized" with respect to PE-elastomer rubber

TABLE XV

| | | EFFECT OF ADDING HAc ON HIPPO PROPERTIES | | | | | | | |
|---|---|---|---|---|---|---|---|---|---|
| HAc Added+ (gm) | % Rubber* | Notched Impact (Ft-lbs/in) | Normalized Impact | $T_Y$ (psi) | $T_R$ (psi) | % Elong. | Tensile Modulus (psi × 10⁵) | Vicat HD (°C.) | Melt Flow (Schedule G) (g/10 min) |
| None | 10.4 | 3.54 | 0.340 | 3139 | 1994 | 29.3 | 3.28 | 91 | 0.398 |
| 10 | 10.9 | 3.75 | 0.345 | 3221 | 1766 | 13.1 | 3.48 | 100 | 0.17 |

+HAc added ∼50% solids.
*Rubber used: 95% PO/5% AGE in both cases.

Product Properties

Many of the unique, desirable and valuable characteristics of PE-elastomer-modified impact polymer products pursuant hereto have been delineated in the preceding concentration to allow for deviations in impact due to variations in rubber loadings. Normalized values are calculated by dividing the impact strength by the wt. % rubber present in the sample. Such values are extensively used herein.

TABLE XVI

| | | EFFECT OF CHANGING AMINE ON POLYESTER $[\eta]$ AND PHYSICAL PROPERTIES OF HIPPO | | | | | | | |
|---|---|---|---|---|---|---|---|---|---|
| Amine* | $[\eta]$+ Dl/g | Notched Impact (Ft-lbs/in) | % Rubber | Normalized Impact | $T_Y$ (psi) | $T_R$ (psi) | % Elong. | Vicat Heat Distortion (°C.) | Melt Flow Schedule G (g/10 min) |
| $C_2H_5$<br>\<br>NH<br>/<br>$C_2H_5$ | 1.38 | 0.39 | 6.8 | 0.057 | 0 | 3177 | 0.7 | 97 | 2.71 |
| $CH_3$<br>\<br>NH<br>/<br>$\phi$ | 3.06 | 0.99 | 6.5 | 0.152 | 3273 | 2680 | 15.3 | 98 | 1.12 |
| None | 4.36 | 1.14 | 6.6 | 0.173 | 3813 | 2869 | 7.1 | 97 | 2.43 |

TABLE XVI-continued
EFFECT OF CHANGING AMINE ON POLYESTER [η] AND PHYSICAL PROPERTIES OF HIPPO

| Amine* | $[\eta]^+$ Dl/g | Notched Impact (Ft-lbs/in) | % Rubber | Normalized Impact | $T_Y$ (psi) | $T_R$ (psi) | % Elong. | Vicat Heat Distortion (°C.) | Melt Flow Schedule G (g/10 min) |
|---|---|---|---|---|---|---|---|---|---|
|  φ–NH–φ | 7.24 | 1.15 | 6.2 | 0.186 | 3897 | 3152 | 11.4 | Not Run | Not Run |
| 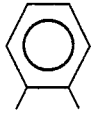 | 8.24 | 1.48 | 7.8 | 0.190 | 3781 | 2570 | 15.7 | 99 | 0.45 |
| 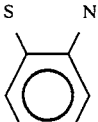 | 7.36 | 1.19 | 7.6 | 0.157 | 3677 | 2665 | 12.9 | 92 | 3.08 |

*Amines used as part of Al catalyst for PE-Elastomer preparation.
+[η] Determined in T at 38° C.

Optimum impact strength is obtained when the [η] of the polyether is about about 3.0 dl/g. At significantly lower values impact strength decreases noticeably.

(G) PRODUCT RHEOLOGY

The superiority of PE-elastomer-modified interpolymerized polymer products as compared to impact plastics reinforced with other rubbers is well demonstrated by rheological differences in the respective materials. This is typically represented by the comparative data in the following Tables XVII through XIX, inclusive.

In these tables, the comparisons are made between a given HIPPO product (Resin "AA") and a commercial PBu-reinforced PS (a HIPS known as "Styron 495", a product of The Dow Chemical Company). The Run is essentially within acceptable experimental error of being the same as that from the original Run.

Table XVIII shows that HIPPO can actually be pressed through a capillary at lower temperatures (140° and 160° C.) with less force than needed for HIPS. This makes for less energy requirements for polymer heating during fabrication. Colder polymer temperatures, significantly, allow shorter cooling times in the mold. This results in shorter cycles and more economical production of parts.

In Table XIX, the apparent viscosities of the HIPPO and HIPS resins are compared. The same conclusions can therefrom be drawn as from Table XVII.

The data presented in Tables XVIII and XIX at 160° C. show that HIPPO is quite stable to extrusion. The extrudate viscosity in that run is within acceptable experimental error of being the same as that in the original run. This is important relaive to enhanced resin fabricatability.

TABLE XVII
CHARACTERIZATION OF POLYMERS

| Resin Designation | Elastomer Type | % Elastomer | Tensile Strength Yield psi | Tensile Modulus × 10⁵ | Notched Izod Impact Ft-lb/in | Polystyrene Phase Mn | Mw | Comments |
|---|---|---|---|---|---|---|---|---|
| AA | PO/AGE* | 10.4 | 3505 | 3.21 | 3.4 | 125 × 10³ | 264 × 10³ | ** |
| BB | Diene("Taktene") | 9.0 | 2200 | 2.70 | 1.8 | 85 × 10³ | 220 × 10³ | Typical Properties of "Styron 495" |

*Elastomer polymerized in St.
**At higher rubber levels both tensile strength and tensile modulus are normally expected to decrease — surprisingly not here observed.

TABLE XVIII
MELT RHEOLOGICAL DATA
CROSS HEAD SPEED VS POUNDS FORCE ON PLUNGER

Measurements on Instron Rheometer

| Die Diameter | 0.0505 inch (ca. 1.28 millimeter) |
| Plunger Diameter | 0.50 inch (ca. 1.27 centimeters) |
| Die Length | 1.006 inches (ca. 2.555 centimeters) |

TABLE XVIII-continued

MELT RHEOLOGICAL DATA
CROSS HEAD SPEED VS POUNDS FORCE ON PLUNGER

Entrance Angle: 90°

| | Cross Head Speed | Pounds Force Resin AA | Pounds Force Resin BB |
|---|---|---|---|
| Temperature: 140° C. | 0.02 in/min | 880 lb | Note: |
| | 0.95 | 1245 | Material |
| | 0.10 | 1760 | too stiff |
| | 0.20 | 2600 | to run |
| | 0.50 | 5700 | |
| | 1.0 | too stiff | |
| | 2.0 | | |
| | 5.0 | | |
| | 10.0 | | |
| | 20.0 | | |
| Temperature: 160° C. | 0.02 in/min | 420 (380)* lb | 260 lb |
| | .05 | 540 (480) | 378 |
| | .10 | 640 (570) | 482 |
| | .20 | 770 (700) | 632 |
| | .50 | 960 (890) | 960 |
| | 1.0 | 1120 (1060) | 1205 |
| | 2.0 | 1325 (1240) | 1600 |
| | 5.0 | 1660 (1600) | 2725 |
| | 10.0 | 2000 (1950) | 5300 |
| | 20.0 | 2600 (2400) | Too Stiff |
| Temperature: 190° C. | 0.02 in/min | 180 lb | 106 lb |
| | .05 | 260 | 153 |
| | .10 | 323 | 193 |
| | .20 | 390 | 242 |
| | .50 | 470 | 324 |
| | 1.0 | 542 | 407 |
| | 2.0 | 625 | 495 |
| | 5.0 | 760 | 630 |
| | 10.0 | 880 | 750 |
| | 20.0 | 1000 | 895 |
| Temperature: 220° C. | 0.02 | 104 | 50 |
| | .05 | 149 | 80 |
| | .10 | 195 | 107 |
| | .20 | 250 | 141 |
| | .50 | 327 | 196 |
| | 1.0 | 385 | 240 |
| | 2.0 | 440 | 288 |
| | 5.0 | 520 | 370 |
| | 10.0 | 575 | 440 |
| | 20.0 | 645 | 520 |

*Bracketed numbers measured on extrudate from first run at 160° C.

TABLE XIX

Melt Rheological Data
Apparent Viscosity vs Shear Rate

Data measured on an Instron Rheometer with:

Die Diameter: 0.0505 inch (ca. 1.28 millimeter)
Plunger Diameter: 0.50 inch (ca. 1.27 centimeters)
Die Length: 1.006 inches (ca. 2.555 centimeters)
Entrance Angle: 90°

| | Shear Rate | Apparent Melt Viscosity, Poise Resin AA | Apparent Melt Viscosity, Poise Resin BB |
|---|---|---|---|
| Temperature: 140° C. | 5.18 sec$^{-1}$ | 749 × 10$^3$ | too stiff |
| | 12.9 | 425 | to measure |
| | 25.9 | 300 | |
| | 51.8 | 222 | |
| | 129 | 195 | |
| | 259 | | |
| | 518 | | |
| | 1294 | | |
| | 2588 | | |
| | 5176 | | |
| Temperature: 160° C. | 5.18 sec$^{-1}$ | 357 × 10$^3$ (322)* | 222 × 10$^3$ |
| | 12.9 | 184 (164) | 129 |
| | 25.9 | 109 (99.2) | 81.8 |
| | 51.8 | 68.4 (59.6) | 53.9 |
| | 129 | 32.8 (30.3) | 32.8 |
| | 259 | 19.0 (18.0) | 20.5 |
| | 518 | 11.3 (10.5) | 13.6 |
| | 1294 | 5.66 (5.44) | 9.27 |
| | 2588 | 3.41 (3.32) | 9.04 |
| | 5176 | 2.22 (2.05) | too stiff to measure |
| Temperature: 190° C. | 5.18 sec$^{-1}$ | 153 × 10$^3$ | 90.2 × 10$^3$ |
| | 12.9 | 89.1 | 52.2 |
| | 25.9 | 54.8 | 32.9 |
| | 51.8 | 33.2 | 20.7 |
| | 129 | 16.0 | 11.1 |
| | 259 | 9.22 | 6.91 |
| | 518 | 5.33 | 4.21 |
| | 1294 | 2.59 | 2.15 |
| | 2588 | 1.50 | 1.28 |
| | 5176 | 0.85 | 0.76 |
| Temperature: 220° C. | 5.18 | 88.4 × 10$^3$ | 42.5 × 10$^3$ |
| | 12.9 | 50.9 | 27.4 |
| | 25.9 | 33.2 | 18.2 |
| | 51.8 | 21.2 | 12.0 |
| | 129 | 11.2 | 6.70 |
| | 259 | 6.56 | 4.09 |
| | 518 | 3.76 | 2.45 |
| | 1294 | 1.77 | 1.26 |
| | 2588 | 0.98 | 0.75 |
| | 5176 | 0.54 | 0.44 |

*Numbers in ( ) Measured on Extrudate From First Run at 160° C.

(H) RUBBER CONCENTRATION (OR "LOADING")

The foregoing Tables V and VI and FIG. 12 of the Drawing show that a 95% PO/5% AGE PE-elastomer will reinforce PS to produce a HIPPO having excellent physical properties. Further to this, Table XX demonstrates the effect of the concentration of this rubbery PE-elastomer on properties. As the PE-elastomer content increases, impact strength also increases. The $T_Y$, $T_R$, the tensile modulus then all decrease, but not as much as in systems containing PBu.

TABLE XX

EFFECT OF RUBBER CONCENTRATION ON PROPERTIES OF HIPPO

| % Rubber* | Notched Izod Impact (Ft-lbs/in) | Normalized Impact | $T_Y$ (psi) | $T_R$ (psi) | % Elong. | Tensile Modulus (psi × 10$^5$) | Vicat HD (°C.) | Melt Flow (Schedule G) (g/10 min) |
|---|---|---|---|---|---|---|---|---|
| 6.9 | 1.59 | 0.230 | 3317 | 3385 | 6.5 | 3.73 | 101 | 0.565 |
| 10.4 | 3.54 | 0.340 | 3139 | 1994 | 29.3 | 3.28 | 91 | 0.398 |
| 10.9 | 3.76 | 0.345 | 3221 | 1766 | 13.1 | 3.48 | 100 | 0.170 |
| 16.5 | 7.82 | 0.474 | 2188 | 1366 | 14.4 | 2.19 | 95 | 0.336 |
| 27.9+ | 8.07 | 0.289 | 1140 | 522 | 13.8 | 1.62 | 94 | 0.056 |

*Rubber used: 95% PO/5% AGE.
+ Denotes incomplete phase inversion as indicated by Electron Microscopy.

Figure 18:
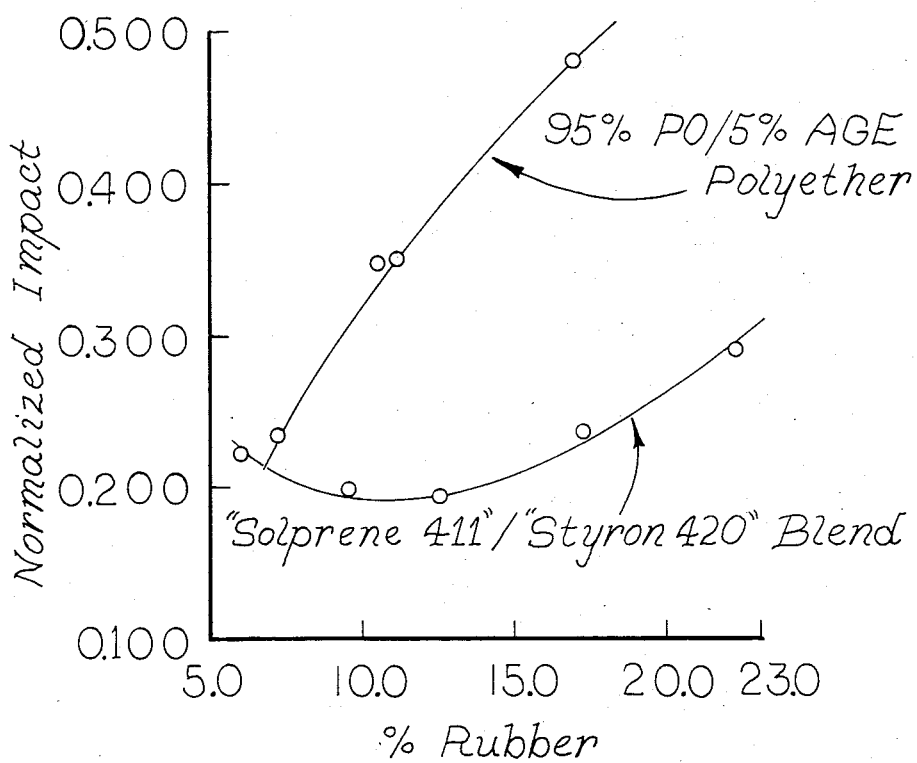
Figure 19:
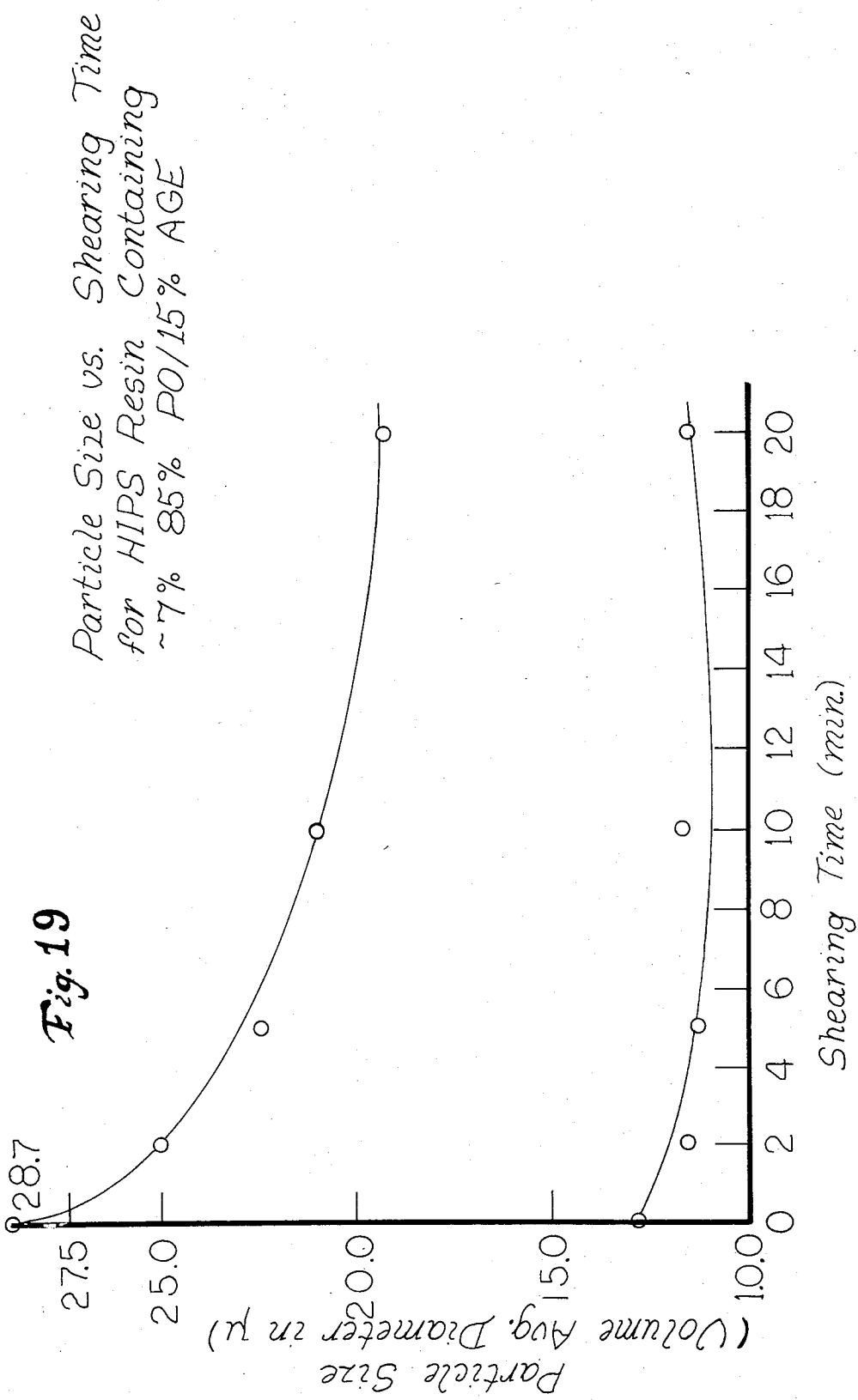
Figure 20:
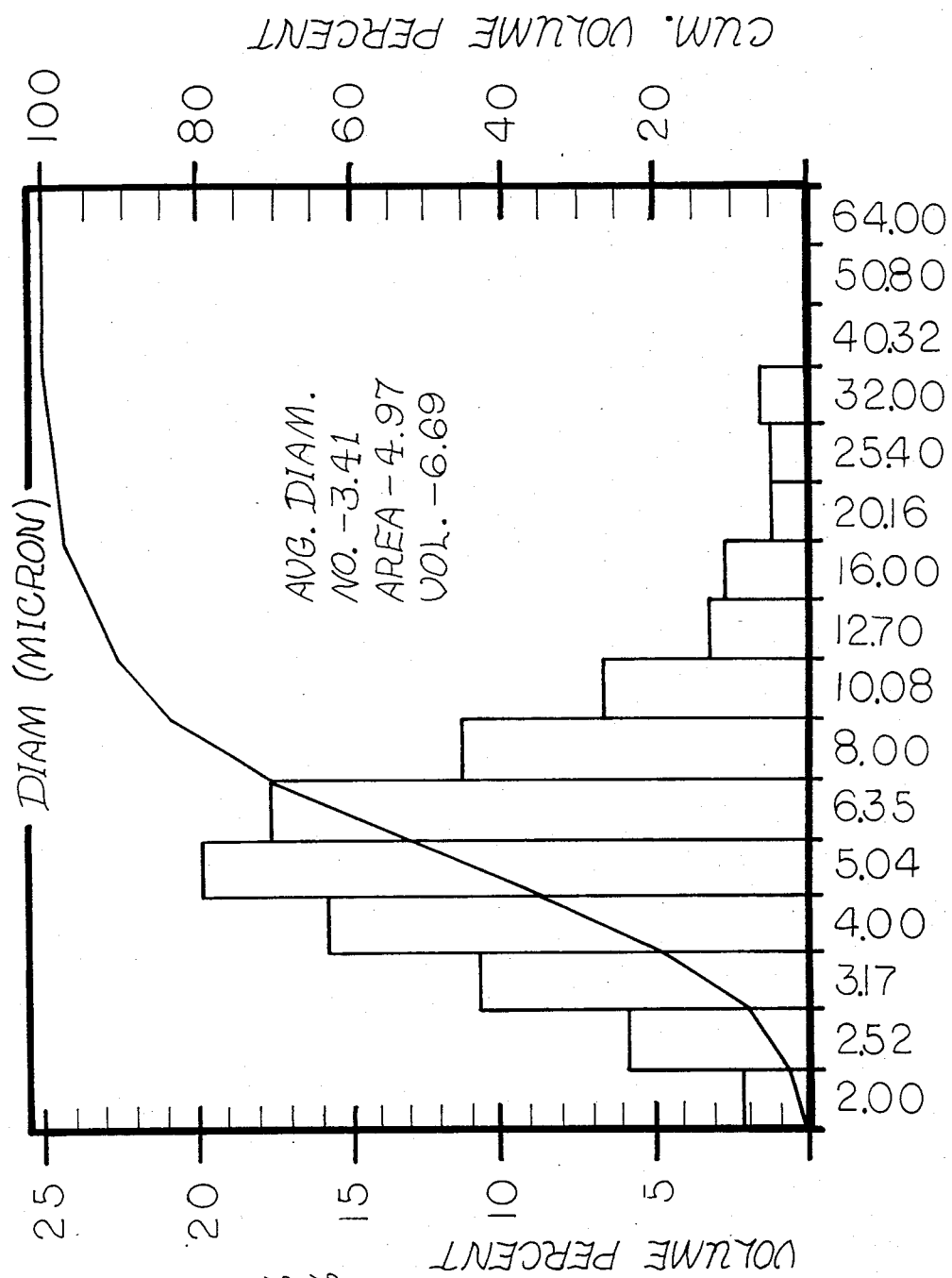

FIG. 18 in the Drawing is important as to the merits of the present invention. It shows a plot of percent rubber vs. normalized impact for both a PE modified HIPPO and a blend of "Solprene 411" with "Styron 420" (a product of THE DOW CHEMICAL COMPANY). This clearly demonstrates that, unlike PBu, the PE-elastomers become more efficient as reinforcing agents at higher contained-rubber levels. This is a valuable characteristic. It makes them more valuable and often preferred to blends of PBu.

In any event, PE-elastomer rubber loadings as low as 0.5%, based on final product total weight, make for discernible improvement in product properties. Usually, however, at least about 5 wt. % is needed for pronounced effects and is more advantageous for the purpose. Loadings on the 10-20 wt. % range usually give superlative results. Accordingly, such high loading levels are quite beneficial; while those much in excess of about 30 wt. % tend to a diminishing return situation as to further product enhancements relative to increasing PE-elastomer loadings.

(I) PARTICLE SIZE AND MORPHOLOGY

The immediate following explanation unavoidably involves certain aspects of mechanical physical processing and handling that are good to follow in practice of the invention. These relate to elastomer sizing phenomena which are of consequence and in large measure result from physical treatment.

As a generality in impact polymer products, the involved particle sizes should not be so great as may tend to destroy homogeneity in the finally-obtained product. In other words, it is undesirable to have unacceptable excesses of "pool concentrations", as it were, or large-grained occlusions of either the polymerized major monomer (such as PS) or the reinforcing rubber (such as PE-elastomer).

Much of this can be associated with the shear stability (or resistance to particle size diminution upon shearing) of the involved impact polymer product. Usually, and particularly in connection with the present invention, the particle size should on an average be of less than about a 15μ mean cross-sectional dimension. Advantageously, this is not in excess of ≅13μ, as sensible by apparent function or behavior (regardless of presence in the involved product of certain random amounts of either excessively large or excessively small particles, or both).

Rubber particles in conventional PBu- (and the like rubber, such as GRS)-modified HIPS products generally have a 2-5μ average diameter volume. The particles are usually slightly elliptical in nature; having thick, well-defined cell walls that are clearly visible under an electron microscope. This is all according to the typical micrographic simulation in FIG. 6 of the Drawing. The large occlusions of PS inside the rubber particles result in high, effective rubber phase volumes which contribute to the good physical properties obtained.

Figure 7:
Figure 8:
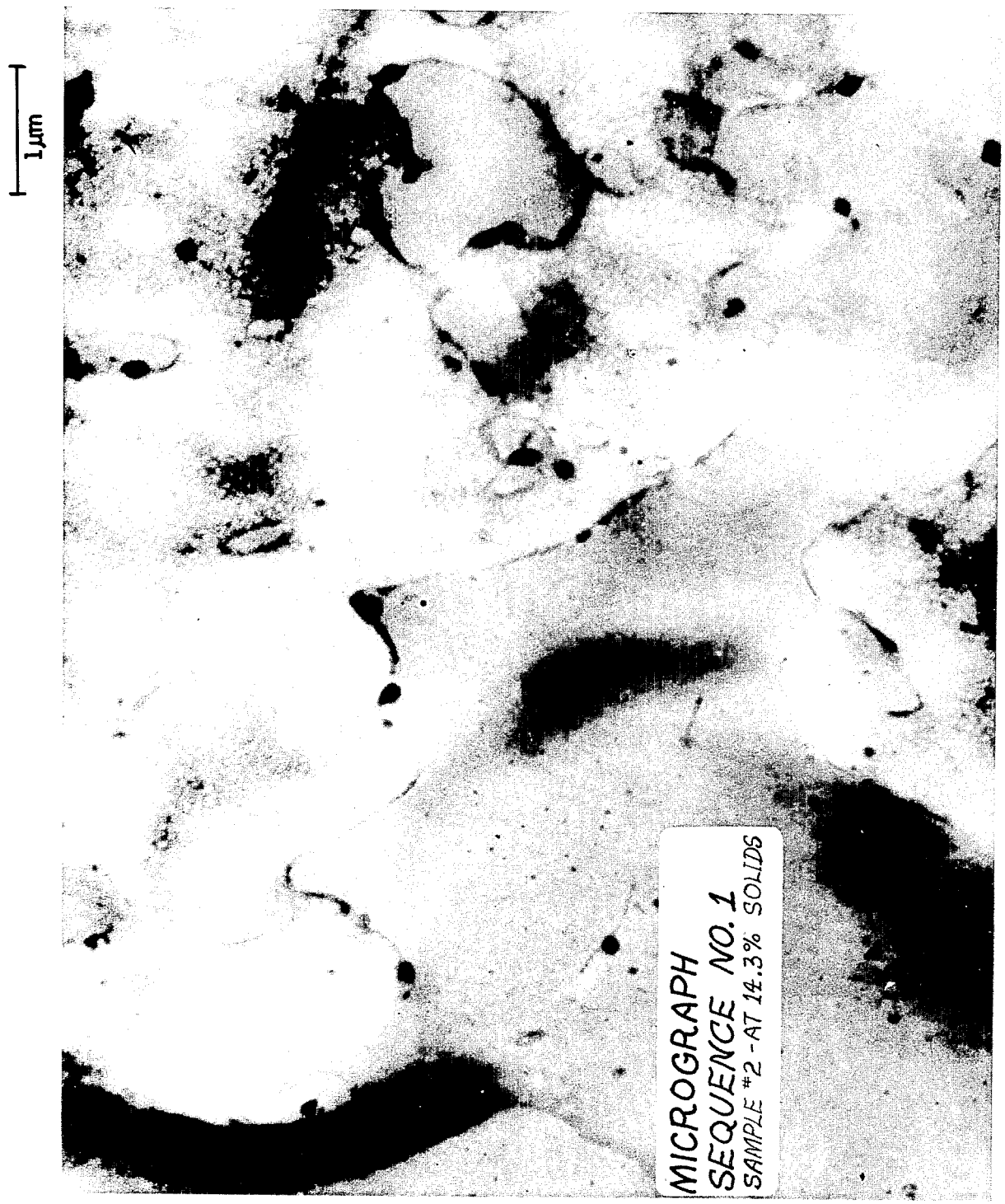
Figure 9:
Figure 10:
Figure 11:
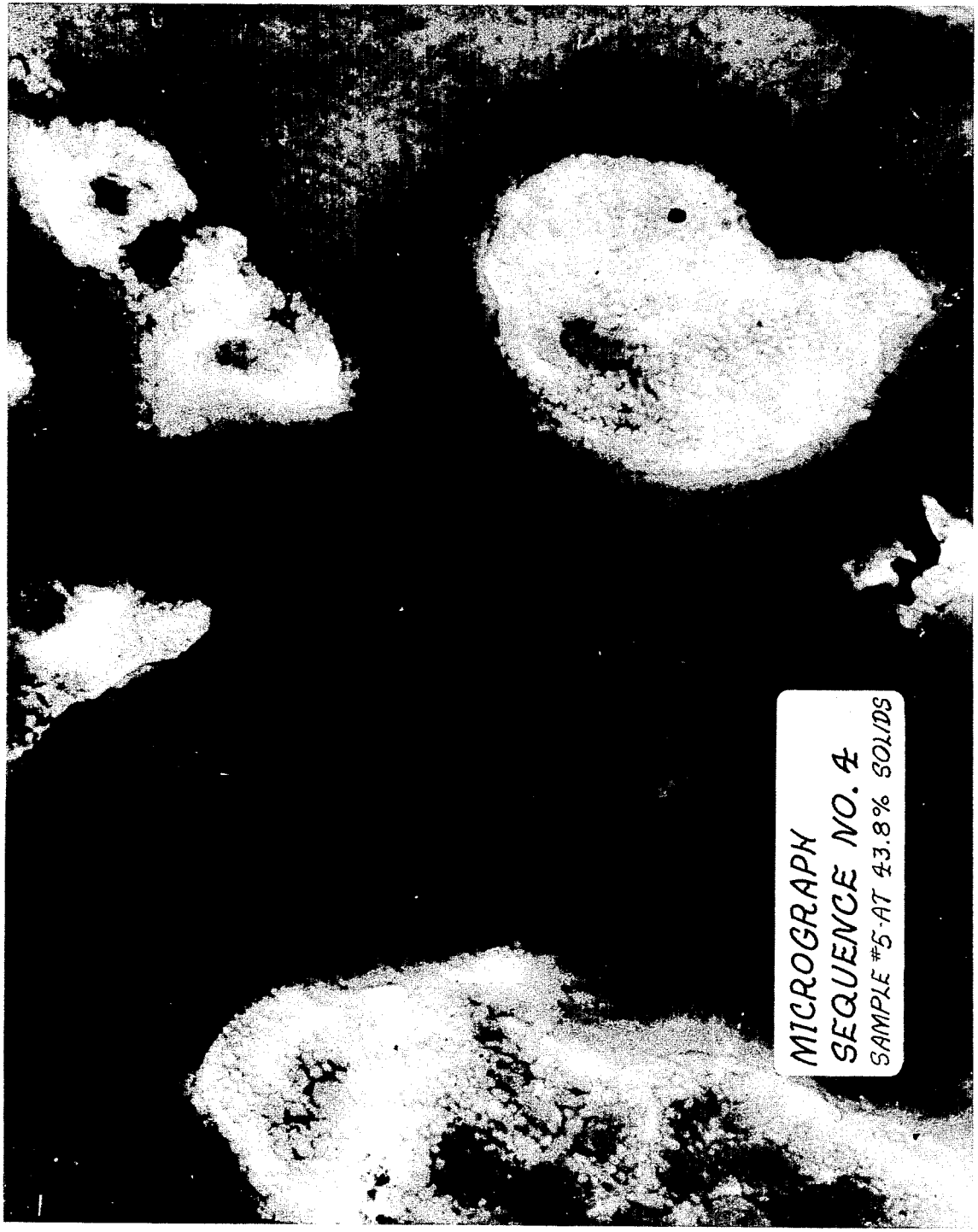

Rubber particles of HIPPO appear much differently under an electron microscope. The photomicrographic simulation of FIG. 7 illustrates a typical picture of HIPPO containing 7.8 wt. % of 85% PO/15% AGE rubber. Since the PE rubbers contain less residual unsaturation, staining by the osmium tetraoxide method results in a micrograph having a poorer contrast than that of PBu-modified. The FIG. 7 micrographic reproduction indicates that there is a much broader particle size distribution with PE particles vs. PBu particles. Other data support this conclusion, as evident in the graphical presentation of FIG. 20 HIPPO particle sizes generally range from 2-32μ. About 87% of the particles range in size between 2-10μ.

Particle shape varies from the elliptical types demonstrated with PBu-modified HIPS resins to those having long, stringy-type configurations. The heterogeneous nature of particle shape in HIPPO may actually offer physical property advantages over those resins containing particles whose shape is basically homogeneous.

Probably, at least as regards photomicrographic comparisons of HIPPO and HIPS, the most noticeable difference between PE and PBu particles is in PS occlusion size. The large occlusions in PBu particles are pointed out above. Occlusions in PE particles are generally much smaller, tending to be quite finely dispersed throughout the particles. In fact, the particles in a typical HIPPO resemble the cross section of a sponge. Such small occlusions result in a more compact rubber particle.

The size of the rubber particle in high-impact (inter)-polymers, including conventional HIPS, effects impact, tensile strength, and gloss. In general, as particle size increases, impact also increases; but tensile strength and gloss both decrease. Conversely, as particle size decreases, impact decreases and tensile strength and gloss both increase. It is crucial for rubber particles to maintain their integrity during high shear stress operations in order to retain good physical properties. The effect of shear on particle size is very important, especially in injection molding operations fabrications (wherein extremely high shear stress levels are ordinarily encountered).

The effect of shear on HIPPO loaded with 7 wt. % (85% PO/15% AGE) can be seen on two samples of resins having initial volume average diameters of 12.7μ respectively. For this, one-gram samples are placed in a heated cup at 200° C. A rotating piston is lowered into the cup so as to contact the softened resin. A 2 kg weight is used to keep a constant downward pressure on the piston assembly. Samples are taken periodically over 20 minutes. Particle size for each of the samples is then measured. The results are plotted in FIG. 19. The curves indicate that the resin containing rubber particles initially of 28.7μ are shear-degraded with time. Over 30% of the original particle size is lost for this reason. On the other hand, the resin containing an initial particle size of 12.7μ showed little or no sensitivity to shear in the apparatus employed.

The results indicate that: (i) shear stability of rubbery PE-elastomer particles is dependent upon the size of the particles themselves; and (ii) particles below ≅13μ are substantially shear stable using this test method.

Particle size in PBu-modified HIPS is known to be strongly affected by, inter alia, the applied rate and intensity of shearing during polymerization. To locate optimum shearing application effects (insofar as best particle sized and maximized impact properties of product are concerned) for many common styles of process equipment, tests may be made with an ordinary sort of auger-driven reactor. For this, a series of HIPPO resins is prepared using an 85% PO/15% AGE PE-elastomer with each sample in the series made using one of five different auger speeds. The epoxides are polymerized for 2½ hours at 100° C. before the temperature is raised to 135° C. to thermally polymerize the St.

Normalized impact values (which, as explained, allow for deviations in impact due to variation in rubber loadings) are obtained. When, as in the instance under consideration, rubber concentrations vary by only about ±1.5%, this is a reliable-enough property for product evaluation. Table XXI contains normalized impacts and particle sizes obtained at different auger speeds. From these data, 60 rpm is a obviously preferable agitation rate. It is the lowest agitation speed providing both good impact and small particle size. The final particle size of 11.7μ produced at this speed should be stable to further shear, per the showing in FIG. 21. The fact that optimum properties are usually obtained in conventional PBu-modified HIPS when the volume average diameter of the rubber particle is between 2–5μ is suggestive of the benefit of having similar particle size dimensions in HIPPO (and like or analogous PE-elastomer-modified products).

TABLE XXI

EFFECT OF AUGER SPEED ON PARTICLE SIZE AND IMPACT OF HIPPO

| Auger Speed* (rpm) | % Rubber | Notched Izod Impact Ft. lb./in | Normalized Impact | Particle Size (Volume avg. diameter) (μ) |
|---|---|---|---|---|
| 30 | 7.5 | 0.93 | 0.12 | 24.2 |
| 60 | 7.3 | 1.19 | 0.16 | 11.7 |
| 90 | 6.2 | 0.89 | 0.14 | 32.7 |
| 150 | 6.0 | 0.84 | 0.14 | 12.7 |
| 200 | 6.9 | 0.87 | 0.13 | 10.4 |

*Note: Nominal 6-inch ID auger-type reactor employed

Phase inversion in reaction masses in which rubber-modified (inter)polymerized impact plastics products are prepared is a commonly-recognized phenomenon. It is quite important for product quality and influential on particle size characteristics. Phase inversion normally occurs when enough polymer of the involved major monomer (such as PS) forms to become the continuous phase in the reaction mass. Prior to phase inversion, the rubber phase is the continuous phase. Phase inversion is usually accompanied by a large drop in viscosity of the reacting media. This viscosity change normally occurs for HIPPO and the like or analogous impact interpolymers when the contained solids content is between about 15 and 30 wt. %, based on weight of reaction mass. Such variables in given systems as: agitation rate; initial rubber concentration; grafting; etc., can influence the point at which the consequential phase inversion occurs. In PE-elastomer systems, for example, with loadings of ≅7 wt. % of an 85% PO/15% AGE polyether rubber, the phase inversion generally occurs upon attainment of a 15-25 wt. % solids level. This holds for most cases. With diverse given systems, however, it may start at a level as low as 10% or not occur until a level as high as 35% has been reached.

To demonstrate phase inversion effects on particle size, two resins containing 7% of 85% PO/15% AGE can be prepared in a nominal 6-inch ID auger-driven style of reactor. For one there is used a low agitation speed of 30 rpm. For the other, the agitation is at a high speed of 150 rpm. Samples taken for particle size measurement during the run demonstrate how particle size changes: (i) with degree of conversion; and (ii) under different shear stress levels. Wieh the exception of agitation rate, all other reaction conditions are identical for both of the resin preparations.

Figure 21:
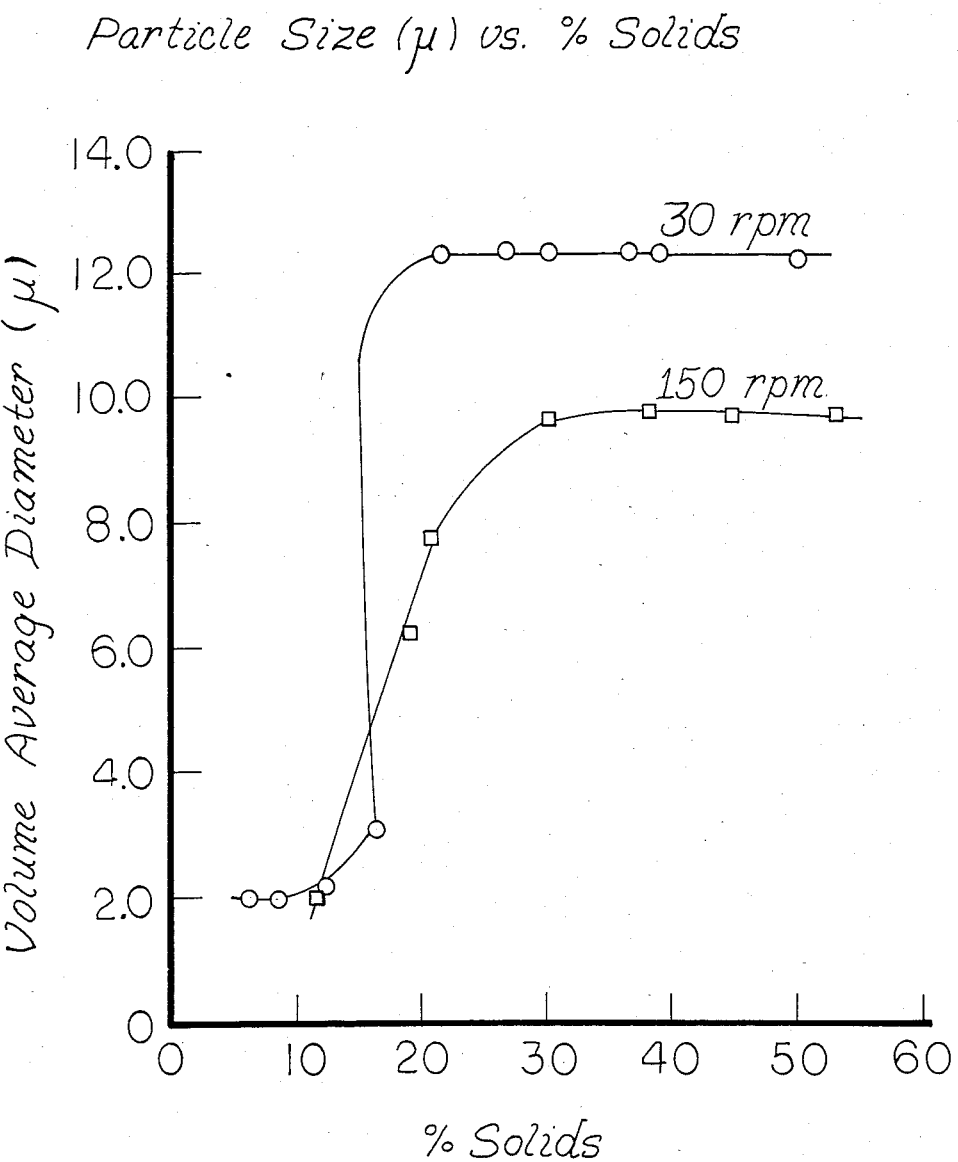

In FIG. 21, there are curves representing particle size at various levels of conversion. Prior to phase inversion (<15 wt. % solids), small particles on the the order of 2–3μ form in both cases. After phase inversion (>25% solids), particle size does not change, regardless of employed auger speed (i.e., applied shearing rate). During phase inversion (15–25 wt. % solids), particle size for the resin made at 30 rpm increased fater than that made at 150 rpm. From these data, it appears that to decrease particle size, modifications must be made before the end of phase inversion or at some point below ≅25 wt. % solids, Beyond this point, particle size appears to remain insensitive to applied shear at the involved levels in the auger reactor.

To facilitate getting good phase inversion in an (inter)polymerizing system of reactive rubber in polymerizing major monomer media, it is expedient in order to physically "force" the phenomenon at the best time therefor to apply an intense "burst" of shearing energy at about the initial level of solids content build-up in the reaction mass at which the desired transformation can be affected. This tends to reduce the rubber phase in the system from one of continuity to discontinuity with attendant optimum particle sizing and other good results. Usually, the "burst" is affected with an abrupt shearing intensity increase in system agitation. This should be an order of magnitude that is at least twice that applied in the preliminary, inversion-preceding (and ordinarily non-shearing) interval of the processing. Agitation intensity is often then increased as much as five- to fifteen-times, or even more, for the purpose.

In the absence of a quick escalation of "kinetic" shearing forces to create the "burst" to aid phase inverting (which overcomes the considerably viscoelastic forces in the involved rubber which are very high in PE-elastomers), the physical properties of the resulting product are not nearly so good. Sometimes, they may even be mediocre.

To understand the relationship of high shear to particle sizing, the changing microstructure of the involved particles may be observed, especially to note particle changes before and after intensified shearing. Table XXII shows how the particle size and percent solids change with time in a HIPPO loaded with 10 wt. % of a 95% PO/5% AGE rubbery PE-elastomer. The sequential electron micrograph reproductions in FIGS. 8 through 11, inclusive (representing the microstructure of Samples #2, 3, 4, and 5, respectively, in Table XXII) are indicative of this. A high burst of shear is administered between samples #2 and 3.

TABLE XXII

CHANGE IN PARTICLE SIZE AND PERCENT SOLIDS WITH TIME

| Sample #* | Time | Particle Size+ Volume Average Diameter (μ) | % Solids |
|---|---|---|---|
| 1 | 55 | <0.63 | 9.5 |
| 2 | 88 | <0.63 | 14.3 |
| 3 | 115 | 0.63 | 20.2 |
| 4 | 117 | 0.63 | 20.8 |
| 5 | 225 | 3.6 | 43.8 |
| 6 | 285 | 4.5 | 54.4 |
| 7 | 306 | 4.5 | 57.6 |

*Samples Devolatilized Overnight @ 145 C under Full Pump Vacuum to Determine Solids %
+ Particle Size Measurements Made On Devolatilized Samples At the same time, the electron micrograph reproductions of FIGS. 8–11 show that "particles" do exist at 9.5 wt. % solids; but that these are much larger than 0.63μ. In fact, these huge "particles" are probably better characterized as being an uninverted "rubber phase". Not until the high shear intensity is applied to the system do discrete particles form as observable in the FIGS. 10 and 11 micrograph reproductions.

Reduction to empirical or mathematical terms or explanation of the concepts or conditions of "shearing", "high-shear" and/or "shearing agitation" is difficult. The description seems better left to functional characterization and description. Nonetheless, what is involved is comprehended by those skilled in the art and experienced as to the phenomenon.

Regardless: (i) "low shear" may be described as an adequate extent or degree of mixing, stirring or other agitation to keep the fluid mass being treated in a state of efficient and thorough or intimate dispersion and intermixing; while (ii) "high-shear" and/or "shearing agitation" is that extent and intensity of applied forceful agitation necessary to cause phase inversion in and disruptive breaking up of a dissolved rubber-containing solution wherein the rubber occurs and is initially throughout disposed as a continuous or associated network in a substantially integral, non-discretely-particulated and at least substantially homogeneous phase.

As hereinafter further illustrated, impartation of shearing energy to the reaction mass being treated can be done by any of several (or simultaneously applied) mechanical mixing, stirring or agitating means. This is of particular importance to get the relatively intense energy force needed for "shearing agitation" for phase inversion (and thereafter). Thus, suitable apparatus to do this is adapted to mix, stir, shake, vibrate or otherwise agitate the mass; as with blades, paddles, impellers, forwarding auger or screw assemblies, ball and other (including roller) mills, recirculating pump means, ultrasonic inputting means, shakers and so forth.

PROCESSING PARAMETERS

Practice of the present invention, especially as to best modes of its accomplishment, is better comprehended by considering therewith the ways of making conventional rubber-modified impact polymer products. This is now done with reference back to FIGS. 1-5, inclusive, of the Drawing.

As mentioned, practice of the present invention is not restricted to continuous-process adaptations. It may also be done satisfactorily by batch-wise procedures, as in a single reactor wherein the chargings, temperature and agitation manipulations and so forth are performed without reaction mass flow in process transfer between sequentially disposed equipment units.

In simplified presentation, the instant process involves:

(1) First, putting the charge (usually a mixture) of Formula (I) monomers into a solution, which may have additional solvent in it, in the major monomer; then (2) Adding catalyst before or after Formula (II) monomer incorporation; then (or previously)

(3) Applying heat if elevated temperature is to be used for in situ PE-elastomer formation and, usually simultaneously, mixing the mass under low shear; during which (4) PE-elastomer forms; then (5) Adjusting conditions, often involving adding of major monomer polymerization catalysts and generally upward temperature adjustment, for polymerization and (when the PE is unsaturated) and grafting interpolymerization of major monomer with and in presence of the preformed PE-elastomer; and then (6) Converting the reaction mass to optimum intermediate formed-solids content for phase inversion; and (7) Applying high-shear agitation to cause actual phase inversion; followed by (8) Completing, to whatever reacted level is done, polymerization of major monomer; then (9) Finally, recovering, by devolatilization or otherwise, resulting HIPPO or like or analogous finished impact plastic product.

Figure 1:
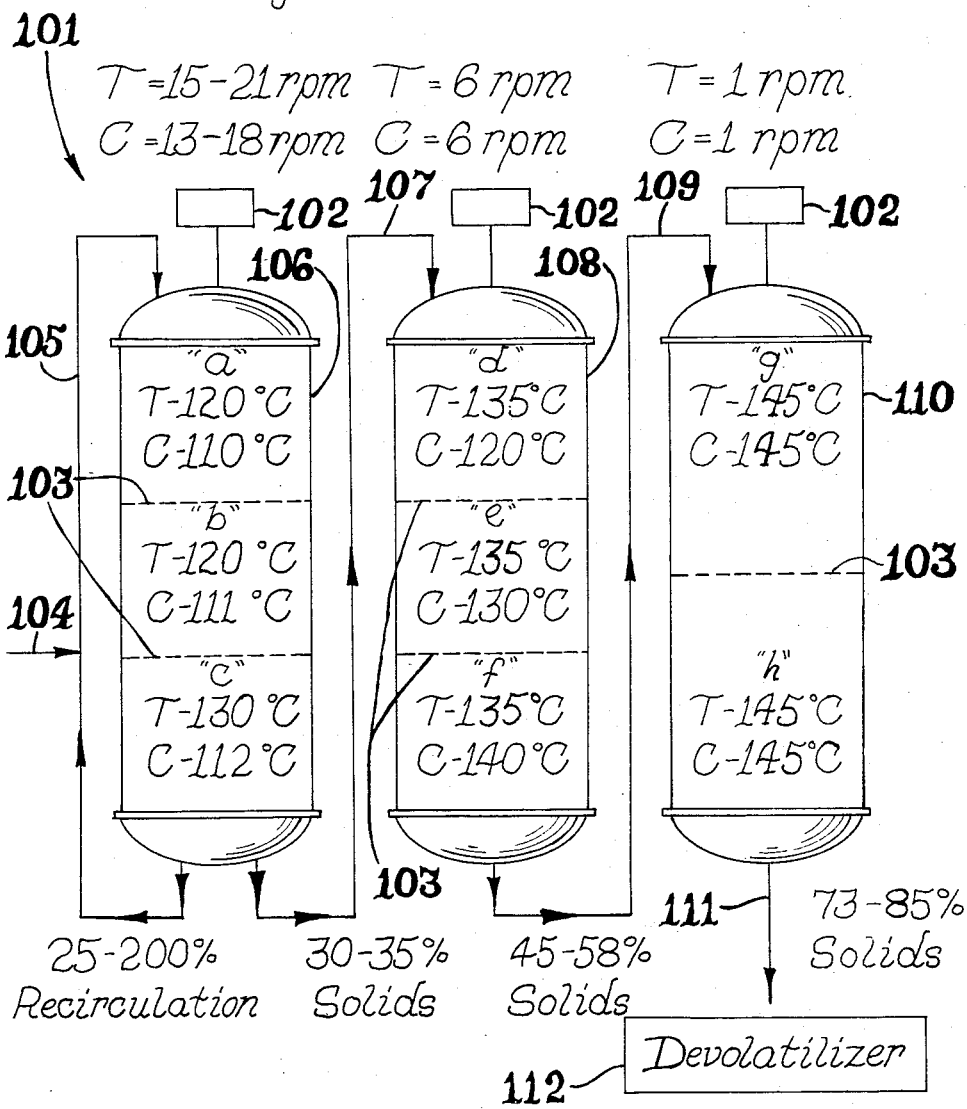
FIG. 1 is a flow sheet diagrammatic view fancifully showing the altered and varied conditions employed and encountered in a common sort of three-stage or -unit polymerization train for the manufacture of "HIPPO"

FIG. 1, as noted, provides a good representative scheme of temperature and mixing schedules for HIPPO production in a continuous, multi-stage processing facility (the same, of course, being adaptable to implementation in batch operations). In FIG. 1, the entire assembly is generally designated by reference numeral 101. In unit 101 there are: feed line 104 to first stage unit 106 in which, in a more-or-less "plug flow style" of downwardly moving material progression, there are sequential increasing-temperature regions or zones "a", "b" and "c" with mixers, as depicted by dotted-lines 103 driven by motor unit 102 operating substantially between sequential zones; recirculation line 105 for first stage unit 106; transfer line 107 from the bottom of first stage 106 to the top of second stage 108 (having outfitted therewith an analogous motor 102 and stirrers 103) in which rising temperature zones "d", "e" and "f" occur; transfer line 109 from the bottom of second stage 108 to third stage 110 (also rigged with a motor 102 and stirrers 103) wherein are temperature zones "g" and "h"; delivery line 111 from third stage 110; leading to devolatilizer or other recovery unit 112. Pumping and/or heating means are not illustrated in FIG. 1.

Figure 2:
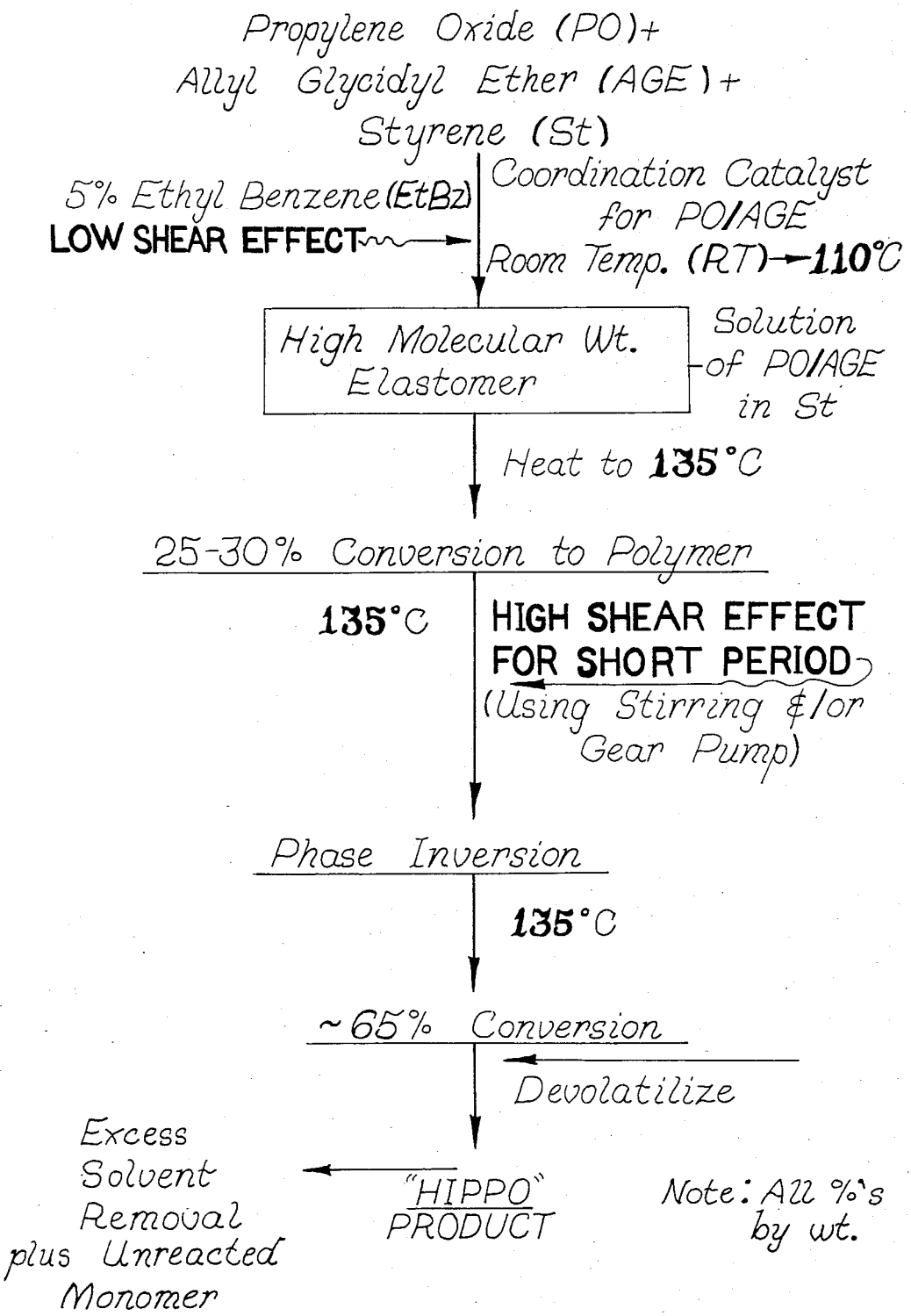
FIG. 2 is a procedural flow-pattern representation particularizing an advantageous procedure for "HIPPO" manufacture.

FIG. 2, a flow-depicting presentation self-explanatory in nature, portrays a good way of making HIPPO. In connection with FIG. 2, it should be understood that changes in indicated temperatures and other specifics can and usually are made to best make any particular given HIPPO product. Thus, raw and feed material variations and substitutions, as disclosed in the foregoing, may be charged in place of or along with PO, AGE, St and so forth. Other non-reactive solvents may be used with or instead of EtBz; and the best suited catalyst system utilized for converting particular Formula (II) monomer(s) to PE-elastomer. Conversion levels at various stages may be altered, as is most expedient for any given situation.

The temperature applied for in situ PE formation may be any at which the Formula (II) monomer polymerizes under influence of the catalyst and beneath catalyst decomposition elevations. Major monomer polymerization temperatures—depending on such factors as monomer or monomer-mixture reactivity, catalyst (if any) employed and so forth—may be suitable in a wide range falling between about 0° C. and about 200° C. The specifically-applied degree of heat levels more commonly used are measurable at temperatures from ambient room temperature (RT) to about 175° C. (in which range, by the way, most major monomers of interest tend to polymerize whether or not catalysis is mandatory or preferred). The consumption rate of monomer being converted to polymer should be about 15%/hour of the unreacted bulk of monomer remaining present in the involved reaction mass in process. Preferably and most frequently, major monomer polymerization is done in the 80°-150° C. temperature span; something in the relative neighborhood of 110° C. being very often utilized. Flow rates, capacity limits and capabilities, equipment sizes and other factors pertaining to actual process embodiment of course can be varied and adapted to measure up to manufacturing desiderata and/or exigencies of encountered situations.

With added reference to major monomer charges for processing and particle size characteristics in final product, it is possible to utilize some proportion of pre-polymerized (usually only to an incomplete extent and generally not more than half) major monomer in the Formula (II) dissolving feed wherein is done in situ PE formation. This, in some instances and for some purposes, can give surprising and useful effects and results. As mentioned in the foregoing, particle size in PE-elastomer-modified materials tends to remain unaffected after about 25% solids conversion level is reached in the reaction mass and obtained particles are quite small (2μ or less) at conversions of >10 wt. % solids, although inclined in increase in size with conversion.

From the two factors noted, it is deductible that particle size can be reduced if the Formula (II) monomers are polymerized in a prepolymer of major monomer (such as Ps) at a percent solids level that tends to stabilize the small rubber particles present. To illustrate this, St is polymerized at 135° C. to about 38 wt. % solids. Alkene oxide monomers and aluminum catalyst (in EtBZ) are then added to the prepolymer to make a composite concentration of 32.6 wt. % solids. The alkene oxides (85% PO/15% AGE) are then polymerized at 110° C. for 1 hour followed by St polymerization at 135° C. using 150 rpm auger speed.

Physical properties are shown in Table XXIII. A much smaller particle (4μ) was successfully produced using this process to prepare the resin. The impact strength of the resin was not particularly "high"; probably due to the gel value of 10.8%.

present in the supply mixture, it is made up by interjection. This is done using pump 144 from a storage vessel 143 through input feed conduit 127cf into feed line 127 at some intermediate point therein downstream of pump 144 and upstream of the inlet port for reactor 129. Downstream catalyst make-up is of advantage for provision of Component A of the catalyst (such as TEA).

Complete mixing of major monomer(s), Formula (II) monomer(s) and catalyst in (complete or incomplete presence) from supply tanks 122 and 123 is ensured by passage of the materials through pump 128. It is beneficial, especially when Component A of the catalyst system formulation is supplementally incorporated in the charge feed, to utilize a static mixer (such as an interfacial surface generator variety of appliance) 142 at a point in line 127 after all charge ingredients are therein contained for delivery passage into 1st-stage reactor unit 129R and through reactor 129R into reactor 129.

Reactor unit 129R beneficially is of the stirred tube variety and is employed to principally polymerize the ether component to form the PE elastomer.

Reactor unit 129 may advantageously be a stirred tube type of unit. It is beneficially operated in the three designated downwardly-descending, increasing-temperature-level zones with suitable mixing at the indicated rate as shown in the unit. At least approximately, the zones are individually situate. Progress between the respectively occuring zones is separated by rotatable mixing impellers 130. Detailed heating, stirring, and

TABLE XXIII

PHYSICAL PROPERTIES OF HIPPO MODIFIED WITH POLYETHER PREPARED IN POLYSTYRENE PREPOLYMER

| Rubber Composition | % Rubber | Notched Izod Impact Ft-lb/in | Normalized Impact | % Gel | Swelling Index | Particle Size (Volume Avg.) Diameter (μ) | $T_Y$ (psi) | $T_R$ (psi) | % Elong. | Tensile Modulus (psi × $10^5$) | Vicat Heat (°C.) | Melt Flow Sched. G g/15 min |
|---|---|---|---|---|---|---|---|---|---|---|---|---|
| 85% PO/— 15% AGE | 6.4 | 0.52 | 0.08 | 10.8 | 15.4 | 4.0 | 3678 | 2909 | 16.5 | 3.56 | 96 | 2.018 |

Figure 3:
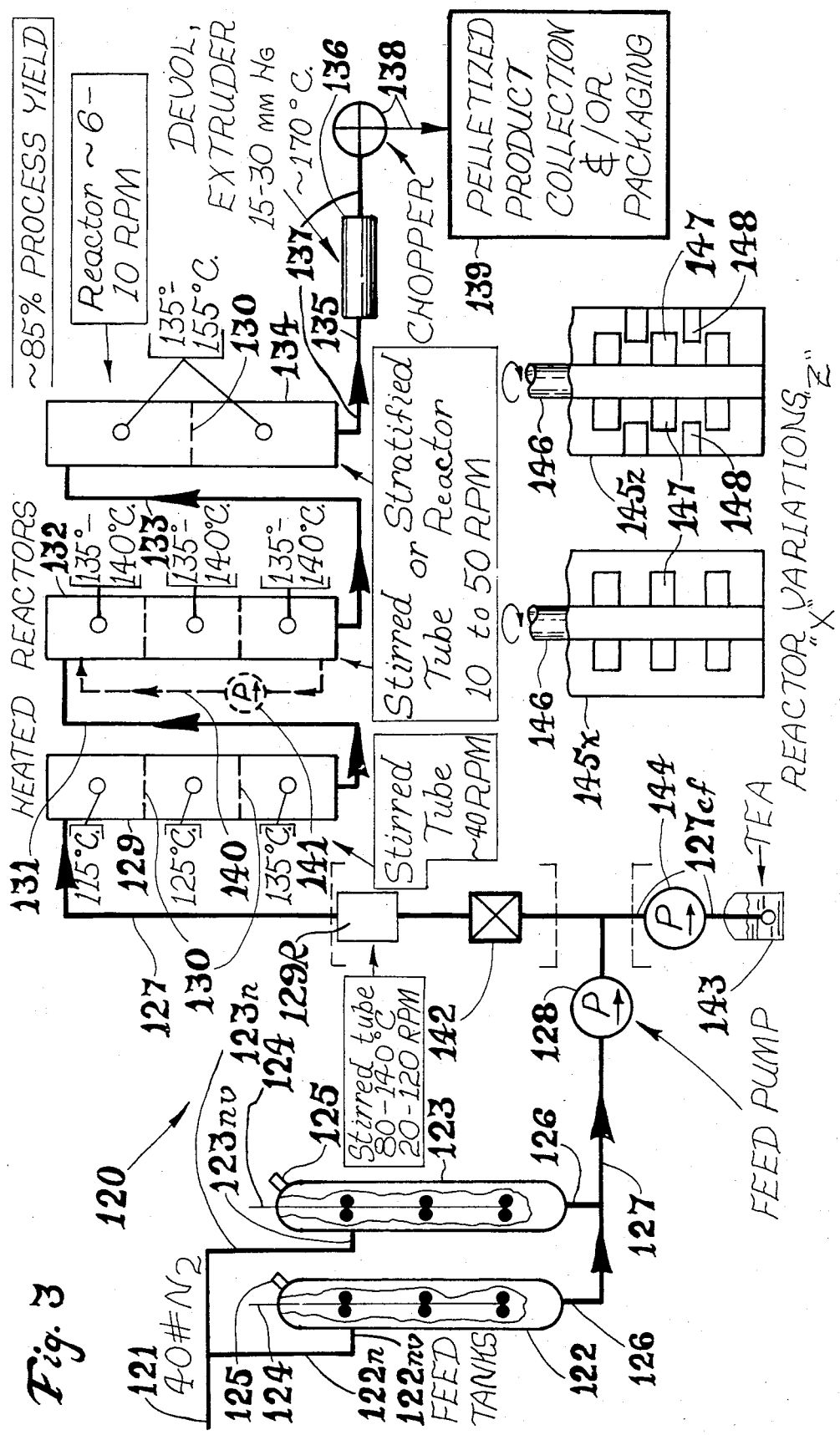
FIG. 3 is a simplified schematic elevation view, broken-out in certain places, of a suitable manufacturing installation for "HIPPO" and the like and analogous impact polymer products.

FIG. 3 is a schematic flow-sheet representation. It shows an equipment assembly, designated generally by reference numeral 120, for continuous process manufacture of HIPPO or the like in a four-stage reactor train mode of installation.

Assembly 120 commences (as is drawn in on the left-hand side of FIG. 3), with respective feed tanks or reservoirs 122 and 123. These, advantageously are inertly-atmosphered by pressurization under nitrogen. The gas is provided under nominal pressure (40 or so psig) from N₂ supply line 121 leading into tanks 122 and 123 via the respective distribution conduit and gas control valve networks 122n and 122nv and 123n and 123nv. Each of the tanks is provided with internal stirrers 124 and have filling ports 125. Outlet valves 126 control feed supply from the tanks into feed line 127 leading through forwarding pump 128 into the 1st-stage reactor unit 129R.

The feed tanks 122 and 123 contain the supply mixture of major monomer supply (such as St) and Formula (II) monomer which usually contains some solvent (such as EtBZ). If desired and alternatively, the major monomer and the Formula (II) monomer may be separately held in the respective feed tanks 122 and 123 for mixing after individual withdrawals therefrom.

All, or advantageously, only part of the catalyst components are included with the supply mixture in tanks 122 and 123. When incomplete catalyst composition is purposive mixing and many other commonly used auxiliary means to employ are not shown in connection with the 1st stage nor elsewhere illustrated in FIG. 3. Likewise, the unit 129 in particular (as is brought forth in the preceding FIG. 1) may have recirculating means associated therewith which are not shown therewith in FIG. 3. Either or both of the subsequent stages of the train may, optionally, be similarly equipped. One such provision is phantomly included in dashed-line representation mounted with the reactor unit 132. This consists of recirculating line 140 and pump 141.

The reactor 132, supplied from 1st-stage unit 129 via transfer line 131 connecting the bottom outlet of reactor 129 to the top inlet of unit 132, also has the noted three temperature zones and designated mixing rate. It is in the reactor 132, due to the greatly intensified, high-shear rate of mixing or agitation therein applied, that phase inversion is caused to occur.

In implementation, the reactor 132 (and/or, for that matter, the subsequent unit 134) may be either a stirred-tube form of unit or a so-called stratified reactor. These, respectively and very simply, are depicted as Reactor Variation "X" and Reactor Variation "Z" in FIG. 3. The former is identified by reference numeral 145x; and the latter by 145z. Both units 145x and 145z carry their impeller or blade elements 147 on rotatable agitator shafts 146. The stirred tube version 145x consists primarily of these parts; while the stratified form 145z is additionally fitted with spaced, inwardly extending arm or stud members secured stationarily against the inner reactor surfaces and interdigitating with the moving (or movable) blade elements 148.

From the lower section of reactor unit 132, the phase-inverted reaction mass is passed through transfer line 133 to the final reactor unit 134. This has two zones which commonly are kept at the same temperature level. This temperature is usually greater than that in the reactor 132 and is appropriate for polymerization finishing.

The reaction mass is usually taken in unit 134 to a solids conversion level (effectively, process yield of polymerization) of ≅65%. Almost invariably, this level is at least about 70%. From reactor 134, the completed polymerizate is passed through outlet conduit 137, to a devolatilizing extruder 136 (or equivalent). It is then cut, chopped or otherwise comminuted in and by chopper 138. In the desired pelletized or granulated form, it is packaged at the collection and/or packaging station 139 as completed product ready for molding fabrication or other use.

Not illustrated in FIG. 3 are points for optional or required additive and supplemental ingrediential incorporations and/or other material interblending or inclusion manipulations or means for accomplishment thereof.

If desired, the apparatus 120 is readily modified to operate using preformed PE elastomer. Tanks 122 and 123 are provided with a solution of the PE elastomer in styrene and storage vessel 143, pump 144 and reactor 129R are eliminated.

Good HIPPO products have been made with apparatus embodiments constructed in the way taught in FIG. 3. Product variations were also made in units of the installations utilized. In all of the instantly related cases, the HIPPO was prepared from about 10.4% or 95% PO/5% PE and St monomer using the preferred form disclosed of the catalyst and following the heating and agitating schedules above outlined.

Table XXIV sets forth properties of some of the typical materials made.

TABLE XXIV

PHYSICAL PROPERTIES OF TYPICAL HIPPO POLYMERS

| | Resin Product | | |
|---|---|---|---|
| | "CC" | "DD" | "EE" |
| Tensile yield | 3200 | 2700 | 2611 |
| Tensile break | 2337 | 2200 | 2139 |
| Elongation | 6% | 32% | 21.2% |
| Modulus | 3.36 | 3.31 | 3.08 |
| Impact | 0.55 | 0.91 | 2.20 |
| Melt Flow, "Sched. G" | 5.96 | 8.16 | 0.70 |
| Particle Size ($\mu$) | 8.7 | 10.0 | 6.5 |

The Runs for preparation of the Resin Products described in Table XXIII were substantially duplicated excepting: (i) in one additional series, to use a stirred tube reactor for the second stage and alter agitation rates and employ for one of the further Runs extra circulation in the stage; and (ii) in a still further series, do the same as in (i) but employ a stratified reactor as the 2nd-stage processing units. Resulting product characteristics are included in Tables XXV and XXVI.

TABLE XXV

HIPPO PROPERTIES WITH STIRRED TUBE REACTOR IN SECOND STAGE

| | Resin Product | | |
|---|---|---|---|
| Properties | "JJ" (Low Shear) 6 rpm (2nd Stage) | "KK" (High Shear) 80 rpm (2nd stage) | "LL" (Recirculation) 6 rpm (2nd stage) |
| Flexural Strength (psi) | 2750 | 2559 | 2025 |
| Flexural Modulus ($\times 10^5$) | 3.26 | 3.26 | 3.32 |
| Elongation (%) | 3.3 | 8.8 | 17.3 |
| Heat Distortion Vicat | 99° C. | 100° C. | 101° C. |
| Notched Izod | 0.68 | 1.82 | 2.48 |
| Particle Size ($\mu$) | 8.0 | 6.0 | 3.0 |

TABLE XXVI

HIPPO PROPERTIES WITH STRATIFIED REACTOR IN SECOND STAGE

| | Resin Product | | |
|---|---|---|---|
| Properties | "GG" 6 rpm | "HH" 6 rpm (With Recirculation) | "II" 80 rpm |
| Flexural Strength (psi) | 2128 | 2103 | 2134 |
| Flexural Modulus ($\times 10^5$) | 3.25 | 3.25 | 3.0 |
| Elongation (%) | 24.0 | 25.9 | 30.0 |
| Heat Distortion Vicat | 98° C. | 97° C. | 98° C. |
| Notched Izod | 2.85 | 2.47 | 2.13 |
| Particle Size ($\mu$) | 1.5 | — | — |

Effective recirculating means may be made of gear pump recirculating set ups as shown in the schematic flow-sheet representation of a detached part of a train assembly (generally identified by reference numeral 150) as shown in FIG. 4 of the Drawing. Such a recirculation unit helps agitation and shear considerably in any reactor unit with which it is associated. It is adapted, for example, to be the style employed in the indications thereof made in FIGS. 1, 2 and 3 (Resin Products "KK" and "HH" respectively reported in Tables XXV and XXVI having resulted from equipment with 2-stage reactors so equipped). In the assembly 150 there is a first (or upstream) stage reactor unit 152 feeding on through transfer line 153 to the next sequential second (or downstream) stage 157. Inlet conduit 151 charges to the top of 1st unit 152. Outlet conduit 158 serves as the port for material withdrawal from 2nd unit 157.

The gear pump recirculator outfit is comprised of: a draw-off line 154 in fluid passing communication with transfer line 153 at a downstream coupling point which line 154 leads to; a high shear gear pump unit 155 from which through feed-back line 156 the pump-sheared material is passed back into transfer line 153 at an upstream point of connection. While some of the fed-back material is recirculated upstream into line 153 for forwarding as feed to unit 157, a major proportion thereof usually tends to divert countercurrently from the forward-in-conduit joint of lines 156 and 153 through the diverted flow-carrying section of line 153, designated by reference numeral 153d, toward the rearward-in-conduit joint of lines 154 and 153.

The intense action of the gear pump accessory 155 on recirculated material so by-passed for shear intensification materially assists realization of desired effects.

In many instances, the finally resulting properties of HIPPO (and the like or analogous) products can be further enhanced by upstream inclusion and use in a continuous process train (or for charging to a batch operation) of a rubber pre-former unit. This may be of the so-called off-set-blade variety. One fancifully depicted style of such an equipment is shown in FIG. 5, wherein it is generally identified by reference numeral 160. Rubber pre-former units are ordinarily installed as the initial reaction-commencing post of a continuous-process train; either in place of a more-conventionally employed 1st-stage reactor unit or in conjunction therewith.

The pre-former 160 is comprised of a reactor body or shell 162. This is usually of elongate cylindrical configuration adapted to vertically standing placement. An inlet feed port 161 is at the top of body 162 and an outlet or withdrawal port 168 at its bottom. Within the body and disposed longitudinally therein is a rotatable drum or barrel 165 mounted on a central drive shaft 163 which is turned by means not shown. On the drum and projecting therefrom in staggered inter-row arrangement are a plurality of courses of elongate bar-shaped impeller attachments or studs 166 (shown in lateral extensions) and 167 (shown in top plan view). Frequently there are four vertically extending (along the length of the cylindrical surface of drum 165) courses of the impeller projections 166 or 167, although more or less can be had in any given design. While the courses of projections 166 and 167 are laid generally parallel with the axis of drum 165 and axle shaft 163, the rows thereof are fixed in a circumferentially encircling pattern about the drum.

As shown, the impellers are arranged in alternately staggered spaced fashion. Thus, the projecting impellers 166 and 167 in each respective row are in a plane above or below those in the adjacent course and "checkered" inter-relatively out of index. The physical, somewhat "shredding", action of the impellers does very well in mixing and imparting some modicum of particle size control to the PE rubber being formed in the unit.

To illustrate the benefit of pre-former use, two more Runs were made essentially as above specified excepting to employ the unit in one of them. The product properties obtained are included in Table XVII which follows.

TABLE XVII

PHYSICAL PROPERTIES OF HIPPO POLYMERS WITH PRE-FORMER USAGE

| Properties | Resin Product | |
|---|---|---|
| | "MM" | "MM-X" (With Pre-former) |
| Tensile yield | 2611 | 3125 |
| Tensile break | 2139 | 2000 |
| Elongation (%) | 21.2 | 16.8 |
| Modulus | 3.08 | 3.47 |
| Impact | 2.20 | 3.06 |
| Melt Flow "Sched. G" | 0.70 | 0.67 |
| Particle Size ($\mu$) | 6.5 | ? |

While not restricted to equipment limitations or styles of apparatus design and placement, it is evident that processing in practice of the present invention is better done when particular sorts of installations are provided for the manufacture. This, as brought forth, entails utilization of multiple stage effects wherein sequential reactor units (ordinarily three) are interassembled and cooperatively operate in a continuously processing train.

In this, a variety of satisfactory specific styles of stirred or agitated reactor units may be utilized. As disclosed, stirred tube and/or stratified reactor assemblies are quite often satisfactory for use in the train. However, there may sometimes be encountered some difficulty with such types of machinery. This is due to the tendency, in operation and use, of the inherently thick resinous materials being processed and handled to "climb up" stirring shafts, especially at greater rotational speeds necessary for increased agitation effects.

Problems of this nature can usually be overcome by use of a pressurizable, auger-driven style of reactor (particularly one having an open, hollow core or center). Both Formula (II) monomer polymerizations and major monomer polymerizations can be readily conducted in such reactors using the here-disclosed procedures. A unique feature of such a reactor is its ability to facilitate an ease of agitation as an immediate consequence of the high viscosity of resins being handled in process. As polymerization proceeds in the reaction mass and viscosity builds, the thick solution is forced downward by the mechanical action of the internal auger or worm. Simultaneously, an equal volume of resin is displaced up through the center of the hollow auger and out onto the top of the auger where it is recirculated. Formula (II) monomers are polymerized in such a reactor with no problem. Agitation speeds ranging from 1 to 400 rpm are readily and practically attained with such a reactor, especially when its nominal ID is about 6 inches (Ca. 15.24 cm). And, heating and temperature control thereof is straightforward and of no difficulty. Employment of auger-driven units often renders easier assurance of better process control. They, of course, may be utilized in various size ranges (depending on need) from small and laboratory size units to large apparatus adapted to commercial use. And, as is apparent, the precise optimum rotational speeds to utilize for affecting desired agitation intensity varies with the particular flight diameter, pitch and so forth of the auger employed.

Auger-type units in the 1st-stage reactor are often beneficial to make very good quality products when purposely very low shearing effects are used in the PE formation. As demonstrated, good impact strength is ordinarily obtainable when the rubber polymerization is conducted under essentially "no-shearing" conditions (even in an almost quiescent state) followed by the agitated (sheared) polymerization of the solvent for the St or other major monomer.

To particularly demonstrate this, an experiment was conducted to prepare a HIPPO resin containing an elastomer comprised of 85% PO/15% AGE. This was done by polymerizing the alkene oxides in a small scale, nominal 6-inch ID auger-driven reactor at 110° C. for 1 hour at 9 rpm. The temperature was then raised to 135° C. to thermally polymerize the St solvent. After the resin reached 135° C., a slight exotherm to 138° C. was noted. At this point, the agitation speed was increased to 90 rpm. This rate of agitation was maintained until the resin was dumped for devolatilizing.

Physical properties of the resin made by this process and compared to one similar produced in a stratified reactor are listed in Table XXVIII. Both good impact and small particle size were thereby obtained, as well as other good physical properties. The much higher gel phase volume obtained probably contributed to the much higher impact strength produced.

TABLE XXVIII
PROPERTY COMPARISON OF HIPPO MADE IN STRATIFIED REACTOR VS. AUGER-DRIVEN REACTOR

| Reactor | Composition | % Rubber | % Gel | Swelling Index | $T_Y$ (psi) | $T_R$ (psi) | % Elong. | Tensile Modulus (psi $\times 10^5$) | Notched Izod Ft-lb/in | Melt Flow Rate (Sch. G.) | Vicat Heat Distortion (°C.) |
|---|---|---|---|---|---|---|---|---|---|---|---|
| Stratified | 85% PO/-15% AGE | 6.9 | 17.8 | 28.1 | 4528 | 4285 | 12.7 | 3.31 | 1.50 | 0.73 | 108 |
| Auger-Driven | 85% PO/-15% AGE | 6.1 | 13.9 | 16.5 | 1678 | 4122 | 4.0 | 3.63 | 0.87 | 1.20 | 106 |

For consistency, and precise interpretation of certain of the herein-given data (and should reproductions be made), the amount of major monomer (e.g., St) grafted onto the rubber and the degree of crosslinking present in the rubber phase are measured using a standard toluene-centrifugation method. This simply involves dissolving a 0.5 g sample of resin granules in 30 ml TO overnight. The continuous polymer (e.g., PS) phase dissolves leaving the insoluble gel (rubber) phase behind. The solution is centrifuged at 20,000 rpm at 5° C. The supernatant is decanted off the gels (which contain the grafted and occluded PS). This wet gel is weighed and then dried in a vacuum oven at $\simeq 100°$ C. overnight. The dry gel is weighed. The two calculations are performed per the following Equations:

$$\% \text{ Gel} = \text{Dry Gel Wt./Sample Wt.} \times 100\%; \quad (3)$$

and $$\text{Swelling Index} = \text{Wet Gel Wt./Dry Gel Wt.} \quad (4)$$

Karl-Fischer standardization is done by diluting stock KF Reagent with a solution of 50/50 by wt. pyridine/MeOH. The conductivity detector is then adjusted to $\simeq 30$ microamps with either the KF reagent (if the detector contains water) or with a wet methanolic solution (if the detector is too dry). A sample of the disodium salt of tartaric acid is weighed into the detector (the salt containing 15.65 wt. % water as the hydrate). The diluted KF reagent is used to titrate the detector back up to 30 microamps. The ml of reagent required to do this this is noted. The pertinent Factor (as ppm water/ml reagent) is determined as follows:

$$\text{Factor} = \frac{\text{wt. salt} \times 0.1565}{\text{ml reagent}} \times 10^6 = \frac{\text{ppm water}}{\text{ml reagent}}$$

It is preferred to have a factor $<50$ ppm/ml for greater accuracy in the water determination. If the factor far exceeds this value, further definition with methanol/pyridine is required and the procedure described above is repeated.

Generally, ASTM Test Procedures were and are employed for most physical property testings and determinations including Test Methods: #D256 (Method D) for Impact Strength; #D638 for Tensile Strength, Tensile Modulation and % Elongation; #D1238 (Schedule "G") for Melt Flow Rate; and #D1525 for Vicat Heat Distortion.

OPTIMIZED CATALYST USAGE

To get most satisfactory product especially for commercial needs, there are significant guidelines to follow. These are particularly related to HIPPO and like products manufactured with alkenyl aromatic, especially St, major monomer constituents. Involved in this are: color formation tending to occur during polymerization; free radical catalyst effects on final polymerized product properties; and major monomer polymerization rates.

Good generalities to follow for this are:
(1) PE catalyst concentrations should be at least about 4.5–4.6 mole % (based on PE) to realize optimum mechanical properties of HIPPO and the like products; even though
(2) Catalyst levels below that above-indicated tend to result in improved color; while
(3) Water addition (which tends to destroy the coordination catalyst and produce a white polymer) is better after 30% conversion so as not to excessively lower the mechanical properties; and
(4) In PE-modified systems, free radical catalysts do not substantially increase the polymerization rate or grafting as they do in the PBu-modified systems, with quite poor properties resulting for the former when free radical catalysts are added at the beginning of polymerization of the first-charged reaction mass; it appearing that
(5) Addition of free radical catalyst at 45 to 50% levels of conversion tends to significantly improve the melt flow of the product without decreasing other physical properties; and
(6) Water addition, prior to free radical catalyst addition, will result in very white polymer product with improved melt flow characteristics.

The foregoing was ascertained in a series of experimentations undertaken for purposes of determining same. These were conducted with an auger reactor as described in the foregoing. The monomers and EtBZ were combined in a vessel with the 2,4-P, PhTh and mineral oil ("MO"). This mixture was stirred until dissolution of all components. It was then added to the reactor which had been purged with nitrogen. After this, the agitator was started to fully wet the reactor walls; then stopped. A small sample ($\simeq 1$ ml) was removed using a dry syringe and the water concentration was determined by the Karl Fisher method. The water concentration was then adjusted to the desired amount by addition of water. The agitator was started and allowed to stir at 300 rpm for 10 minutes. The TEA was weighed out using a dry syringe, after which it was added to the reactor. The reactor was sealed and pressure tested for leaks using 30 psi of nitrogen. The nitrogen pressure was vented and the reactor temperature control set at 110° C. When the temperature of the reactants reached 90° C., the agitation rate was reduced to 9 rpm. These conditions were maintained for a period of thirty minutes after the temperature of the reactants reached 110° C. At the end of the 30 minutes, the temperature was increased to 135° C. When a noticeable exotherm was observed, the rate of agitation was increased to 300 rpm, and maintained for 30 seconds. This short burst of high shear forced phase inversion to occur. The agitation rate was reduced to 90 rpm and maintained there for the remainder of the reaction.

The reaction was monitored every 30 minutes for percent conversion and a rubber viscosity sample was taken 55 minutes after the heaters were turned on. The rubber sampling point was held constant for all reactions, so the efficiency of the coordination catalyst levels could be studied.

An injection port was used to introduce additives such as water, peroxides or monomers during the reaction. The receiver on the injection port was pressurized higher than the reactor, thus allowing materials to be added. When water was added to destroy the coordination catalyst, ethane was evolved, and the pressure on the reactor had to be vented to below 30 psi.

The polymer products were removed from the reactor and devolatilized under 30 mm Hg at 170° C. for three hours to remove unreacted monomers and solvent. The polymer was then ground and compounded on rolls at 220° C. for 5 minutes prior to molding and testing.

The largest contributor to color formation in PE-modified (inter)polymerized product(s) seems to be residual coordination catalyst from the PE polymerization. To investigate this, three coordination catalysts levels were evaluated. These were 1.14, 2.28 and 4.56 mole %, based on the total Formula (II) monomer present. The composition of the HIPPO polymer product evaluated contained 7 wt. % of an 85 mole % PO/15 mole % AGE copolymer, 1.26 wt. % MO and 91.74 PS. The properties of these polymers are set forth in Table XXVIX.

the polymer properties are closer to general purpose PS than to that of a high impact polymer. The molecular weight of the PS phase of these samples varied from about 254,000 to about 260,000.

The polymers produced at lower catalyst levels have improved color; but the physical properties are not as acceptable as compared to those having 4.56 mole % concentration.

Next, the addition of water during polymerization was investigated to see if it provided a good way to improve the color (since it reacts with the TEA and decomposes the coordination catalyst). Two formulations were prepared to evaluate the effect of addition of water at different levels of conversion in the reactor. The first was an 85/15 mole % PO/AGE at 7 and 10 wt. % loadings. The water was added to the reactor at 18% conversion and the polymerization continued at 135° C. The data in Table XXX indicates a loss of impact of $\cong 0.5$ ft lbs/in of notch with the addition of water. The same trend is true with 10% PE-rubber in the product. Incomplete PE polymerization at that point of water addition may have been responsible for this (explaining the lower impact strengths obtained). The second series of samples were prepared having a rubber composition of 95/5 mole % PO/AGE at 10 wt. % loading in the final polymerized product. The addition point of water was extended to 54% conversion to ensure complete polymerization of Formula (II) monomer.

Table XXXI includes data comparing the properties of a sample that had no water added to a sample that had 10 ml of water added at 54% conversion. The properties show that the addition of water, at a later degree

TABLE XXIX

EFFECT OF COORDINATION CATALYST CONCENTRATION
85/15 PO/AGE

| Coordination Catalyst Concentration | PE-Rubber Wt % | PE-Rubber [η] dl/g | $T_R$ PSI | Tensile Elongation % | Tensile Modulus psi × $10^5$ | Notched Izod ft lbs/in Notch | Swelling Index | Dry Gel % |
|---|---|---|---|---|---|---|---|---|
| 1.14 mole % | 6.90 | 1.37 | 3545 | 1.0 | 3.83 | 0.63 | 23.5 | 6.7 |
| 2.28 mole % | 7.18 | 2.25 | 2285 | 8.8 | 3.78 | 0.89 | 29.5 | 10.2 |
| 4.56 mole % | 7.35 | 6.04 | 2767 | 30.3 | 3.27 | 1.76 | 24.4 | 16.9 |

When lower levels of catalyst are used, incomplete PE polymerization is indicated by low intrinsic viscosity of the PE-Rubber, low impact, and low dry gel content. In the case of 1.14 and 2.28 mole % catalyst, of conversion, will not affect the final properties. It also shows that the polymers produced with addition of water are very white, even after devolatization.

TABLE XXX

EFFECT OF WATER ADDITION AT 18% CONVERSION ON PROPERTIES
4.56 MOLE % COORDINATION CATALYST

| Composition | Amount Water ml | PE-Rubber Wt % | Rubber [η] dl/g | $T_R$ PSI | Tensile Elongation % | Tensile Modulus psi × $10^5$ | Notched Izod ft lbs/in Notch | Swelling Index | Dry Gel % |
|---|---|---|---|---|---|---|---|---|---|
| 85/15 PO/AGE | 0 | 7.35 | 9.82 | 2767 | 30.3 | 3.27 | 1.76 | 24.4 | 16.9 |
| 85/15 PO/AGE | 25 | 7.00 | 7.37 | 3207 | 11.0 | 3.64 | 1.24 | 20.2 | 15.1 |
| 85/15 PO/AGE | 0 | 9.50 | 6.06 | 2316 | 20.7 | 3.01 | 2.92 | 17.1 | 20.8 |
| 85/15 PO/AGE | 10 | 9.69 | 13.26 | 2511 | 27.8 | 3.64 | 2.52 | 18.5 | 20.8 |

TABLE XXXI
EFFECT OF WATER ADDITION AT 54% CONVERSION ON PROPERTIES 4.56 MOLE % COORDINATION CATALYST

| Composition | Amount Water ml | PE-Rubber Wt % | Rubber [η] dl/g | $T_R$ PSI | Tensile Elongation % | Tensile Modulus psi × $10^5$ | Notched Izod ft lbs/in Notch | Swelling Index | Dry Gel % |
|---|---|---|---|---|---|---|---|---|---|
| 95/5 PO/AGE | 0 | 9.8 | 12.9 | 1850 | 20.1 | 3.31 | 2.73 | 26.2 | 14.5 |
| 95/5 PO/AGE | 10 | 9.9 | 12.2 | 1967 | 9-20 | 3.15 | 3.03 | 27.0 | 15.1 |

The second area explored was the use of free radical catalysts. In the production of high impact PS using butadiene elastomers,

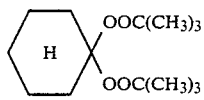

(IV)

which is 1,1bis-di-tert.-butyl peroxy cyclohexane is a good free radical catalyst to use. It is hereinafter referred to as "Catalyst X".

In this use, the free radical catalyst: (i) improves the grafting of St to the rubber particles; (ii) lowers the oligomer concentration; and (iii) increases the polymerization rate of the St without affecting the molecular weight. To see if incorporation of a free ratical catalyst might be advantageous to a PE-reinforced system as well, the effects of the catalyst were evaluated by three different techniques, as follows:

(A) The radical catalyst was added to the monomer mixture prior to the addition of TEA including, as radical catalysts for the purpose, Catalyst X, benzoyl peroxide, t-butyl peroctoate, dicumyl peroxide and di-t-butyl peroxide. The polyether-elastomer composition used for this study was 85 mole % PO/15 mole % AGE, 7 wt. % rubber concentration in the final product. The data in Table XXXII indicate all the peroxides have the same effect. This namely, is that the impact properties are lowered. The molecular weight of the PS phase is also lowered while the Schedule "G" melt flow increases.

Figure 26:
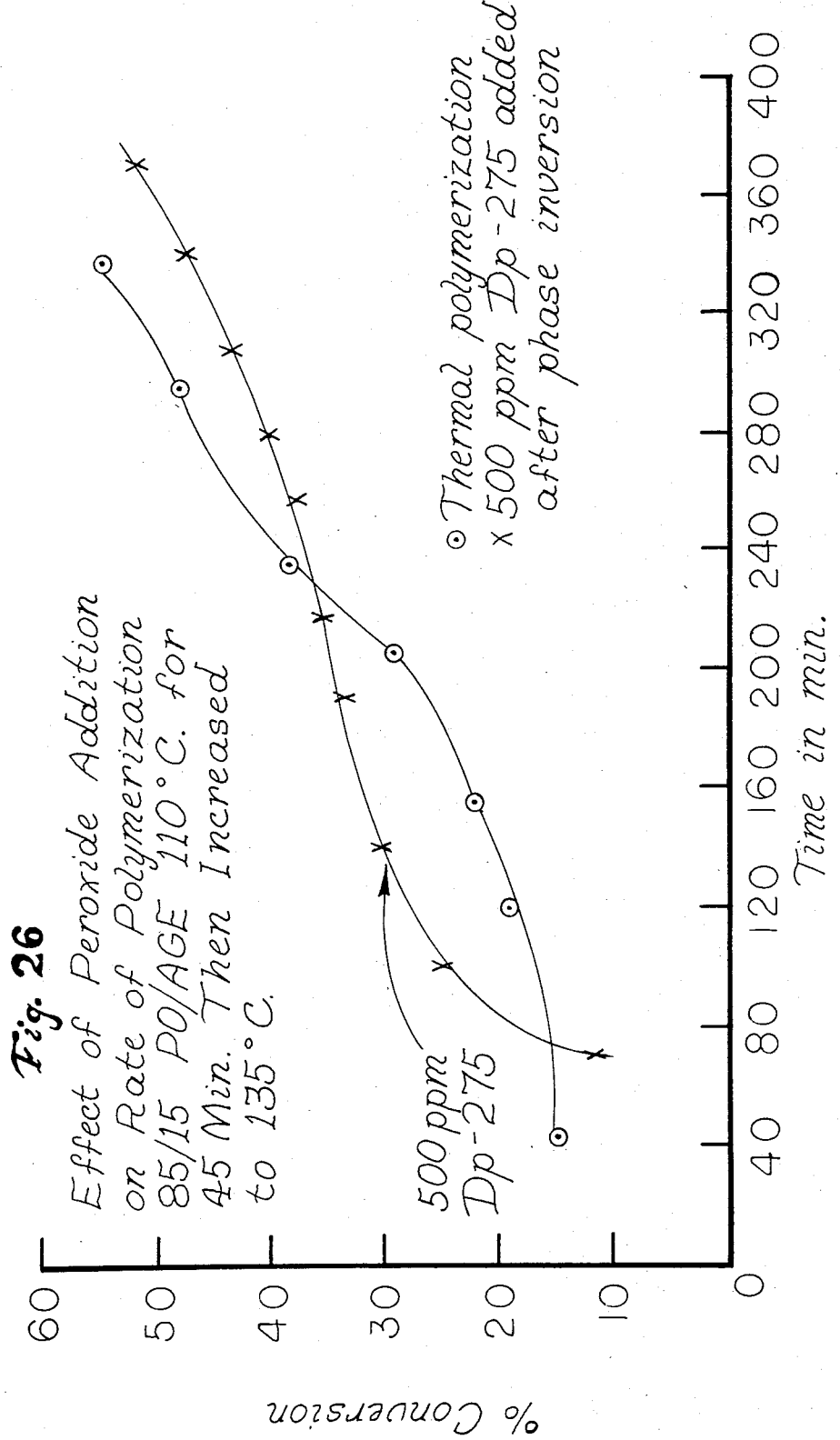
Figure 27:
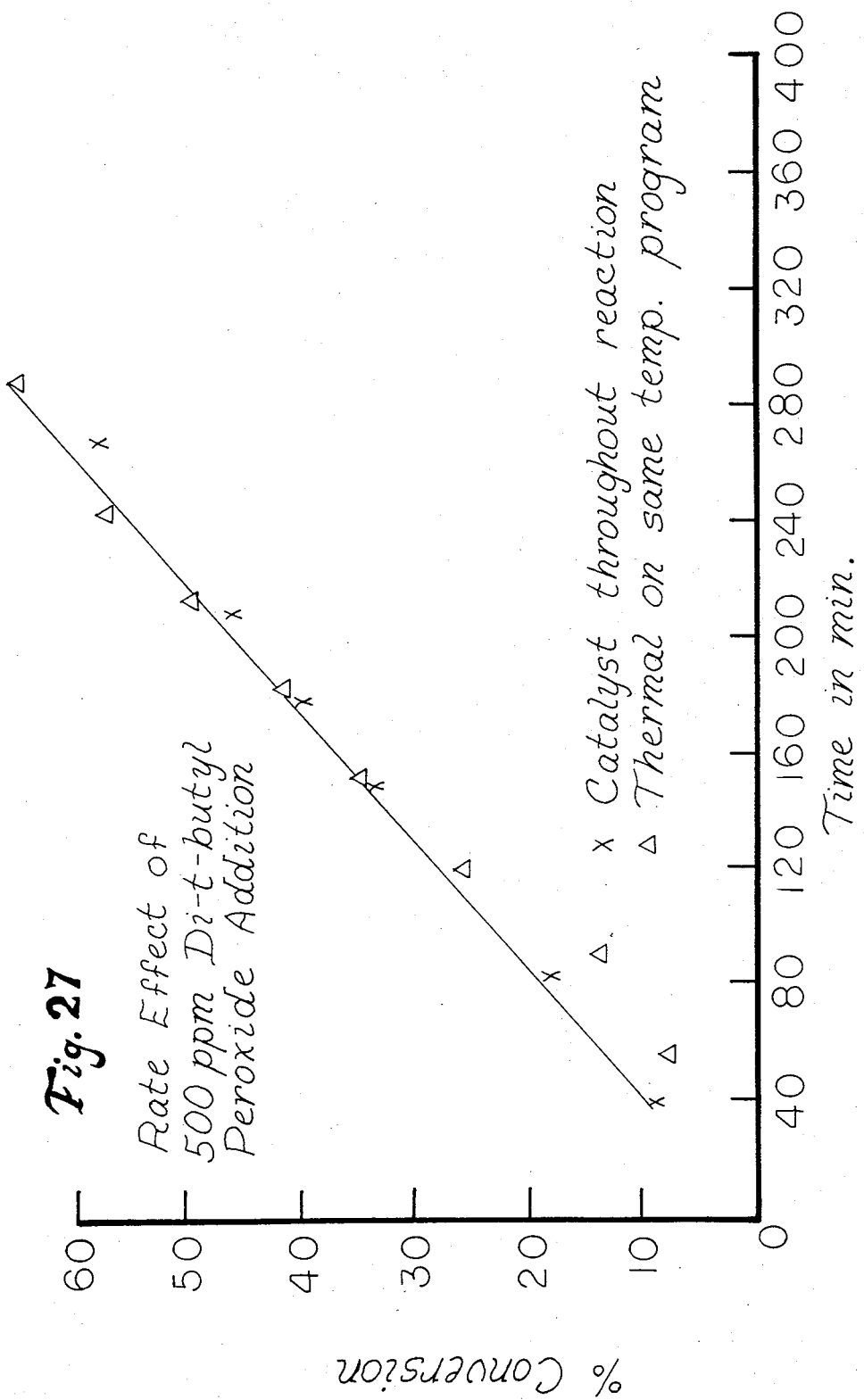

Comparison of a sample containing 500 ppm Catalyst X to a noncatalyzed sample indicates no difference in the rate of polymerization (see FIG. 26 of the accompanying Drawing). The polymerization rate of a sample containing 500 ppm di-t-butyl peroxide is compared to a noncatalyzed sample in FIG. 27. The rate of heating was different than in FIG. 1 as the reactor temperature was programmed from 135° to 150° C. at 10° C./hr. The same behavior is observed as in FIG. 1, as no increase in rate of polymerization is evident. The physical properties of the polymer containing di-t-butyl peroxide are shown in Table XXXIII.

TABLE XXXII
EFFECT OF INITIAL ADDITION OF PEROXIDE ON 85/15 PO/AGE WITH 7 WT. % PE-RUBBER CONCENTRATION 4.56 MOLE % COORDINATION CATALYST

| Peroxide | Concentration PPM | $T_R$ PSI | Tensile Elongation % | Tensile Modulus psi × $10^5$ | Notched Izod ft lbs/in Notch | Sch. G Melt Flow | PS Mol. Wt. | MW/MN |
|---|---|---|---|---|---|---|---|---|
| 0 | 0 | 3044 | 17.3 | 3.61 | 1.21 | 1.287 | 262,751 | 2.555 |
| Catalyst X | 500 | 2879 | 7.0 | 3.77 | 0.78 | 6.890 | * | * |
| Dicumyl Peroxide | 1000 | 3066 | 16.4 | 3.66 | 0.88 | 8.891 | 183,042 | 1.998 |
| Di-t-butyl Peroxide | 500 | 3272 | 22.0 | 3.50 | 0.72 | 8.707 | 163,330 | 2.246 |

*Not measured.

TABLE XXXIII
EFFECTS OF INITIAL ADDITION OF DI-t-BUTYL PEROXIDE ON 85/15 PO/AGE At 7 WT. % PE-RUBBER CONCENTRATION HEATING RATE 135-150° C. PROGRAMMED AT 10° C./HOUR 4.56 MOLE % COORDINATION CATALYST

| Concentration PPM | $T_R$ PSI | Tensile Elongation % | Tensile Modulus psi × $10^5$ | Notched Izod ft lbs/in Notch | Sch. G Melt Flow | PS $M_w$ | Mw/Mn |
|---|---|---|---|---|---|---|---|
| 0 | 3132 | 12.6 | 4.19 | 1.27 | 1.2 | 249,304 | 1.909 |
| 500 | 3272 | 22.5 | 3.50 | 0.72 | 8.7 | 163,330 | 2.246 |

(B) If there is an interaction of peroxide and coordination catalyst, the performance of the peroxide is helped by reacting the coordination catalyst with water before the peroxide addition. Three samples were produced for study of this. They all had 85 mole % PO/15 mole % AGE and contained 7 wt. % PE reinforcement in the final product. The first sample contained no peroxide. In the second sample, 500 ppm of Catalyst X was added when the reactor solids reached 30%. The third sample had 10 ml water added after phase inversion (13% solids) followed by the addition of 500 ppm catalyst X. The resulting data are shown in Table XXXIV.

The properties of the sample that had water added prior to the peroxide are similar to a non-catalyzed system. There is no reduction in impact or molecular weight. The properties of the sample having a peroxide added at 30 percent conversion are improved over one having peroxide present throughout the reaction. But they are still lower that the properties of a non-catalyzed system.

Figure 28:
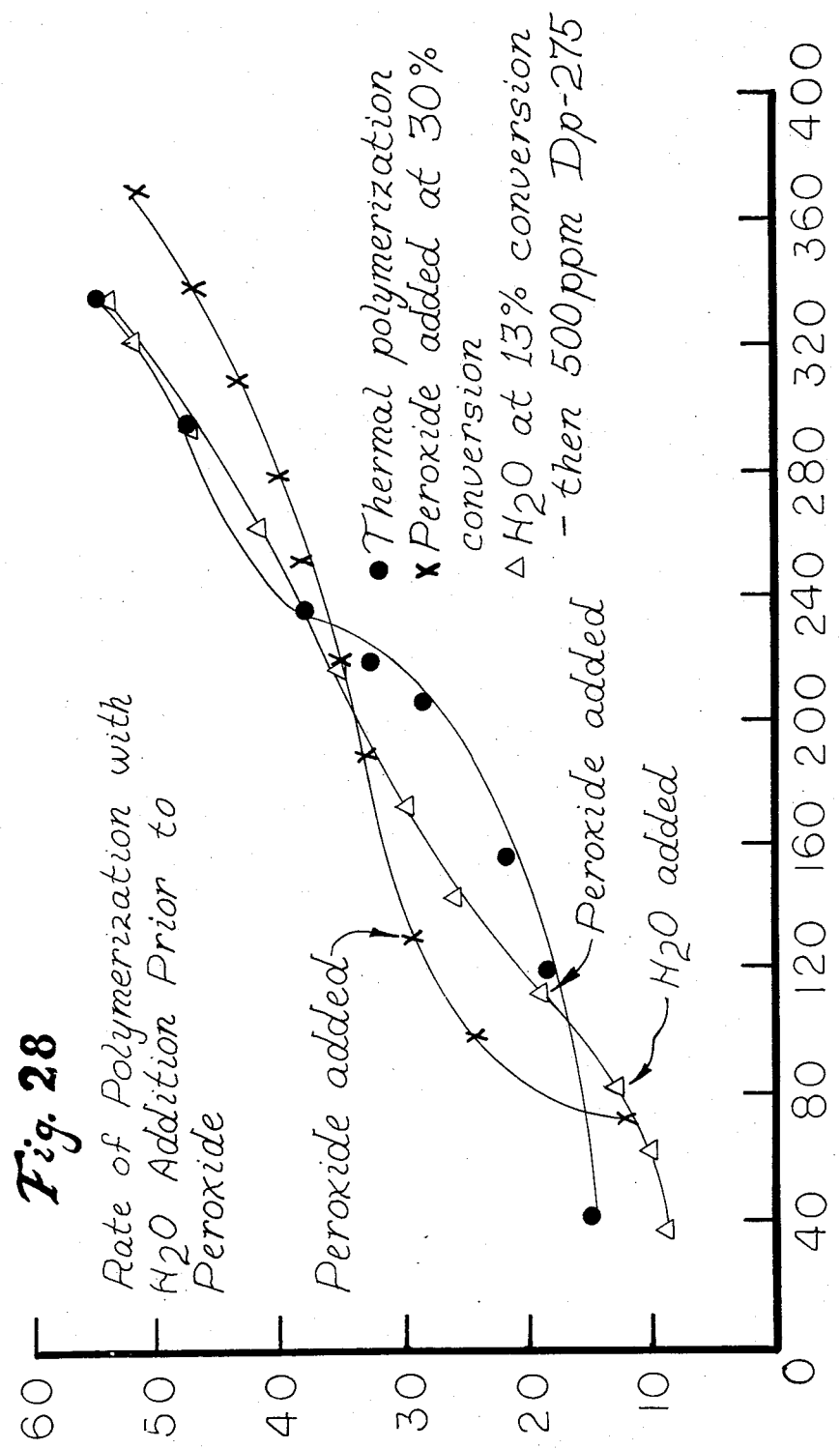

Polymerization rates for the three samples are shown in FIG. 28 of the Drawing which also indicates improvement evident for the catalyzed systems.

water was added. The reaction then was continued to 70% conversion.

The physical properties in Table XXXV indicate that the addition of water before the peroxide improves impact properties and minimizes the effect on molecular weight of the PS. The sample that had peroxide added before the water has comparable molecular weight PS

TABLE XXXIV

EFFECT OF H₂O ADDITION IN A PEROXIDE CATALYZED SYSTEM
85/15 PO/AGE AT 7 WT. % PE-RUBBER
4.56 MOLE % COORDINATION CATALYST

| Conditions | Peroxide | Concentration PPM | $T_R$ PSI | Tensile Elongation % | Tensile Modulus psi × 10⁵ | Notched Izod ft lbs/in Notch | Sch. G Melt Flow | PS, $M_w$ | Mw/Mn |
|---|---|---|---|---|---|---|---|---|---|
| Non-Catalyzed | 0 | 0 | 3044 | 17.3 | 3.61 | 1.21 | 1.287 | 262,251 | 2.555 |
| Added at 30% Conv. | DP-275 | 500 | 3156 | 13.0 | 3.86 | 0.94 | 6.456 | 202,407 | 2.552 |
| Water* & Peroxide | DP-275 | 500 | 3045 | 27.0 | 3.86 | 1.33 | 1.620 | 256,705 | 2.828 |

*Water added at 13% conversion, peroxide at 18% conversion.

(C) To investigate peroxide additions at higher conversion levels, the last of the peroxide was put in at 54% conversion. These samples, again, were 85 mole % PO/15 mole % AGE and contained 7 wt. % PE loaded in the final product.

The first sample had 10 ml water added to the reaction at 18% conversion. The polymerization was continued to 54% conversion where 500 ppm di-t-butyl peroxide was added. The reaction was continued until the total conversion reached 70 percent.

The second sample was polymerized to 54% solids, at which point 500 ppm di-t-butyl peroxide was added. The reaction was continued to 58% solids when 10 ml phase, but a lower impact strength in the product.

Table XXXVI shows the dry gel content of the final (inter)polymerized product. There appears to be no effect of the peroxide on improved grafting of the PS to the rubber. The gel content for all systems is the same.

Figure 29:
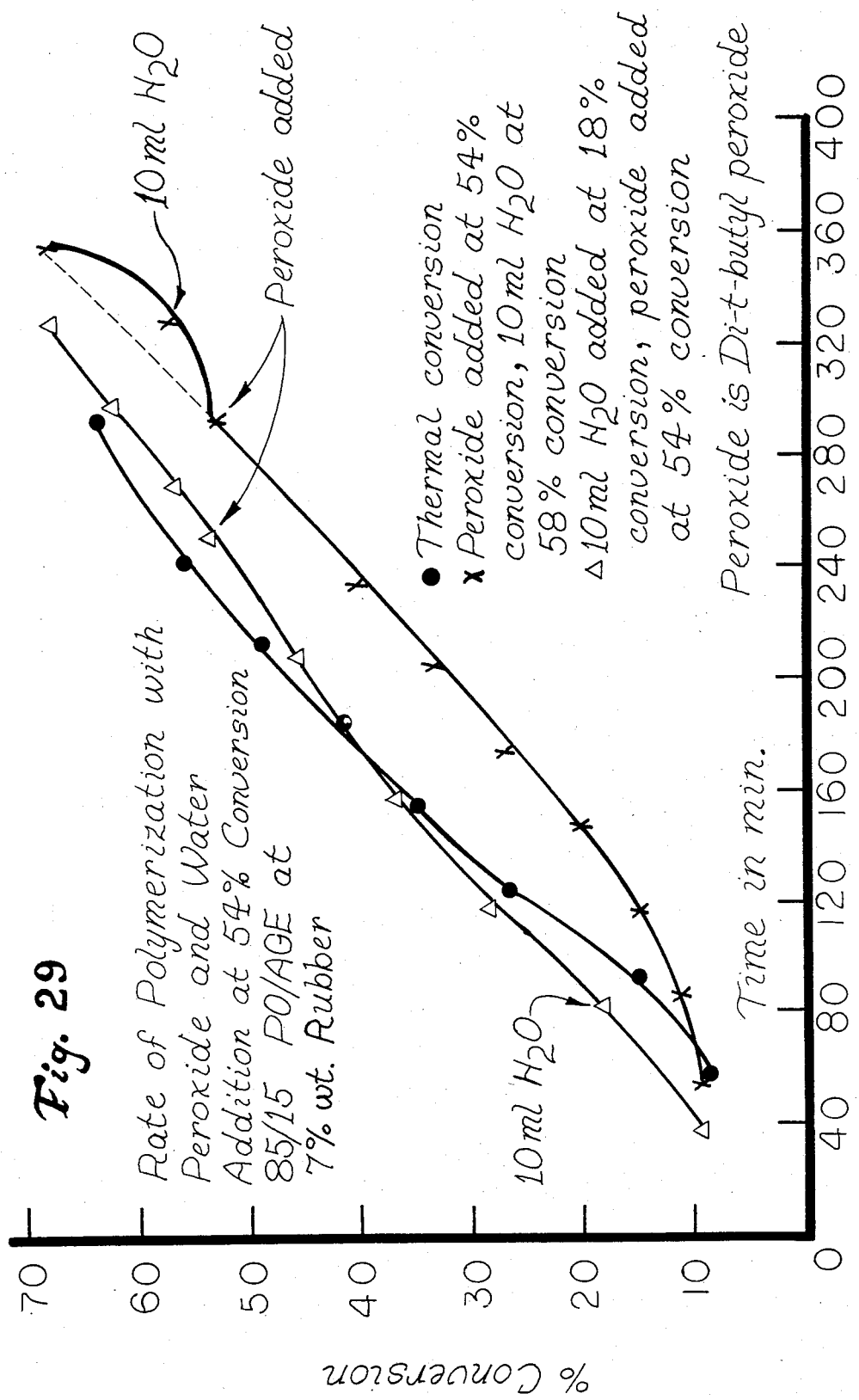

The polymerization rates are recorded in FIG. 29. There is no apparent improvement in rate for the catalyzed system when compared to a non-catalyzed material. The apparent drop in rate of the sample at the point of catalyst addition is likely due to the fact that the catalyst had been diluted with 59 g of EtBZ which lowered the reactor temperature before the water addition.

TABLE XXXV

EFFECT OF ORDER OF ADDITION OF WATER ON PEROXIDE ADDITION AT 54% CONVERSION
85/15 PO/AGE AT 7 WT. % PE-RUBBER

| Conditions | Peroxide | Concentration PPM | $T_R$ PSI | Tensile Elongation % | Tensile Modulus × 10³ | Notched Izod ft lbs/in Notch | Sch. G Melt Flow | PS,$M_w$ | MW/MN |
|---|---|---|---|---|---|---|---|---|---|
| Thermal 10 ml H₂O at 18% Conv. | 0 | 0 | 3131 | 12.6 | 4.19 | 1.27 | 1.168 | 249,304 | 1.909 |
| Peroxide at 54% Conv. | Di-t-butyl Peroxide | 500 | 2921 | 22.4 | 3.44 | 1.52 | 2.450 | 239,720 | 2.275 |
| Peroxide at 54% Conv. 10 ml H₂O at 58% Conv. | Di-t-butyl Peroxide | 500 | 2818 | 17.3 | 3.54 | 1.15 | 2.630 | 240,409 | 2.603 |

TABLE XXXVI

EFFECT OF PEROXIDE AND WATER ON DRY GEL CONTENT
4.56 MOLE % COORDINATION CATALYST

| Conditions | Rubber Composition | Peroxide | Concentration PPM | Swelling Index | % Dry Gel |
|---|---|---|---|---|---|
| Non-Catalyzed | 85/15 | None | 0 | 19.6 | 17.9 |
| 10 ml Water at 18% Conv. Peroxide at 54% Conv. | 85/15 | Di-t-butyl Peroxide | 500 | 17.7 | 16.9 |
| Peroxide at 54% Conv. 10 ml Water at 58% Conv. | 85/15 | Di-t-butyl Peroxide | 500 | 17.4 | 17.8 |

DETAILED COMPARISON OF INVENTION TO PRIOR ART

The present invention is better comprehended and appreciated when regarded in more expanded view of the heretofore involved ways of making rubber-modified impact-grade plastics, particularly HIPS.

As has been pointed out, prior conventional rubbers (such as PBu), but including GR-S types and other useful forms) may be added to PS (or other polymer) in one of three ways which have been detailed in the foregoing.

With cursory reference again to FIG. 1, most commercial HIPS is made by copolymerizing the conventional PBu, GRS or equivalent commonly-employed rubber with St (or other monomer) using the third of the identified methods, especially in mass or solution processes. Products derived by such mass or solution method(s) generally have higher impact strengths with less rubber than those otherwise made. Better reinforcement probably comes from: "grafting" of St, for example, onto unsaturated sites of the rubber; chemical crosslinking of the rubber; and occlusion of Ps or other polymer inside the rubber particles (increasing the effective rubber phase volume).

HIPS mass (and solution) processes usually require mechanically shredding bales of PBu or other rubber. The small shredded pieces drop into a St (or other monomer or monomer mixture) mixing tank. The comminuted rubber is therein dissolved for periods that typically range from 8-10 hours. This "rubberized" solution is then ordinarily filtered to remove gels and non-solvated rubber. After this, the dissolved rubber starting material is pumped or otherwise transferred to multiple-(usually three-)-stage, stirred-tube or the like reactors. Typically, from 8-12 wt. % EtBZ (recycled) is added to the feed. This is for: polymerization rate control; better heat transfer, and easier processing experiences and results.

Polymerization can be either thermal or catalytic. A catalytic process is often preferred since it generally allows use of lower process temperatures and facilitates getting better physical properties in the products. Lower volatile levels may also be attained with catalyzation. When catalyst is used, it is introduced into the feed before entering the 1st-stage reactor.

Recirculation may be used in the first stage in both catalytic and the thermal processes. This gives better control of particle size and temperature. Varying amounts of recirculation are used depending on processes, product desired and equipment employed. The exact amount of recirculation usually varies from one manufacturing facility to another.

Temperature and agitation intensities also tend to vary according to diverse plant locations and manufacturing operations. Thus, physical or geographical location can play a role in optimum selection of such factors. Usually, as % conversion increases, temperature is increased and agitation is decreased. These changes are used to aid in processing the thick resins.

The flow-sheet presentation of FIG. 1, as noted, is appropriate to manufacture of HIPPO and the like. The therein indicated temperature and agitation speed ranges, by the way, are only typical ranges; considering, as explained, that actual values are capable of marked variations between one maufacturing location and another.

When the polymer leaves the final unit of a three stage reactor (73–85%) solids), it is pumped to a devolatilizer. There, the unreacted St and EtBZ (or other monomer and solvent) are stripped and recycled. During this time, the rubber phase crosslinks via residual unsaturated sites to enhance reinforcement. Devolatilization can be accomplished at 230° C. and under a pressure of Mercury of 20 mm. After devolatilization, the resin is extruded, pelletized, and packaged for subsequent utilization. It is expedient to recycle unused recovered monomer back through all or at least part of the process.

Using pre-manufactured PBu (and other like conventional rubbers) to make HIPS and the like has some serious disadvantages. First of all, PBu and the like must be handled in its usually available, as-manufactured form. Secondly, the rubber-dissolving process used in the conventional HIPS and the like processes is cumbersome and expensive. Bales of rubber are usually required to be (manually) loaded on a conveyor belt for shredding and subsequent dissolution in monomer. This not only requires use of sophisticated and costly equipment, but the long dissolving step is invariably the slowest part of the entire process. Thirdly, residual unsaturation present in both natural and synthetic rubber within the continuous PS or other polymer phase leads to poor oxidative stability in resulting product for applications thereof requiring good weatherability.

The use pursuant to the present invention of PE-elastomer rubbers based on Formula (II) monomers is thus very attractive. One appealing aspect of this is the good oxidative stability of PE elastomers. It is generally better than that of rubbers containing residual olefinic unsaturation. Moreover, the PE-elastomers, particularly those based on PO, have good low temperature properties, good oil resistance, and good UV stability. See, along this line: R. A. Briggs and E. E. Gruber, *Encyclopedia of Polymer Science and Technology*, Vol. 6, pp. 202–207, 1970; and R. N. Howard, *The Physics of Glossy Polymers*, Applied Science Publishers, London, 1973, p. 454.

The following Table XXXVII by way of offhand comparison demonstrates the generally better and more attractive properties of the HIPPO products of the invention and typical HIPS.

TABLE XXXVII

| | Resin Product | |
|---|---|---|
| Property | "NN" (Conventional PBu HIPS) | "OO" (HIPPO from PE Rubber) |
| % Rubber | 11.5 | 10.4 |
| Tensile Yield psi | 2300 | 3130 |
| Elongation % | 50 | 29 |
| Modulus × $10^5$ psi | 2.40 | 3.28 |
| Notched Izod | 2.60 | 3.54 |
| Melt Flow ("Sched. G") | 1.0 | 0.4 |
| Heat Dist. °F. | — | 196 |

COMPLEX AND OTHER MAJOR MONOMER COMPONENTS

Very good results according to the invention are also obtained with the PE rubbers in other olefinic systems, such as: (i) styrene/acrolonitrile (i.e., "St/VCN"); (ii) styrene/acrylic acid (i.e., "St/HAcr"); (iii) styrene/maleic anhydride (i.e., "St/MA"); (iv) styrene/methylmethacrylate (i.e., "St/MeMAcr"); and (v) vinyl chloride (i.e., "VCL").

The above-explained, basic auger-driven reactor procedure was used to prepare the here particularized products of complex major monomer components of above-identified systems (i) through (iv). The reactor was loaded with a solution containing the addition-polymerizable monomers, alkene oxides, PhTh, acetylacetone (i.e., "AcAc"), EtBZ and MO. The auger was started to dissolve water from the reactor walls. A sample was removed for ppm water analysis by the Karl-Fischer titration. A sufficient amount of water was then added to maintain a H₂O/TEA ratio of 1:2. The added water was dissolved while the TEA (15 wt. % in EtBZ) was weighed and charged into the reactor. The liberated ethane was vented. The reactor was then heated to 110° C. over a 55-minute period. Agitation speed was >200 rpm up to 90° C., at which point it was decreased to 9 rpm. A sample of the "rubberized" solution was then removed for [η] determination. The temperature was then raised to 135° C. When the temperature of the resin reached 135° C., a high burst of shear (>200 rpm) was applied for ≅30 seconds (the percent solids at this point being on the order of 20–25 wt. %). RPM was then adjusted to 90 rpm. Temperature and agitation rate were maintained until the desired solids content was reached (usually 57–60 wt. %). The resin was then transferred to open "Teflon"-lined square receptacles, wherefrom the material was devolatilized under 30 mm pressure at 170° C. for 3 hours. The hot resin was then cooled and cut into about 1-inch squares. It was then granulated.

Physical property tests were made with the ground product usually including: notched Izod impact; tensile yield ($T_Y$); tensile rupture ($T_R$); percent elongation at both $T_Y$ and $T_R$; tensile modulus; breaking work; Vicat heat distortion; and melt flow rate (Schedule G). For greater reliability, test batches were usually divided into an "R" and a "P" series. The "R" series was compounded on roll mills prior to molding in order to homogenize the involved samples. Property comparisons were then made with the "P" series (i.e., the non-compounded samples).

The percent Gel and Swell index measurements were made on the resin granules after the polymer was rid of the rubber phase. Particle size measurements were made on selected resins.

When applying these procedures to prepare PE-reinforced St/HAcr and St/MA resins (by reason of the fact that both of the St comonomers destroy the aluminum coordination catalyst), special techniques were followed to prepare the PE's and attendant resins of these monomers with St. The PE's were made by above-outlined procedures with the exception that both the HAcr and MA monomers listed were omitted from the respective initial charges. At the point at which the PE/St solution reached 135° C., HAc was added to destroy the aluminum coordination catalyst. This acid was "mixed-in", using high-burst shear as above described for the purpose. Liberated ethane was bled off the reactor (through a needle vent valve). The two monomers were then added for each of the respective preparations. The HAcr was added to the PE/St solution in three equal portions made at hourly intervals. The temperature was maintained at 135° C. until ≅50% solids was reached (≅5 hours). The resin was then removed and devolatilized. In the PE-elastomer-reinforced St/MA preparations, a 25% solution of MA in methyl ethyl ketone (MEK) solvent was added dropwise at a rate of ≅60 wt. parts/hr. until all of the maleic anhydride had been added. The temperature was again maintained at 135° C. until ≅45 wt. % solids were reached (≅8 hours). The resin was then removed and devolatilized.

In all the resins containing polymers of VCN, HAcr, MeMAcr and MA, percent Gels and Swelling index were determined using MEK as solvent.

Physical property measurements made on these complex major monomer-containing resins were identical with those for the HIPS resins; the only exception being that a "Schedule I" Melt Flow Rate was recorded instead of the "Schedule G" ordinarily used for HIPPO products.

Table XXXVIII compares the physical properties of two ABS-type Resins with two PE-reinforced St/VCN resins. The two particular ABS Resins involved were chosen for comparison to demonstrate how their relevant PBu rubber levels and the VCN contents affect physical properties. The PE-elastomer-reinforced systems both have impact strengths superior to those of the two ABS Resins studied. They also exhibit better tensile strength values than "ABS 213". This may be due to the larger amount of VCN present in the resins modified with PE. Melt flow rates are significantly lower for both PE-modified Resins compared to those measured in the ABS systems.

TABLE XXXVIII

COMPARISON OF PE-MODIFIED ST/VCN RESIN WITH "ABS 300" AND "ABS 213"*

| Resin | % VCN | % Rubber | Notched Izod (Ft-lbs/in) | % Gel[a] | Swelling Index[a] | $T_Y$ (psi) | $T_R$ (psi) | % Elong. | Tensile Modulus (psi × 10⁵) | Vicat HD (°C.) | Melt Flow Schedule I) (g/10 min) |
|---|---|---|---|---|---|---|---|---|---|---|---|
| *"ABS 300"[b] | 20.0 | 12.0 | 1.3 | — | — | 6500 | 5800 | 5.0 | 3.40 | 217 | 2.5 |
| *"ABS 213"[b] | 15.0 | 8.0 | 1.2 | — | — | 3500 | 3400 | 40.0 | 3.20 | 215 | 6.0 |
| Polyether-Reinforced St/VCN #1 | ~25 | 8.5[c] | 2.34 | 13.3 | 22.1 | 4830 | 3732 | 14.4 | 3.80 | 210 | 0.072 |
| Polyether-Reinforced St/VCN #2 | ~25 | 8.2[c] | 3.35 | 14.5 | 23.2 | 4908 | 4364 | 2.85 | 3.91 | 221 | 0.088 |

*Obtained from THE DOW CHEMICAL COMPANY.
[a] Percent gels and swelling index as percent determined in MEK solvent.
[b] Properties for "ABS 300" and "ABS 213" provided from published data.
[c] Rubber used: 85% PO/15% AGE in both cases.
[d] α-Methylstyrene dimer added as chain transfer agent (≅0.10%, based on total charge).

Overall performance improvement seemed somewhat better in the St/HAcr system than in the St/MA system. Table XXXIX shows the physical properties of a St/HAcr resin that contains no PE vs. one that does. Improvements in impact strength, $T_Y$, and percent elongation are noted. The decreases in $T_R$, tensile modulus, and melt flow rate are probably due in part to the high rubber loading. This is also conceivably accountable for the surprisingly low Vicat heat distortion of this resin.

Physical properties of a St/MA resin are shown in Table XL. Performance improvements were made in impact strength, $T_R$, percent elongation, and in heat distortion temperature. Melt flow again decreased with high rubber loading.

Improvement in impact strength was greatest in the PE-reinforced St/MeMAcr resins. Table XLI shows the physical properties of these reins. Over a four-fold improvement in impact can be noted in the resin containing PE modifier. Decreases in $T_R$ and tensile modulus, again, are likely due to the large amount of rubber used to reinforce the resin. Molded bars of this PE-reinforced resins were slightly opaque due to differences in the refractive index of the PE vs. polymethylmethacrylate.

TABLE XXXIX
PHYSICAL PROPERTIES OF POLYETHER-MODIFIED St/HAcr RESINS
St/HAcr RESINS

| % Rubber* | % HAcr | Notched Izod (Ft-lbs/in) | $T_Y$ (psi) | $T_R$ (psi) | % Elong. | Tensile Modulus (psi × $10^5$) | Vicat HD (°C.) | Melt Flow (Schedule I) (g/10 min) |
|---|---|---|---|---|---|---|---|---|
| 0 | 10.0 | 0.22 | 0 | 3508 | 0.8 | 4.33 | 101 | 0.67 |
| 16.4 | 10.0 | 0.34 | 3073 | 2619 | 82.2 | 1.82 | 81 | 0.0069 |

*Percent rubber used of 95% PO/5% AGE.

TABLE XL
PHYSICAL PROPERTIES OF POLYETHER-MODIFIED St/MA RESINS

| % Rubber* | % MA | Notched Impact (Ft-lbs/in) | $T_Y$ (psi) | $T_R$ (psi) | % Elong. | Tensile Modulus (psi × $10^5$) | Vicat HD (°C.) | Melt Flow (Schedule I) (g/10 min) |
|---|---|---|---|---|---|---|---|---|
| 0 | ≅10 | 0.15 | 0 | 648 | 0.1 | 2.64 | 101 | 52.7 |
| 15.3 | ≅10 | 0.26 | 0 | 1359 | 0.5 | 2.64 | 103 | 5.10 |

*Percent rubber used of 95% PO/5% AGE.

TABLE XLI
PHYSICAL PROPERTIES OF POLYETHER-MODIFIED St/MeMAcr RESINS

| % Rubber* | % MeMAcr | Notched Impact (Ft-lbs/in) | $T_Y$ (psi) | $T_R$ (psi) | % Elong. | Tensile Modulus (psi × $10^5$) | Vicat HD (°C.) | Melt Flow (Schedule I) (g/10 min) |
|---|---|---|---|---|---|---|---|---|
| 0 | 60 | 0.39 | 0 | 7103 | 1.8 | 4.66 | 97 | 0 |
| 16.0 | 60 | 1.79 | 1272 | 2075 | 2.0 | 2.12 | 98 | 0 |

*Rubber used of 95% PO/5% AGE.

Analogous excellent results are also obtained when complements of other complex, mixed major monomer components of the several varieties of the herein-disclosed addition-polymerizable monomers are employed for preparation of PE-elastomer-modified impact polymer products according to the invention, whether or not St and/or other alkenyl aromatic monomers of the Formula (I) are therein utilized.

The PE-elastomers, as aforementioned, can also be readily provided in major monomer systems devoid of Formula (I) monomer. To show this, a PO/AGE PE-elastomer was polymerized with the TEA-complex catalyst used in the foregoing illustrations (in equivalent preferred quantity) in a VCl medium. The polymerization recipe employed was as set forth in the Table XLII below:

TABLE XLII
RECIPE FOR PO/AGE POLYMERIZATION IN VCl SOLUTION

| Component | wt. (g) |
|---|---|
| EtBZ | 904.56 |
| VCl | 212.5 |
| PO | 18.14 |
| AGE | 1.86 |
| TEA | 1.713 |
| 2,4-P | 0.715 |
| PhTh | 0.747 |
| $H_2O$ | 0.169 |

The recipe 1 was loaded into a stirred, temperature-controlled reactor in the following manner: All components but $H_2O$ and TEA were placed in the reactor, flushed with $N_2$ and stirred vigorously. The incident water concentration was then measured and additional water added to bring the concentration to the desired level. The last component, TEA, was then added.

The reactor conditions were then controlled as indicated in Table XLIII, below:

TABLE XLIII
POLYMERIZATION REACTOR CONDITIONS

| Time Min. | RPM | Temp. | Pressure | Wt. % Solids Found | Remarks |
|---|---|---|---|---|---|
| 0 | 211 | 25° | 4 psi | | Started heating to 50° C. |
| 15 | 20 | 49 | 17 | | |
| 25 | 2— | 50 | 17 | 0.40 | |
| 55 | 20 | 50 | 17 | 0.68 | Started heating to 75° C. |
| 85 | 20 | 65 | 30 | 1.29 | |
| 95 | 176 | 74 | 39 | | |
| 115 | 176 | 75 | 40 | 1.84 | |
| 145 | 158 | 75 | 36 | 2.03 | |
| 175 | 158 | 75 | 36 | 2.12 | |
| 205 | 158 | 75 | 38 | 2.08 | |

The solid polymer obtained from this reaction was elastomeric. It was identified by infrared analysis to be predominently polymerized PO. Its intrinsic viscosity was determined in TO at 100° F. to be 7.05 dl/g.

With apt choice of catalyst components (or the removal of some of these components that act as inhibitors after the elastomer polymerization) one can readily further polymerize the VCl to obtain, as a desirable final product, a PE-reinforced polyvinyl chloride.

RECAPITULATING EXEMPLIFICATION OF THE INVENTION

The foregoing makes it abundantly clear that HIPPO (and the like or analogous impact-type, PE-elastomer-reinforced plastics products) has considerable advantages over conventional HIPS and like or equivalent heretofore-known products.

These include:
(1) A significant improvement in the Impact Strength/Tensile Strength/Tensile Modulus combinations attainable;
(2) Worthwhile improvement in ESCR (hereinafter more fully brought forth); and
(3) A much improved elastomer efficiency over current HIPS (and like conventional) materials at higher elastomer loadings to give larger increases in impacts as the elastomer loading increases above $\cong 7$ wt. %.

To further emphasize this (and to simultaneously illustrate best modes for implementation of the invention), a number of additional experimentations were performed. The procedures of these and the excellent results thereof are as disclosed in the following.

The various ingredients and materials for these and additional investigations included:
(i) PO (from the Linde Division of UNION CARBIDE CORPORATION) in 99.96% purity;
(ii) Inhibitor-free St monomer from THE DOW CHEMICAL COMPANY; treated to remove any possibly remaining inhibitor by passing through a 4-inch long alumina column;
(iii) A 2,4-pentanedione (2,4-P) "AcAc" specie of acetylacetone (i.e., from the Chemical & Plastics Division of UNION CARBIDE CORPORATION) assaying 99.0% by wt. and containing only 0.2% $H_2O$ and 0.2% HAc;
(iv) PhTh in recrystallized product form at 99+% purity;
(v) AGE from ALDRICH CHEMICAL COMPANY supposed to be 99+% pure;
(vi) TEA from ETHYL CORPORATION as an $\cong 15\%$ solution in EtBZ;
(vii) Zinc acetylacetonate (ZnAcAc) from PFALZ & BAUER, INC.;
(viii) Cobalt (II) acetylacetonate (i.e., "Co(II)-AcAc") from K & K LABORATORIES, INCORPORATED;
(ix) Commercial grade EtBZ from THE DOW CHEMICAL COMPANY; and
(x) a commercially-obtainable, standard stock mineral oil (i.e., "MO").

For all the additional polymerizations conducted, pressurizable auger-driven reactors of the above-described type were employed. Normally, the PhTh, AcAc, 1% MO and 3% EtBZ were dissolved in the St with the PO then added to this solution. This mixture was then charged to the reactor and agitated for a time. A small sample was then withdrawn for water-content measure by Karl Fisher Analysis. An amount of water was then added to bring the water content up to the desired amount for the catalyst. After thorough mixing of the water, the desired amount of a 15% solution of TEA in EtBZ was injected into the reactor.

Temperature was then increased to 110° C. Normally about 25 minutes was taken to heat to 105° C. This temperature was then held between 105° and 110° C. for another 30 minutes (to total 55 minutes in this stage). Temperature was then adjusted to 135° C. for the balance of the polymerization, with 135° C. being attained in about 45–55 minutes.

After about 1 hour at 135° C., a high burst of shear (90 sec. at maximum shear) was given to each polymer solution processed to bring about phase inversion and a major decrease in viscosity (excepting that such high shear was sooner given if an exotherm was experienced prior to 1 hour). After the high shear application, the appearance of the solution generally changed from "viscous, translucent, lumpy" chrarcterizability (that almost looks dry) to a much less viscous, homogeneous creamy and opaque mass. Exotherms are presumably caused by inadequate circulation of very viscous rubber solutions.

Each polymerization was continued to about 60 wt. % solids. The so-converted reaction mass was then discharged from the reactor (through a bottom vent) into shallow "Teflon"-lined containers for devolatilization. Devolatilization was accomplished by overnight placement in a hood at RT followed by heating to 170° C. for 3 hours at 20 millimeters pressure to complete the removal of volatiles. Samples were withdrawn during the polymerization from a port in the bottom of the reactor to measure: (i) rubber solution viscosity (at 55 minutes), and (ii) the % conversion by % solids at various times.

When such compounds as HAc or $H_2O$ were added to kill the catalyst, they were placed in a stainless steel addition tube connected to the reactor by means of valves having $N_2$ pressure attachments to allow forcing of the material into the reactor under applied $N_2$ pressure.

After polymer samples were devolatilized, they were cut up (with a band saw); then ground in a Wiley mill to prepare them for molding and testing. It was found that the polymers generally needed a compounding step to develop maximum properties. The mechanical properties here reported were always measured on compounded samples (5 minutes on 200° C. rolls).

The characterization procedures for each of the tested polymer products were as follows:
(a) The % solids for the polymerizations were run in aluminum weighing pans in a 140° C. vacuum oven at full vacuum for $\cong 18$ hours;
(b) The PO/AGE rubber intrinsic viscosity was measured in a Cannon-Fenske viscometer at 100° F. (ca. 37.8° C.) in T solvent;
(c) The % Gel was a measure of the % insoluble in TO, as previously described. The Swelling Index measurement was taken as also above described;
(d) The $M_n$ and $M_w$ of the PS phase was measured by gel permeation chromatography;
(e) Mechanical properties were measured by pertinent ASTM Methods;
(f) Electron micrographs and phase contrast micrographs were done by standard normal procedure therefor; and (g) Particle size measurements were done by standard procedure.

In this further experimentation, the effect of polymerization temperature on polymerization rate and Molecular Weight was investigated by conducting polymerizations of 7.37% solutions of 95/5 PO/AGE mixtures in EtBZ at temperatures from 26° to 128° C., as is shown in Table XLIV.

TABLE XLIV
POLYMERIZATION STUDIES ON 95/5 PO/AGE IN EtBZ, TEMPERATURE DEPENDENCE

| | Catalyst Composition, Moles | | | | | | |
|---|---|---|---|---|---|---|---|
| Sample No. | TEA | AcAc | H₂O | PhTh | Moles Per Mole PO/AGE | Polym. Temp. °C. | Final [η] dl/g |
| "PP-1" | 2 | 1 | 1.0 | 0.5 | 4.56 | 50 | 7.6(?) |
| "PP-2" | 2 | 1 | 1.0 | 0.5 | 4.56 | 77 | (some gels) |
| "QQ-1" | 2 | 1 | 1.0 | 0.5 | 4.56 | 100 | 8.9 |
| "QQ-2" | 2 | 1 | 1.0 | 0.5 | 4.56 | 128 | 9.3 |
| "QQ-3" | 2 | 1 | 1.0 | 0.5 | 4.56 | 131 | 5.3 |
| "QQ-4" | 2 | 1 | 1.0 | 0.5 | 4.56 | 26 | 5.2 |
| "RR" | 2 | 1 | 1.25 | 0.5 | 4.56 | 50 | 13.3 (100% PO) |

Figure 22:
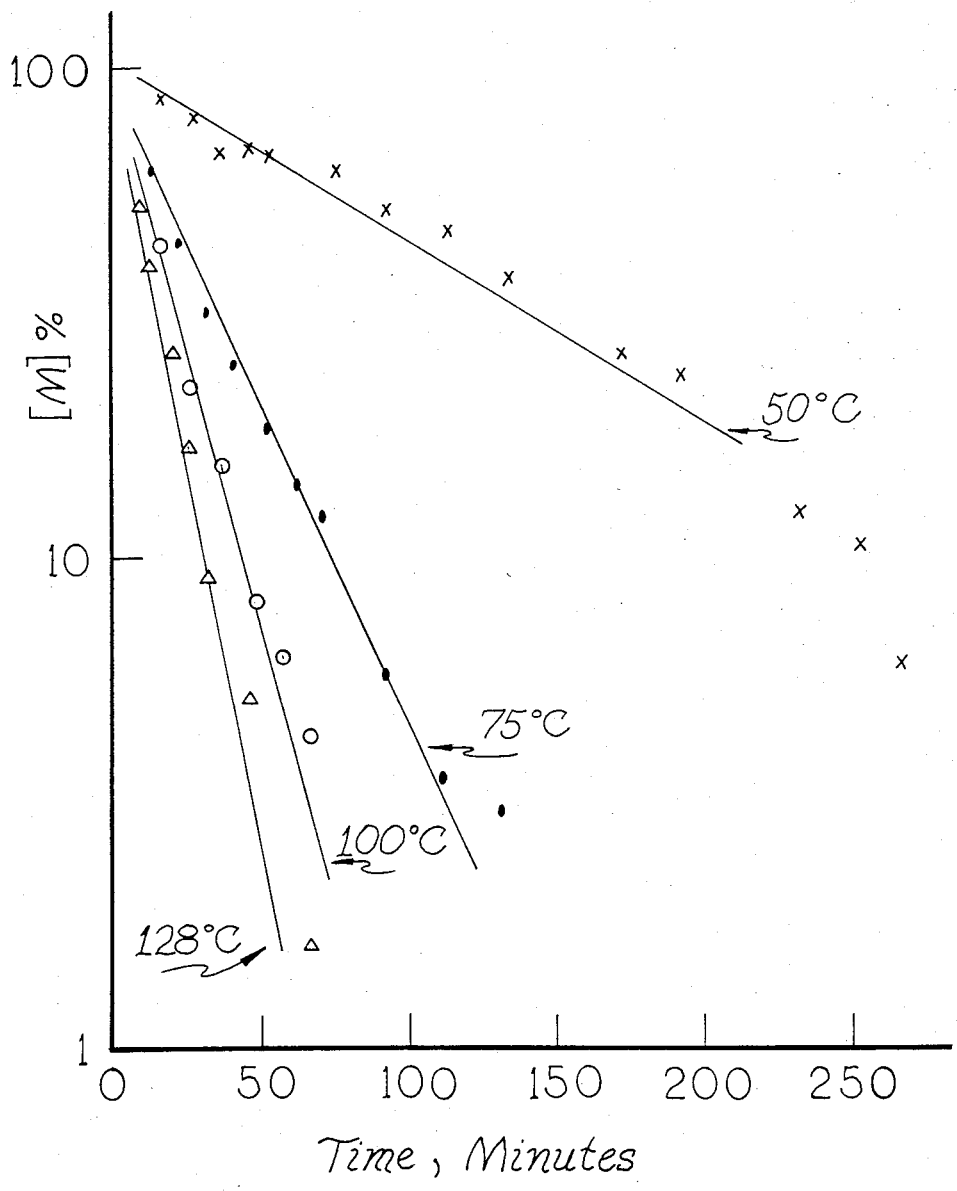
Figure 23:
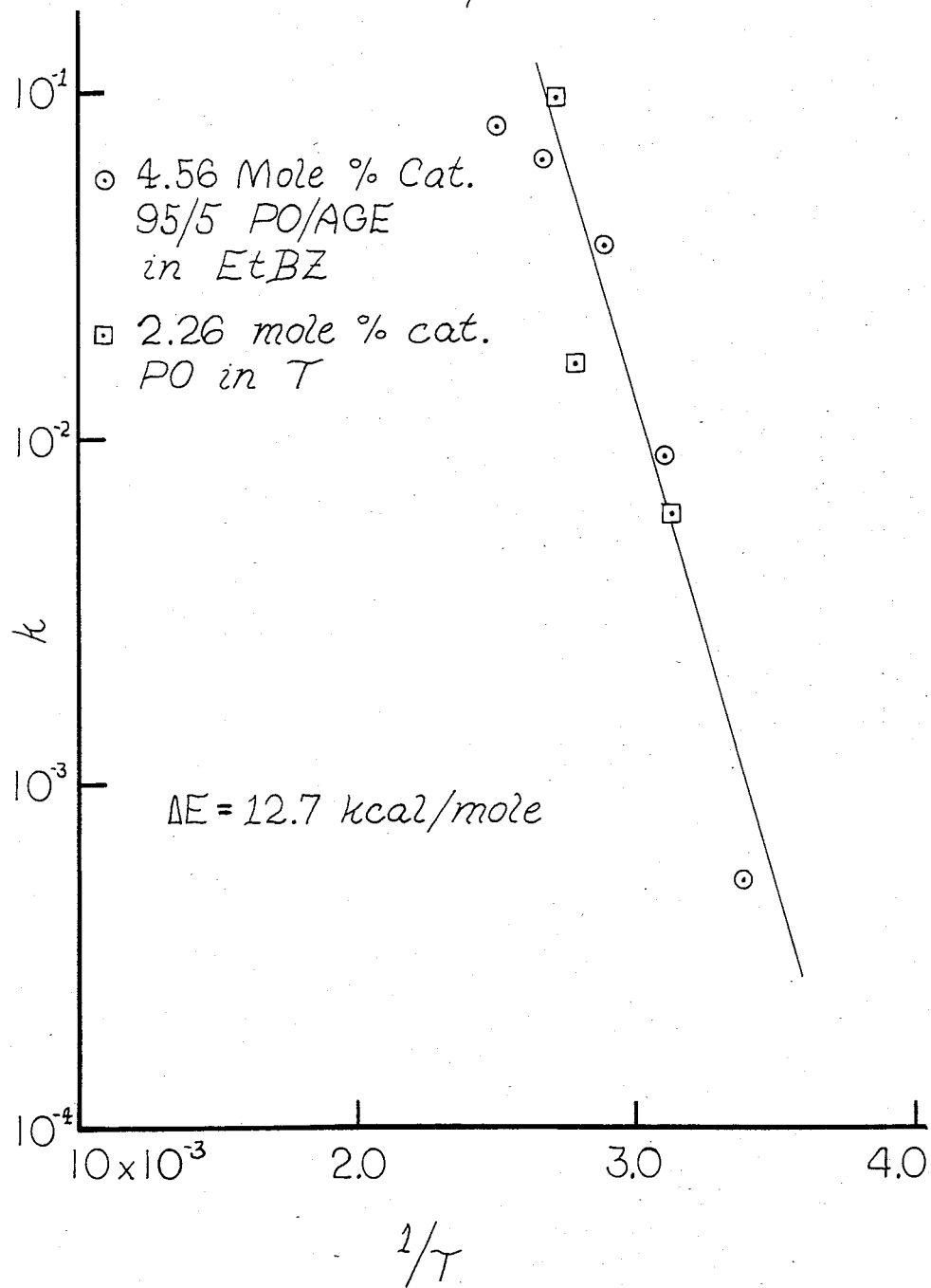

The % polymerization was followed by withdrawing samples and measuring the % solids. FIG. 22 of the Drawing shows results of these Runs plotted as Ln [PO] vs Time. The curves, as is perceptible, are generally straight lines deviating in one way or another at greater than 90% conversions. From these curves, it can be concluded that the polymerization obeys first order kinetics through most of its course, or $$\frac{dM}{dt} = -k_p[M] \tag{5}$$

If one assumes that the temperature dependence of the polymerization rate constant, $k_p$, is described by the Equation:

$$k_p = Ae^{-\Delta E/RT} \tag{6}$$

wherein
A is a pre-exponential constant;
$\Delta E$ is the apparent activation energy of polymerization;
R is the gas constant; and
T is the absolute temperature then it is possible to plot Ln $k_p$ vs 1/T and realize a straight line progression with slope $-\Delta E/R$. This has been done in FIG. 23 for the polymerization rate constants from 26° to 128° C. The value of $\Delta E$ calculated from the slope of the line is 12.7 kcal/mole. This value for $\Delta E$ is close to the value of 10 kcal/mole obtained by Booth, et al., for the polymerization of propylene oxide with diethyl zinc and water over a similar temperature range. See, as to this C. Booth, W. C. E. Higginson and E. Powell, Polymer 5, 479–497 (1964).

The above does show a dependence of polymerization rate upon temperature, but not as much as for a normal free radical polymerization such as St, where the $\Delta E = 19.2$ kcal/mole, (referring in substantation of this to the ACS Monograph on "Styrene and Its Polymers" by R. H. Boundy and R. F. Boyer).

To determine if this is the optimum ratio of water in the catalyst for such a given system in St, further Runs were conducted.

For each Run, as delineated in Table XLV, a number of Samples were withdrawn as the polymerization was being carried out. The % solids was then used as a measure of % polymer.

TABLE XLV
POLYMERIZATION STUDIES ON 95/5 PO/AGE IN EtBZ, H₂O DEPENDENCE

| | Catalyst Composition, Moles | | | | | | |
|---|---|---|---|---|---|---|---|
| No. | TEA | AcAC | H₂O | PhTh | Moles Per Mole PO/AGE | Polym. Temp. °C. | Final [η] dl/g |
| "PP-1" | 2 | 1 | 1.0 | 0.5 | 4.56 | 50 | 8.2 |
| "RR-1" | 2 | 1 | 1.25 | 0.5 | 4.56 | 50 | 13.3 (100% PO) |
| "SS-1" | 2 | 1 | 0.5 | 0.5 | 4.56 | 50 | 8.29 |
| "SS-2" | 2 | 1 | 0.75 | 0.5 | 4.56 | 50 | 9.9 |
| "TT-1" | 2 | 1 | 1.5 | 0.5 | 4.56 | 50 | 13.1 |
| "TT-2" | 2 | 1 | 2.0 | 0.5 | 4.56 | 50 | 7.4 |
| "TT-3" | 2 | 1 | 2.5 | 0.5 | 4.56 | 50 | 3.5 |
| "TT-4" | 2 | 1 | 1.25 | 0.5 | 4.56 | 50 | 13.3 |

Figure 24:
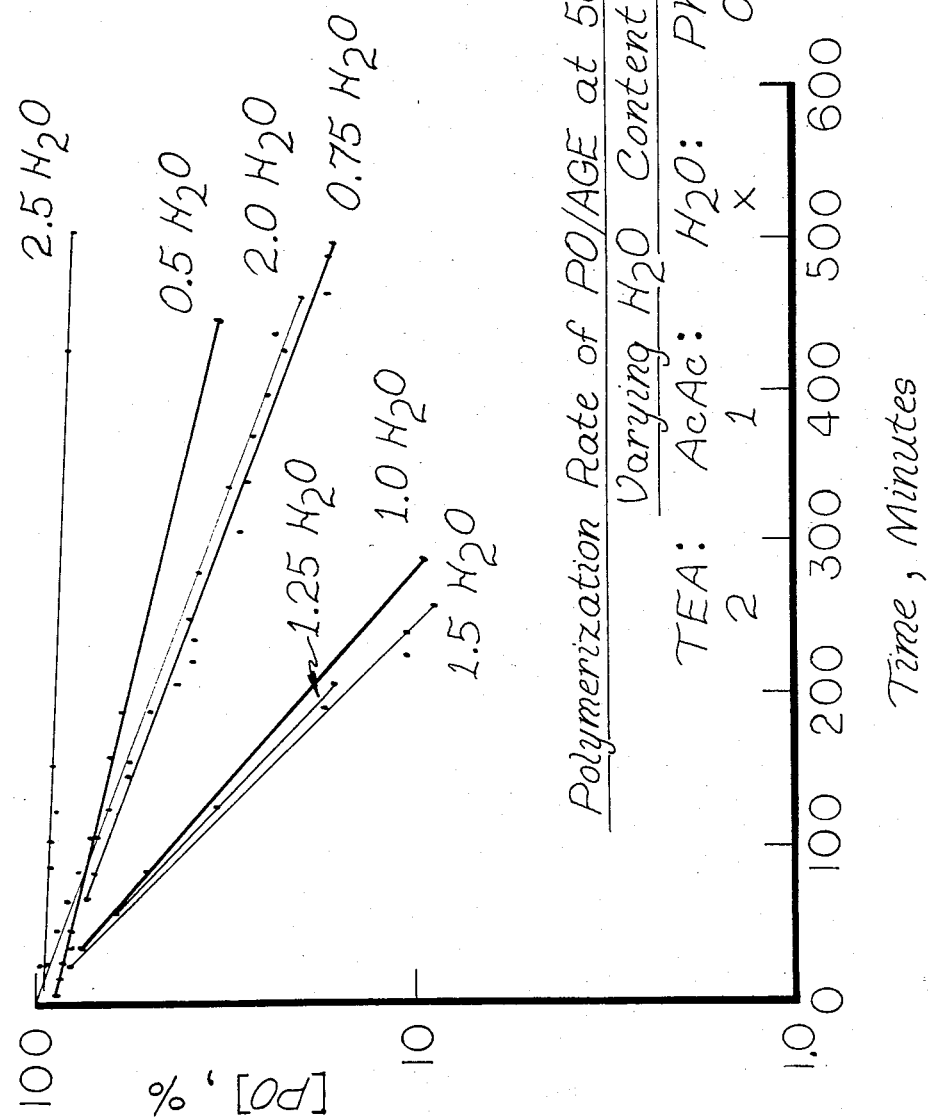

Results of the Table XLV measurements for the Runs, ranging from 0.5 to 2.5 moles of water per 2 moles of TEA, are plotted in FIG. 24 of the accompanying Drawing.

It is seen that the rate of polymerization of PO/AGE peaks quite sharply at from 1.0 to 1.5 aliquots of water per 2 TEA. The polymerization rates for the different water ratio are plotted in FIG. 24. This plot emphasizes this sharp peak in rate between 1.0 and 1.5H₂O/2 TEA.

It is a frequent practice to run at a 1 H₂O/2 TEA for catalyst system formulation. The results derived from the immediate further experimentations indicate the advisability of utilizing a ratio of about 1.25:2 for the H₂O/TEA combination in order to allow a little more error in water level (without needing to drop off in rate on the low side of 1H₂O/TEA).

Figure 25:
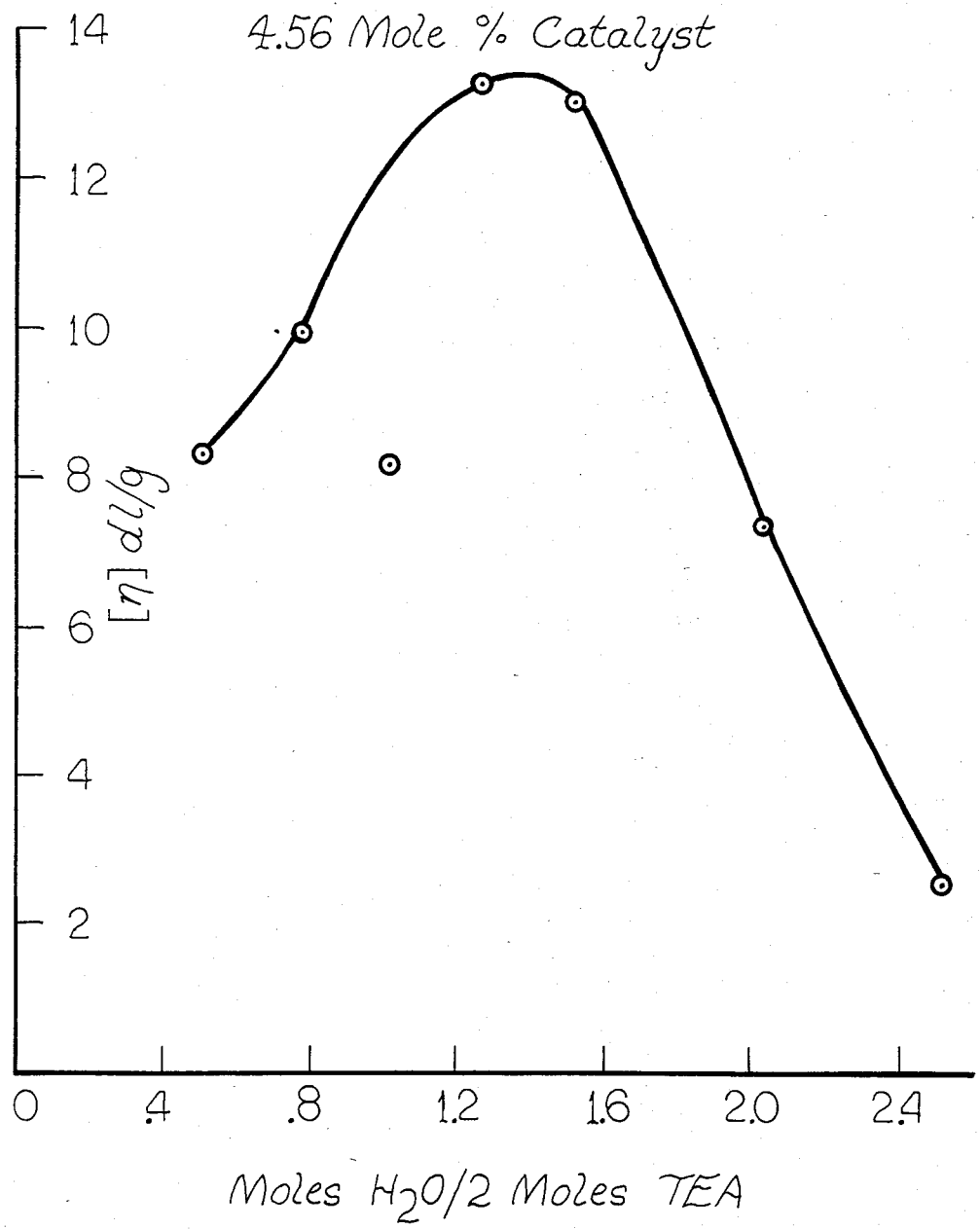

The final intrinsic viscosity [η]dl/g values obtained are plotted against H₂O/TEA ratio in FIG. 25 of the Drawing. It is notable that the FIGURE has the same general shape as the Polymerization Rate Curve. Pursuant to and taking from this, the choice of 1.25H₂O/2 TEA also gives a better chance of reproducible and more consistent solution viscosities in resulting product (and hence molecular weight thereof) than when a 1:25 or so H₂O/TEA ratio is employed.

Incidentally (despite the desirability of being able to do so), it is difficult to correlate from the immediate foregoing the intrinsic viscosity with the % polymerization of the PO/AGE. In general, the molecular weight seemed to increase as the polymerization increases by a factor of about 2. Sometimes, however, considerable scatter is observed and, in particular the final [η] value seems to undergo inexplicable decreases. In any event, final [η] values do seem to be of a more reproducible nature when a TEA/H₂O ratio of about 2:1.25 is employed.

The use of AcAc as a complexing agent along with alkyl aluminum compounds and water is well known for polymerization catalysts for alkene oxides (noting again, U.S. Pat. No. 3,135,705). Such complexing agent is described as an organic compound having two functional groups (one of which is selected from a group consisting of —OH and —SH, and the other containing an element selected from a group consisting of O, N, and S, which forms a coordinate bond with Al). Certain metal salts of β-diketones as complexing agent(s) in a catalyst for the polymerization of alkene oxides are also proposed (referring back to U.S. Pat. No. 3,396,125).

To determine if such metal salts as mentioned in U.S. Pat. No. 3,396,126 are as operable as AcAc along with PhTh a PE-elastomer is subsequently polymerized in St, two salts were chosen to test. These were Co(II)AcAc and zinc acetyl acetonate (i.e., "ZnAcAc"). These compounds were accordingly substituted for AcAc in duplications of runs for Samples "TT-5" and "TT-6". The results of these experiments are presented in Table XLVI. It is seen that Co(II)AcAc appears to give a very low [η] rubber, as well as cause a very low molecular weight PS to be produced. The net result is that the resulting polymer was too brittle to permit satisfactory measurement of its properties.

It is evident from Table XLVI that, while the ZnAcAc does appear to give a rubbery PE-elastomer with a similar [η], the properties of the reinforced polymer therefrom were less than desirable. PS molecular weight was also quite low in this case. This might have been from poor reinforced polymer properties. In any case, Co(II)AcAc and ZnAcAc metal complexes apparently tend to interfere with the St polymerization.

A number of different techniques are available and have been applied to introduce PO/AGE elastomer into the St prior to polymerization. In order to optimize the properties of the final product, comparisons were made of different ways of introducing PO/AGE elastomer into HIPPO. The results of these considerations are presented in Table XLVII.

TABLE XLVI
USE OF CATALYST CHELATING AGENTS OTHER THAN AcAc

| Sample No. | Elastomer Total % | Mole % PO | Mole % AGE | [η] dl/g | Polystyrene $M_w$ | $M_n$ | % Gel | Swelling Index | Catalyst Mole % | TEA:chelate: $H_2O$:Pheno |
|---|---|---|---|---|---|---|---|---|---|---|
| "TT-5" | 9.4 | 95 | 5 | 1.48 | 132 | 41 | 2.8 | 23.8 | 4.56 | 2:1:1:0.5 |
| "TT-6" | 9.5 | 95 | 5 | 8.59 | 145 | 73 | 12.9 | 26.3 | 4.56 | 2:1:1:0.5 |
| "TT-7" | 10.0 | 95 | 5 | 8.78 | 278 | 109 | 14.9 | 27.9 | 4.56 | 2:1:1:0.5 |

| Sample No. | Tensile Yield | Tensile Break | Tensile Mod. | Notched Izod/Norm. Impact | Vicat HD °C. | Melt Flow "G", g/10 min | Comments |
|---|---|---|---|---|---|---|---|
| "TT-5" | | | Too brittle to test | | | | Used Co(II)AcAc |
| "TT-6" | 3068 | 2362 | 3.69 | 0.45/.055 | 94 | 38.4 | Used ZnAcAc |
| "TT-7" | 3189 | 2484 | 3.15 | 2.55/.255 | 93 | 0.57 | Used AcAc |

TABLE XLVII
COMPARISON OF TECHNIQUES FOR PO/AGE ELASTOMER INTRODUCTION INTO HIPPO

| Sample No. | Elastomer Total % | Mole % PO | Mole % AGE | [η] dl/g | Polystyrene $M_w$ | $M_n$ | Catalyst Mole % | TEA:AcAc: $H_2O$:Pheno | % Gel |
|---|---|---|---|---|---|---|---|---|---|
| "TT-7" | 10.0 | 95 | 5 | 8.78 | 278 | 109 | 4.56 | 2:1:1:0.5 | 14.9 |
| "TT-8" | 9.9 | 95 | 5 | 12.43 | 289 | 134 | 3.33 | 2:1:1:0.5 | 14.7 |
| "TT-9" | 11.0 | "Parel" | | 4.02 | 278 | 119 | | — | 2.3 |
| "UU-1" | 10.4 | ("UU-style Elast.) | | 5.04 | | | 4.56 | 2:1:1.25:0.5 (for Elastomer) | 12.8 |
| "VV-1" | 10.4 | 95 | 5 | 7.06 | 287 | 113 | 4.56 | 2:1:1:0 | 13.9 |
| "WW-1" | 6.6 | 85 | 15 | 4.38 | 278 | | 4.51 | 2:1:1:0 | 15.0 |
| "WW-2" | 6.4 | 85 | 15 | 8.27 | | | 4.51 | 2:1:1:0.5 | 18.4 |
| "XX-1" | 7.35 | 85 | 15 | 5.99 | 255 | 126 | 4.51 | 2:1:1:0.5 | 17.0 |
| "YY-1" | 6.7 | "Parel" | | 4.02 | | | | None | 0 |
| "YY-2" | 6.8 | "Parel" | | 4.02 | 182 | 89 | | None | |

| Sample No. | Swelling Index | Tensile Yield | Tensile Break | Tensile Mod. | Notched Izod/Norm. Impact | Vicat HD °C. | Melt Flow "G" g/10 min | Comments |
|---|---|---|---|---|---|---|---|---|
| "TT-7" | 27.9 | 3189 | 2484 | 3.15 | 2.55/.255 | 93 | 0.57 | HAc kill |
| "TT-8" | 29.3 | 2831 | 2068 | 2.89 | 2.10/.212 | 96 | 0.45 | HAc kill |
| "TT-9" | 46.9 | — | 3503 | 3.41 | 0.41/.037 | 97 | 5.06 | |
| "UU-1" | 30.6 | 3116 | 2260 | 3.30 | 1.84/.177 | 91 | 0.80 | |
| "VV-1" | 20.4 | 3317 | 1512 | 3.86 | 1.02/.098 | 95 | 7.66 | |
| "WW-1" | 17.1 | 3813 | 2869 | 3.63 | 1.14/.170 | 97 | 2.43 | |

TABLE XLVII-continued
COMPARISON OF TECHNIQUES FOR PO/AGE ELASTOMER INTRODUCTION INTO HIPPO

| "WW-2" | 17.9 | 3912 | 2904 | 3.78 | 1.37/.214 | 99 | 1.84 | |
| "XX-1" | 21.4 | 3187 | 2767 | 3.27 | 1.76/.239 | 95 | 1.25 | |
| "YY-1" | — | | 2926 | 3.23 | 0.38/.056 | 99 | 6.0 | |
| "YY-2" | | | 2695 | 4.01 | 0.31/.045 | 98 | 14.6 | Used t-butyl peroctoate |

Note:
"Parel" is a sulfur-vulcanizable 98% PO/2% AGE PE.

For the data presented in Table XLVII, the regular polymerization were conducted as above described to obtain Samples "TT-7", "TT-8", "WW-2" and "XX-1". The "Parel" elastomer was dissolved in St overnight at RT in a closed vessel. This solution was then exposed to the same polymerization schedule as that used for in-situ polymerization. In this case, the % gel was low. Sample "YY-2" was obtained in a polymerization with t-butyl peroctoate added in an attempt to promote grafting and crosslinking of the "Parel". The try was unsuccessful, the mechanical properties of the product being more like a pure PS than a reinforced PS.

The run to obtain Sample "UU-1" employed a 95/5 PO/AGE elastomer that has been polymerized in EtBZ using the same polymerization schedule as for runs using St. The solution was devolatilized and the elastomer dissolved in St at RT overnight. This solution was polymerized in like manner to the "Parel" elastomer solution.

The key property in the polymer products described in Table XLVII is the impact resistance, as measured by notched Izod strength. Another measure of this property for Samples varying in elastomer content is the above-described normalized impact. The impact properties of the reinforced polymers prepared by different elastomer introduction techniques are summarized in Table XLVIII. It can be seen that the methods for elastomer introduction can be ranked in an order of decreasing preference going as:

(1) In situ polymer of PO/AGE, 4.56% catalyst;
(2) In situ polymer of PO/AGE, 3.33% catalyst;
(3) PO/AGE Elastomer dissolved in St;
(4) In situ polymer of PO/AGE, no PhTh in catalyst; then
(5) "Parel" PO/AGE Elastomer dissolved in St.

This is true from 6.5 to 11 wt. % elastomer content. It is expectable to have the premise hold true over a much broader range of elastomer content.

TABLE XLVIII
COMPARISON OF HIPPO POLYMERS PREPARED BY DIFFERENT ELASTOMER INTRODUCTION TECHNIQUES

| Sample No. | % Elastomer | Notched Izod | Normalized Impact | Elastomer Introduction Technique |
|---|---|---|---|---|
| "TT-7" | 10.0 | 2.55 | .255 | In situ polym. of PO/AGE, catalyst 4.56 mole % |
| "TT-8" | 9.9 | 2.10 | .212 | In situ polym. of PO/AGE, catalyst 3.33 mole % |
| "TT-9" | 11.0 | 0.41 | .037 | "Parel" dissolved in St, then polymerized |
| "UU-1" | 10.4 | 1.84 | .177 | PO/AGE Elastomer dissolved in St |
| "VV-1" | 10.4 | 1.02 | .098 | In situ polym. of PO/AGE, no PhTh in catalyst |
| "WW-1" | 6.6 | 1.14 | .170 | In situ polym. of PO/AGE, no PhTh in catalyst |
| "WW-2" | 6.4 | 1.37 | .214 | In situ polym. of PO/AGE, catalyst 4.51 mole % |
| "XX-1" | 7.35 | 1.76 | .239 | In situ polym. of PO/AGE, catalyst 4.51 mole % |
| "YY-1" | 6.7 | 0.38 | .056 | "Parel" dissolved in St, then polym. |

Finally, the runs made to obtain Samples "VV-1" and "WW-1" were made with no PhTh in the catalyst system. It is seen that the mechanical properties thereof are considerably poorer than when product is made using PhTh, particularly at the higher elastomer level.

The data in Table XLIX compares the performance under identical testing procedures of various HIPPO products to currently commercially-available HIPS material.

TABLE XLIX
COMPARISON OF HIPPO WITH HIPS

| Sample No. | Total % | Elastomer mole % PO | mole % AGE | [η] dl/g | Polystyrene $M_w$ | $M_n$ | Catalyst mole % | TEA:AcAc $H_2O$:Pheno | % Gel |
|---|---|---|---|---|---|---|---|---|---|
| "HIPS-1"[a] | 7.0 | — | — | — | — | — | — | — | 21.0 |
| "HIPS-2"[b] | 7.0 | — | — | — | — | — | — | — | 24.0 |
| "RR-2" | 10.3 | 95 | 5 | 10.14 | | | 4.56 | 2:1:1.25:0.5 | 14.3 |
| "RR-3" | 10.6 | 95 | 5 | 7.11 | 281 | 143 | 4.56 | 2:1:1.25: | 15.1 |

TABLE XLIX-continued
COMPARISON OF HIPPO WITH HIPS

| "RR-4" | 10.4 | 95 | 5 | 8.21 | 268 | 79? | 4.56 | 2:1:1.25:0.5 | 15.0 |
| "RR-5" | 10.0 | 95 | 5 | 7.99 | 283 | 147 | 4.56 | 2:1:1.25:0.5 | 14.5 |
| "WW-2" | 6.7 | 85 | 15 | 8.27 | | | 4.51 | 2:1:1:0.5 | 18.4 |
| "WW-1" | 7.35 | 85 | 15 | 5.99 | 255 | 126 | 4.51 | 2:1:1:0.5 | 17.0 |

| Sample No. | Swelling Index | Tensile Yield | Tensile Break | Tensile Mod. | Notched Izod/ Norm. Impact | Vicat HD °C. | Melt Flow "G", g/ 10 min | Comments |
|---|---|---|---|---|---|---|---|---|
| "HIPS-1"[a] | 14.4 | 2356 | 2356 | 2.56 | 1.68/0.24 | 103 | 2.39 | |
| "HIPS-2"[b] | 13.5 | 2756 | 2530 | 2.81 | 1.44/0.21 | 102 | 2.96 | |
| "RR-2" | 33.2 | 3070 | 1973 | 3.42 | 3.24/.315 | 97 | 0.40 | HAc kill |
| "RR-3" | 31.3 | 3038 | 1706 | 3.15 | 3.35/.316 | 99 | 0.27 | HAc kill |
| "RR-4" | 26.9 | 3297 | 2059 | 3.35 | 3.23/.311 | 99 | 0.27 | $H_2O$ kill |
| "RR-5" | 29.5 | 3238 | 2035 | 3.24 | 3.92/.392 | 91 | 0.29 | $H_2O$ kill |
| "WW-2" | 17.9 | 3912 | 2904 | 3.79 | 1.37/.214 | 99 | 1.84 | |
| "WW-1" | 21.4 | 3187 | 2767 | 3.27 | 1.76/.239 | 95 | 1.25 | |

[a] "XP-70502.00" from The DOW CHEMICAL COMPANY
[b] "XP-70502.04" from The DOW CHEMICAL COMPANY The immediate foregoing emphasizes that the unique combination of high impact strength, high tensile strength, and high tensile modulus makes PE-reinforced Ps (and the like and analogous products) superior to those reinforced with PBu and/or GRS. Normally, in any given instance, a particular HIPPO physical property value is at least twice the magnitude of that for an analogous HIPS material. This is particularly the case when the wt. % elastomer in the (inter)polymerized impact product is increased above 7 wt. %.

Figure 30:
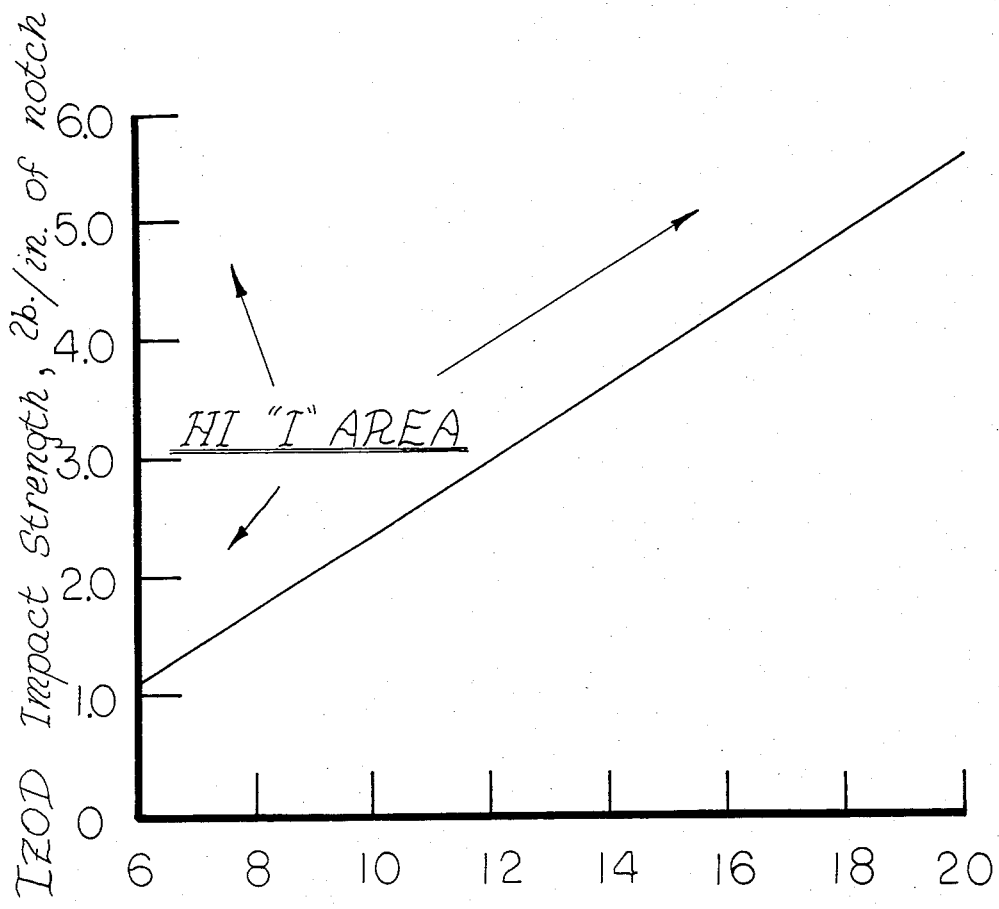
Figure 31:
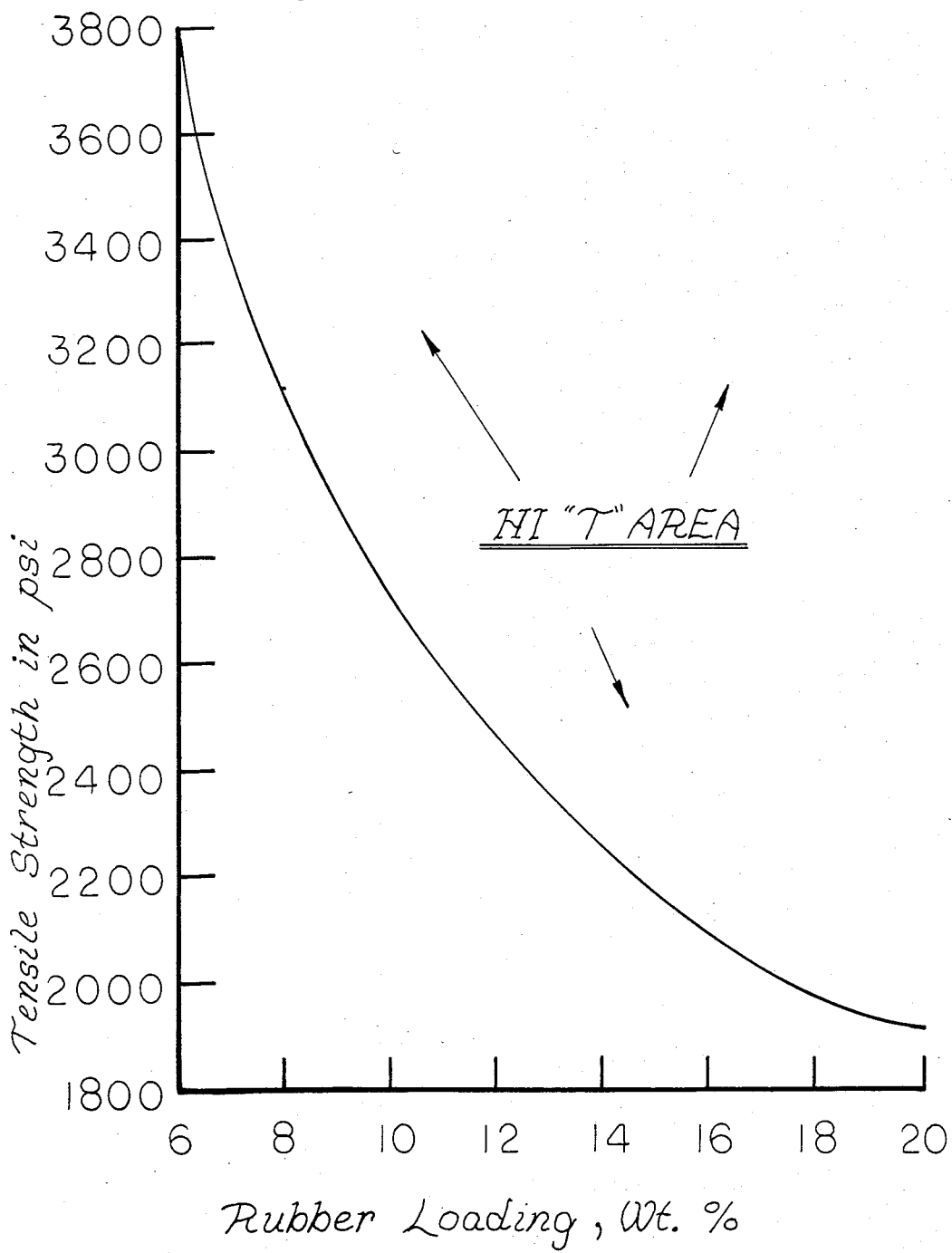
Figure 32:
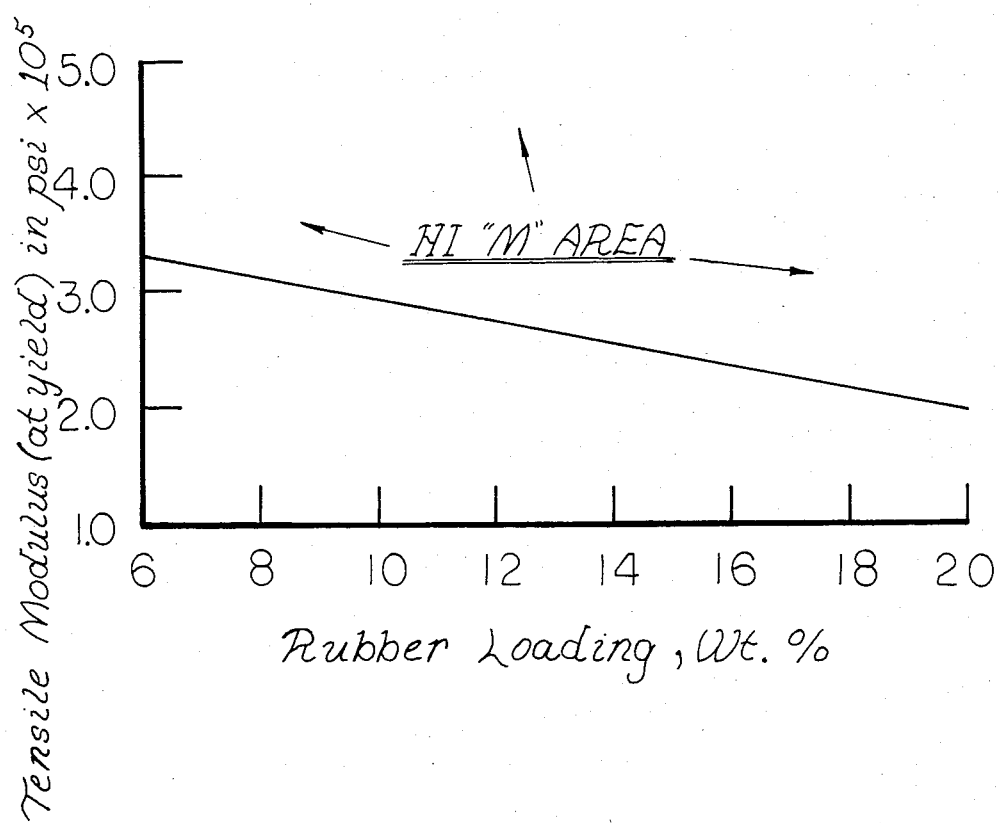

The mentioned combination and its correlated significance in aptly characterizing HIPPO and the like PE-elastomer-reinforced impact plastic products so as to readily differentiate them over and distinguish them from other rubber-reinforced impact grade plastics (such as HIPS) is evident from and demonstrable by the graphical presentations in FIGS. 30-32 of the Drawing.

The significance of FIGS. 30-32 is that, at any given rubber content, the HIPPO products have physical property values that, in each of the portrayed particulars, are above all three of the respective lines of the involved graphs (these respectively lying in the areas designated: Hi "I" in FIG. 30 for Impact Strength; Hi "T" in FIG. 31 for Tensile Strength; and Hi "M" in FIG. 32 for Tensile Modulus). In contrast, other conventional rubber-reinforced impact plastics, such as the HIPS types using PBu or GRS rubbers may have properties above any one or two of the lines, but not all three regardless of the given elastomer content of the particular material under consideration.

It bears stressing that to note this remarkable attribute of the products of the invention, one need not compare HIPPO samples with HIPS samples at identical rubber levels. For any set of properties of a HIPPO polymer there is no HIPS polymer capable of matching that set. The rubber levels employed in FIGS. 30-32 serve merely as a reliably convenient index to identify the set of properties of a particular polymer. In this, the curves shown can be readily and accurately extrapolable to rubber loadings of at least 30 wt. %.

Needless to mention, especially since the utilized physical properties are essential and much wanted for most commercial applications, the desirability of having high values in all three property characteristics is obvious.

To specifically illustrate the excellent ESCR qualities of products in accordance with the invention, a series of PE-elastomer and PBu-rubber reinforced PS impact plastic products were comparatively tested. The tests were performed in an Instron Universal Testing Machine. The polymer test sections had been exposed to a 50/50 by weight mixture of cottonseed oil and oleic acid. The plastics tested were: Polymer "AAA", a PE-reinforced PS containing 11 wt. % PE-elastomer (95% PO/5% AGE); Polymer "BBB"; a PE-reinforced PS containing 8.5 wt. % PE-elastomer (85% PO/15% AGE); Polymer "CCC", a PBu-reinforced PS containing 7 wt. % rubber ("Styron 492U"); and Polymer "DDD", a PBu-reinforced PS containing 11.5 wt. % rubber ("XP 70505" from THE DOW CHEMICAL COMPANY).

The results, showing the complete superiority of the HIPPO samples, are set forth in the following Table L:

TABLE L
ENVIRONMENTAL STRESS CRACK RESISTANCE OF PE-REINFORCED PS VS. PBU-REINFORCED PS

| Polymer | Time to Failure, in Seconds, at the Following Stress Levels (psi) | | | | |
|---|---|---|---|---|---|
| | 2500 | 2000 | 1500 | 1000 | 500 psi |
| AAA | — | 3400 | — | $2.3 \times 10^5$ | $>2 \times 10^6$ Seconds |
| BBB | 250 | 1500 | 6300 | $7 \times 10^4$ | $>2 \times 10^6$ |
| CCC | 200 | 1200 | 3000 | 7000 | $3.5 \times 10^4$ |
| DDD | — | — | 6300 | $3.7 \times 10^4$ | $2 \times 10^5$ |

Many changes and modifications can readily be made and adapted in embodiments in accordance with the present invention without substantially departing from its apparent and intended spirit and scope, all in pursuance and accordance with same as it is set forth and defined in the hereto appended claims.

What is claimed is:

1. A process to prepare polyether elastomer-modified impact-resistant polymer product(s) comprising the steps of:
(a) at least one major monomer an ethylenically unsaturated, addition-polymerizable monomer which is graft-copolymerizable with epoxy monomers of formula (II) and polyether polymers of such epoxy monomers and
(b) dissolving in said major monomer of step (a) a minor proportion of at least one monomer copolymerizable with the major monomer of the formula:

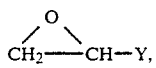
(II)

wherein Y is $R_1$ or $CH_2OR_2$; $R_1$ is H, an aliphatic hydrocarbyl group of 1 to about 20 carbon atoms, a chloromethyl or a bromomethyl group; and $R_2$ is is with or without ethylenic unsaturated a acyl residue of a carboxylic acid containing from 1 to about 30 carbon atoms or a hydrocarbyl group of from 1 to about 20 carbon atoms which may bear other inert substituents; and at some point from said step (a) to after completion of said step (b);
(c) adding to the monomer a catalytically effective quantity of a coordination catalyst for polymerization of monomers of the formula (II) the catalyst comprising the product of contacting:
(i) component A which is a compound of the formula:

RR'AlX, (III)

wherein R and R' each independently are an alkyl group of 1 to about 4 carbon atoms and X is hydrogen, an alkyl or alkoxy group of 1 to about 4 carbon atoms;
(ii) component B, an organic nitrogen-based compound selected from secondary nitrogen-containing compounds that have a basicity which is about equal to or less than the basicity of dimethylamine and no active hydrogen atoms therein other than those of the secondary nitrogen;
(iii) component C, a β-diketone; and
(iv) component D which is water the contacting being done employing the following molar ratios:
B:A—about 0.01–2.5:1
C:A—about 0.1–1.5:1
D:A—about 0.1–1.2:1
all provided that when the molar ratio sum of (C+2D):A is greater than about 3:1, then the B:A molar ratio must at least be about 1:1;
(d) polymerizing the monomer of the formula (II) until at least a portion of said formula (II) monomer are converted and pre-formed in situ in a reaction mixture of the components (a), (b) and (c), to a polyether;
(e) deactivating any unconsumed catalyst in said reaction mixture by addition of an active hydrogen atom containing compound; after any one of the steps (d), (f) and (g);
(f) subjecting the said major monomer defined in (a) to addition polymerization in said reaction mixture until at least a portion of the major monomer is converted to polymer and graft-polymers with said pre-formed polyether in said reaction mixture; and
(g) removing from said reaction mixture, a polyether elastomer-modified, impact-resistant polymer material.

2. The process of claim 1, wherein the major monomer is an alkenyl aromatic monomer of the formula:

$$CH_2=CGAr, \qquad (I)$$

wherein G is selected from the Group consisting of hydrogen and methyl and Ar is an aromatic radical, including alkyl and halo-ring-substituted aromatics of from 6 to about 10 carbon atoms.

3. The process of claim 1, wherein the major monomer is comprised of:
one selected from the Group consisting of: a vinyl halide; a vinyl organic acid ester; vinylidene chloride; and olefins other than the ethylenically unsaturated addition polymerizable monomer of (a).

4. The process of claim 1, wherein the major monomer is of vinyl chloride.

5. The process of claim 1, wherein the major monomer is comprised of a mixture of:
the addition polymerizable monomer of (a); and a monomer selected from the group consisting of: a vinyl halide; a vinyl organic acid ester; vinylidene chloride; acrylic acid and its addition polymerizable esters; methacrylic acid and its addition polymerizable ester; and olefins.

6. The process of claim 1, wherein acrylonitrile is added after step (d) to said mixture of said major monomer constituent.

7. The process of claim 1, wherein styrene is the major monomer.

8. The process of claim 1, wherein the major monomer is a mixture of at least half styrene on a weight basis.

9. The process of claim 6, wherein the major monomer mixture after step (d) is on a weight basis at least half formula (I) monomer and the balance acrylonitrile.

10. The process of claim 6, wherein the major monomer mixture after step (d) is composed of styrene and between about 20 and about 30 weight percent, based on weight of major monomer mixture, of acrylonitrile.

11. The process of any one of claims 1–8, inclusive, wherein at least about 70 weight percent of the major monomer is styrene.

12. The process of claim 11 wherein the major monomer is from about 80 and about 93 weight percent of styrene.

13. The process of claim 1, including the step of dissolving in step (b), a minor proportion:
of an ethylenically unsaturated epoxy monomer of said formula (II).

14. The process of claim 1, including the step of dissolving in step (b), a minor proportion of allyl glycidyl ether.

15. The process of claim 1, including the step of dissolving in step (b) a minor proportion of norbornenyl methyl glycidyl ether.

16. The process of claim 1, including the step of dissolving in step (b) a minor proportion of glycidyl cinnamate.

17. The process in accordance with any one of claims 1–8 inclusive, wherein said formula (II) monomer is dissolved so as to contain, based on total molality quantum of the mixture, not more than about 25 mole percent of a copolymerizable ethylenically unsaturated epoxy monomer.

18. The process in accordance with any one of claims 1–8 wherein said formula (II) monomer is dissolved, so as to contain, based on total molality quantum of the mixture, between about 3 and about 15 mole percent of a copolymerizable ethylenically unsaturated epoxy monomer.

19. The process in accordance with any one of claims 13–16, inclusive, wherein,
propylene oxide is dissolved to constitute the balance of said formula (II) monomer additional to a copolymerizable ethylenically unsaturated epoxy monomer.

20. The process of claim 1, including the step of adding in step (c), as the catalyst, a coordination catalyst in which there exist respective molar ratios of said components of:
about 0.05–0.7:1 as to B:A;
about 0.2–0.8:1 as to C:A; and
about 0.2–0.9:1 as to D:A.

21. The process in accordance with claim 20, wherein said catalyst is added, based on total moles present of said formula (II) monomer(s) that are dissolved in step (b), in a catalytically effective amount in which there is not more than about 10 mole percent of said component A formulated in the catalyst.

22. The process in accordance with claim 20, wherein said catalyst is added, based on total moles present of said formula (II) monomer(s) that are dissolved in step (b), in a catalytically effective amount in which there is between about 0.1 and about 5 mole percent of said component A formulated in the catalyst.

23. The process in accordance with any one of claims 1 and 20–22, inclusive, wherein in the step (c) addition of the catalyst there is included a trialkylaluminum as component A for the catalyst.

24. The process of claim 23 wherein component A is triethylaluminum.

25. The process in accordance with any one of claims 1 and 20–22, inclusive, wherein in the step (c) addition of said catalyst there is included a secondary amine selected from the group consisting of phenothiazine and N-acetamide as component B for the catalyst.

26. The process in accordance with any one of claims 1 and 20–22, inclusive, wherein in the step (c) addition of said catalyst there is included 2,4-pentanedione as component C for the catalyst.

27. The process in accordance with any one of claims 1 and 20–22, inclusive, wherein the step (c) there is included triethyl aluminum as component A; phenothiazine as component B; and 2,4-prontanedione as component C of the catalyst.

28. The process in accordance with any one of claims 1 and 20–22, inclusive, wherein in the step (c) there is included components A, B, C and D of and for the catalyst in such proportioned molar ratios that (B+C+2D):A is not greater than about 3:1.

29. The process of claim 28 including the step of adjusting the molar ratios of components A, B, C and D in said catalyst so that they are about: 0.25:1 for B:A; 0.5:1 for C:A; and 0.5–0.8:1 for D:A.

30. The process of claim 20 including the step of adding components B and C into and during the addition of step (c) in preparation of said catalyst; then adding component A into said addition for completing make-up of the catalyst.

31. The process in accordance with claim 1 including the step comprising:
(h) incorporating, in a minor proportion in the reaction mixture, between from said step (a) until during step (f) a solvent for the various monomers and polymers in said reaction mixture which solvent is substantially free of active-hydrogen and incapable of destroying the catalytic efficiency of said catalyst.

32. The process of claim 31 wherein the solvent of step (h) is selected from the group consisting of ethyl benzene, monochlorobenzene, dichlorobenzene and mixtures thereof.

33. The process in accordance with any one of claims 31 and 32, wherein not more than about 30 weight percent based on the weight of total reaction mixture, of said solvent is incorporated in said reaction mixture.

34. The process in accordance with claim 31, wherein between about 3 and about 15 weight percent, based on the weight of total reaction mixture, of said solvent is incorporated in said reaction mixture.

35. The process of claim 31 wherein the solvent of step (h) is incorporated in the reaction mixture coincident with step (a).

36. The process in accordance with claim 1 including the step comprising
(i) incorporating in said reaction mixture at some point from step (a) and thereafter an antioxidant that is functional with and for at least the polyether polymers in said reaction mixture selected from the group of antioxidants consisting of amino derivatives and phenolic adducts in an effective, oxidation-inhibiting quantity that is less than molar in comparison to the molar quantity employed of said catalyst.

37. The process in accordance with any one of claims 2 and 7–10, and including the step comprising:
(aa) providing in the alkenyl aromatic major monomer constituent of the formula (I) a uniform dispersion throughout of elemental sulfur in a quantity that is not in excess of the limit of solubility of the sulfur in the formula (I) monomer to at least retard premature auto-polymerization of said alkenyl aromatic monomer.

38. The process of claim 37 wherein sulfur is present in an amount of about 12 parts per million by weight, based on monomer parts by weight.

39. A process in accordance with any one of claims 1 and 20, including the step of using acetic acid to deactivate the catalyst in said step (e) to thereby enhance color stability in the product obtained in step (g); said acetic acid being employed in an amount that is a molar equivalent excess based on the moles of aluminum in component A of said catalyst.

40. The process of claim 1 including coincident with the performance of step (a), the step comprising:
(ab) including in the mixture of the major monomer constituent a portion thereof not in excess of about half by weight of the total resulting mixture of a pre-formed addition polymer of said major monomer constituent.

41. A process in accordance with any one of claims 2 and 7–10, coincident with the performance of step (a), the step comprising:

including in the mixture of alkenyl aromatic major monomer constituent of the formula (I) a portion thereof not in excess of about half by weight of the total resulting mixture of preformed polystyrene.

42. The process of claim 40, wherein said pre-formed addition polymer in the mixture of major monomer is provided by pre-polymerization of said monomer mixture prior to performance of step (b).

43. The process of any one of claims 1 and 13–16, including dissolving a quantity of monomer of the formula (II) in step (b) so measured as to form in the final product obtained after completion of step (g) a polyether elastomer-modified impact-resistant polymer material having between about 0.5 and about 50 weight percent of therein-contained polyether, based on product weight.

44. The process of claim 43 including dissolving a quantity of formula (II) monomer so measured as to form a final product having from about 5 to about 30 weight percent of polyether.

45. The process of claim 43 wherein the quantity of formula (II) monomer forms a final product having from about 10 to about 20 weight percent of therein-contained polyether.

46. The process of claim 1 wherein the conversion of monomers to polymeric solids is at least about 65 percent.

47. The process of claim 1 wherein the conversion of monomers to polymeric solids is about 85 percent.

48. The process of claim 1 wherein the steps (d) and (f) are carried out with mixing.

49. The process of claim 48: wherein step (d) is conducted at a temperature at least equal to that at which the given formula (II) monomer polymerizes under influence of the involved catalyst but beneath that at which occurs decomposition of said catalyst; and step (f) is conducted at a temperature in the general range falling between about 0° C. and about 200° C.

50. The process of claim 49 at a temperature between about 80° C. and about 150° C.

51. The process of claim 1 wherein:

the reaction mixture is stirred for mixing thereof throughout at least the polymerizing steps of the procedure; and the mixing is changed to an intensive, high kinetic energy-imparting shear level at an appropriate point of progressive conversion of involved monomers to polymeric solids in the reaction mixture where the percent solids level is between about 10 and about 35 percent, said high shear mixing rate being of sufficiently increased intensity so as to influence and cause phase inversion in the reaction mixture whereby an initial continuous network phase of polyether elastomer in the reaction mixture is particulately broken up and rendered as a discontinuous phase of at least substantially individual discrete polyether elastomer particles contained and enveloped in a matrix of polymerized polymer of major monomer.

52. The process of claim 51, wherein said high-shear mixing rate is applied at a point of conversion of monomer to polymeric solids between about 12 and about 25 percent.

53. A process in accordance with any one of claims 51 and 52, wherein the rate of high shear mixing applied to cause phase inversion is continued and maintained at about the same rate throughout the balance of polymerization carried-on in the reaction mixture after phase inversion until completion of step (f).

54. The process of claim 1 wherein the major monomer of step (a) is selected from the group consisting of acrylic acid and its addition polymerizable esters, and methacrylic acid and its addition polymerizable esters.

* * * * *